US010810360B2

(12) United States Patent
Lee

(10) Patent No.: US 10,810,360 B2
(45) Date of Patent: *Oct. 20, 2020

(54) SERVER AND METHOD OF PROVIDING COLLABORATION SERVICES AND USER TERMINAL FOR RECEIVING COLLABORATION SERVICES

(71) Applicant: SAMSUNG ELECTRONICS CO., LTD., Suwon-si (KR)

(72) Inventor: Jae-keun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,551

(22) Filed: Apr. 1, 2019

(65) Prior Publication Data

US 2019/0230138 A1    Jul. 25, 2019

Related U.S. Application Data

(63) Continuation of application No. 14/705,147, filed on May 6, 2015, now Pat. No. 10,277,643, which is a
(Continued)

(30) Foreign Application Priority Data

May 23, 2014  (KR) .................. 10-2014-0062625
Feb. 6, 2015    (KR) .................. 10-2015-0018870

(51) Int. Cl.
*G06F 3/0484*    (2013.01)
*G06F 40/166*    (2020.01)
(Continued)

(52) U.S. Cl.
CPC ............ *G06F 40/166* (2020.01); *G06F 3/041* (2013.01); *G06F 3/0481* (2013.01);
(Continued)

(58) Field of Classification Search
None
See application file for complete search history.

(56) References Cited

U.S. PATENT DOCUMENTS 5,535,063 A    7/1996  Lamming
5,764,279 A    6/1998  Ford et al.
(Continued)

FOREIGN PATENT DOCUMENTS

CN         1659655 A        8/2005
KR    10-2006-0034786 A     4/2006
(Continued)

OTHER PUBLICATIONS

Communication dated Dec. 20, 2018, issued by the Chinese Patent Office in Chinese counterpart Application No. 201510270712.X.
(Continued)

*Primary Examiner* — Howard Cortes
(74) *Attorney, Agent, or Firm* — Sughrue Mion, PLLC

(57) ABSTRACT

A server, method and apparatus for providing collaboration services are provided. The server includes a memory configured to store computer executable instructions, and a processor configured to process the computer executable instructions to provide a screen including a first area displaying a video of a user and a second area displaying an editable document. The processor is further configured to process the computer executable instructions to receive a selection of a point in time of the video, and provide the editable document in a state corresponding to the selected point in time of the video.

13 Claims, 53 Drawing Sheets

Related U.S. Application Data continuation-in-part of application No. 14/556,616, filed on Dec. 1, 2014, now abandoned.

(51) Int. Cl.
  *H04L 29/06* (2006.01)
  *G06F 3/0481* (2013.01)
  *H04N 7/15* (2006.01)
  *G06F 3/041* (2006.01)
  *G11B 27/02* (2006.01)
  *G06Q 10/10* (2012.01)

(52) U.S. Cl.
  CPC ....... *G06F 3/04847* (2013.01); *G06Q 10/101* (2013.01); *G11B 27/02* (2013.01); *H04L 65/403* (2013.01); *H04N 7/152* (2013.01); *G06F 2203/04803* (2013.01)

(56) References Cited

U.S. PATENT DOCUMENTS

| | | | |
|---|---|---|---|
| 5,970,455 A | 10/1999 | Wilcox et al. | |
| 6,119,147 A | 9/2000 | Toomey et al. | |
| 6,332,147 B1 | 12/2001 | Moran et al. | |
| 8,826,117 B1 * | 9/2014 | Junee | G11B 27/034 715/230 |
| 8,984,405 B1 * | 3/2015 | Geller | G11B 27/34 715/719 |
| 2002/0002562 A1 | 1/2002 | Moran et al. | |
| 2003/0078973 A1 | 4/2003 | Przekop et al. | |
| 2003/0099459 A1 | 5/2003 | Yanagita et al. | |
| 2003/0196165 A1 | 10/2003 | Jung et al. | |
| 2003/0225832 A1 | 12/2003 | Ludwig | |
| 2004/0003096 A1 | 1/2004 | Willis | |
| 2004/0107270 A1 | 6/2004 | Stephens | |
| 2006/0026502 A1 | 2/2006 | Dutta | |
| 2006/0053194 A1 | 3/2006 | Schneider et al. | |
| 2007/0271502 A1 | 11/2007 | Bedi et al. | |
| 2009/0049138 A1 | 2/2009 | Jones et al. | |
| 2010/0169786 A1 * | 7/2010 | O'Brien | G11B 27/034 715/738 |
| 2011/0022449 A1 | 1/2011 | Bourne | |
| 2011/0052144 A1 * | 3/2011 | Abbas | G11B 27/034 386/240 |
| 2011/0055702 A1 | 3/2011 | Jakobson | |
| 2011/0125784 A1 | 6/2011 | Cocheu et al. | |
| 2011/0209052 A1 | 8/2011 | Parker et al. | |
| 2011/0288861 A1 | 11/2011 | Kurzweil et al. | |
| 2012/0078613 A1 | 3/2012 | Kandekar et al. | |
| 2012/0233554 A1 | 9/2012 | Vagell et al. | |
| 2012/0317296 A1 | 12/2012 | Willner et al. | |
| 2013/0145269 A1 * | 6/2013 | Latulipe | G06F 3/048 715/720 |
| 2013/0334300 A1 * | 12/2013 | Evans | G06K 19/06009 235/375 |
| 2014/0033015 A1 | 1/2014 | Shaver | |
| 2014/0331126 A1 | 11/2014 | Hunter et al. | |

FOREIGN PATENT DOCUMENTS

| | | |
|---|---|---|
| KR | 10-2013-0045565 A | 5/2013 |
| KR | 10-1353320 B1 | 1/2014 |

OTHER PUBLICATIONS

Search Report dated Aug. 10, 2015, issued by the European Patent Office in counterpart European Patent Application No. 15169031.0.
Search Report dated Aug. 10, 2015, issued by the International Searching Authority in counterpart International Patent Application No. PCT/KR2015/004712 (PCT/ISA/210).
Written Opinion dated Aug. 10, 2015, issued by the International Searching Authority in counterpart International Patent Application No. PCT/KR2015/004712 (PCT/ISA/237).

\* cited by examiner

SERVER AND METHOD OF PROVIDING COLLABORATION SERVICES AND USER TERMINAL FOR RECEIVING COLLABORATION SERVICES

CROSS-REFERENCE TO RELATED APPLICATIONS

This is a continuation application of U.S. patent application Ser. No. 14/705,147, filed May 6, 2015, in the U.S. Patent and Trademark Office, which is a continuation-in-part of U.S. patent application Ser. No. 14/556,616, filed on Dec. 1, 2014, in the U.S. Patent and Trademark Office, which claims priority from Korean Patent Application No. 10-2014-0062625, filed on May 23, 2014, in the Korean Intellectual Property Office, and Korean Patent Application No. 10-2015-0018870, filed on Feb. 6, 2015, in the Korean Intellectual Property Office, the entire disclosures of which are incorporated herein by reference for all purposes.

BACKGROUND

1. Field

Aspects of exemplary embodiments relate to a method and server for providing collaboration services and a user terminal for requesting the collaboration services.

2. Description of Related Art

Due to advancements in science and technology, various types of user terminals such as smartphones, tablet PCs, desktop computers, laptop computers, etc. are improving and becoming more sophisticated. User terminals have evolved into high-end multimedia devices that are able to connect to a network to search for information on the Internet and transmit or receive files and capture and play back photos or moving images.

In line with the development of user terminals, the demand for cloud computing is increasing. Cloud computing refers to a technology that allows a user to store information in a server on the Internet and access the server from any place at any time via a user terminal to use the stored information. To meet such increasing demand for cloud computing, a wide variety of applications using cloud computing are being developed.

Advances in user terminals and cloud computing technology allow multiple users to connect to a server using their terminals and execute the same application or access the same information.

SUMMARY

Aspects of exemplary embodiments include a method and server for providing collaboration services that allow users to collaboratively edit a document by synchronizing conference minutes that are generated based on a voice included in a video call image associated with each of the users to the document that is collaboratively edited so that the users identify context information while collaboratively editing the document, and a user terminal for receiving the collaboration services.

Additional aspects will be set forth in part in the description which follows and, in part, will be apparent from the description, or may be learned by practice of the presented exemplary embodiments.

According to an aspect of an exemplary embodiment, a server for providing collaboration services that allow users to edit a document includes: a communication unit for receiving from user terminals that request the collaboration services a video call image associated with each of the users who edit the document and editing information about the document that is edited; a controller for synchronizing details of conference minutes that are generated based on a voice included in the video call image associated with each user to the document that is edited according to the editing information; and a memory for storing the details of the conference minutes and the document.

According to an aspect of an exemplary embodiment, a method of providing collaboration services that allow users to edit a document includes: receiving from user terminals that request the collaboration services a video call image associated with each of the users who edit the document and editing information about the document that is edited; synchronizing details of conference minutes that are generated based on a voice included in the video call image associated with each user to the document that is edited according to the received editing information; and storing the details of the conference minutes and the document.

According to an aspect of an exemplary embodiment, a user terminal for receiving collaboration services from a server that provides the collaboration services that allow users to edit a document includes: an audio/video input unit for inputting a user's voice and video; a user input unit for receiving editing information about the document that is edited; a controller that acquires a video call image obtained by performing signal processing on the user's voice and video and the editing information; a communication unit that transmits the acquired video call image and the editing information to the server, and receives from the server a video call image associated with each of the users who edit the document, conference minutes generated based on a voice included in the video call image associated with each user, and the document synchronized to details of the conference minutes; and an output unit that outputs the received video call image associated with each user, the conference minutes, and the document.

According to an aspect of an exemplary embodiment, collaboration services that facilitate users' collaborative editing of a document by synchronizing conference minutes generated based on a voice contained in a video call image associated with each of the users to the document being collaboratively edited are provided, thereby allowing the users to identify context information while collaboratively editing the document.

According to an aspect of an exemplary embodiment, there is provided a server for providing collaboration services, the server including a memory configured to store computer executable instructions, and a processor configured to process the computer executable instructions to provide a screen including a first area displaying a video of a user and a second area displaying an editable document. The processor is further configured to process the computer executable instructions to receive a selection of a point in time of the video, and provide the editable document in a state corresponding to the selected point in time of the video.

The processor may be further configured to process the computer executable instructions to receive a selection of an edit of the editable document, and reproduce the video from a point in time corresponding to the selected edit.

The screen may further include a third area displaying a textual record of items corresponding to points in time of the video and edits of the editable document.

The processor may be further configured to process the computer executable instructions to receive a selection of an item from the textual record of items, reproduce the video from a point in time corresponding to the selected item, and provide the editable document in a state corresponding to the selected item.

The processor may be further configured to process the computer executable instructions to generate the textual record of items based on a voice of the user in the video.

The processor may be further configured to process the computer executable instructions to generate the textual record of items based on an edit of the editable document by the user.

The editable document may be displayed in a word processing program.

According to an aspect of an exemplary embodiment, there is provided a method for providing collaboration services, the method including displaying a screen including a first area displaying a video of a user and a second area displaying an editable document. The method further includes receiving a selection of a point in time of the video, and displaying the editable document in a state corresponding to the selected point in time of the video.

The method may further include receiving a selection of an edit of the editable document, and reproducing the video from a point in time corresponding to the selected edit.

The screen may further include a third area displaying a textual record of items corresponding to points in time of the video and edits of the editable document.

The method may further include receiving a selection of an item from the textual record of items, reproducing the video from a point in time corresponding to the selected item, and providing the editable document in a state corresponding to the selected item.

The method may further include generating the textual record of items based on a voice of the user in the video.

The method may further include generating the textual record of items based on an edit of the editable document by the user.

A non-transitory computer readable medium may include computer readable instructions executable to perform the method.

According to an aspect of an exemplary embodiment, there is provided a terminal for providing collaboration services, the terminal including a display configured to display a screen including a first area displaying a video of a user and a second area displaying an editable document. The terminal further includes an input device configured to receive a selection of a point in time of the video, and a controller configured to control the display to display the editable document in a state corresponding to the selected point in time of the video.

The input device may be further configured to receive a selection of an edit of the editable document, and the controller may be further configured to control the display to reproduce the video from a point in time corresponding to the selected edit.

The input device may be further configured to receive a selection of an item from the textual record of items, and the controller may be further configured to control the display to reproduce the video from a point in time corresponding to the selected item, and control the display to display the editable document in a state corresponding to the selected item.

The textual record of items may be generated based on a voice of the user in the video.

The textual record of items may be generated based on an edit of the editable document by the user.

According to an aspect of an exemplary embodiment, there is provided a server for providing collaboration services, the server including a communication device configured to transmit a document to be displayed, and receive a selection of a portion of the displayed document. The server further includes a controller configured to determine a portion of a video of a user to be displayed and a portion of textual items to be displayed, the portion of the video and the portion of the textual items corresponding to the selected portion of the displayed document.

The communication device may be further configured to transmit the video to be displayed, and receive a selection of another portion of the displayed video, and the controller may be further configured to determine another portion of the document to be displayed and another portion of the textual items to be displayed, the other portion of the document and the other portion of the textual items corresponding to the selected other portion of the displayed video.

The communication device may be further configured to transmit the textual items to be displayed, and receive a selection of another portion of the displayed textual items, and the controller may be further configured to determine another portion of the video to be displayed and another portion of the document to be displayed, the other portion of the video and the other portion of the document corresponding to the selected other portion of the displayed textual items.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
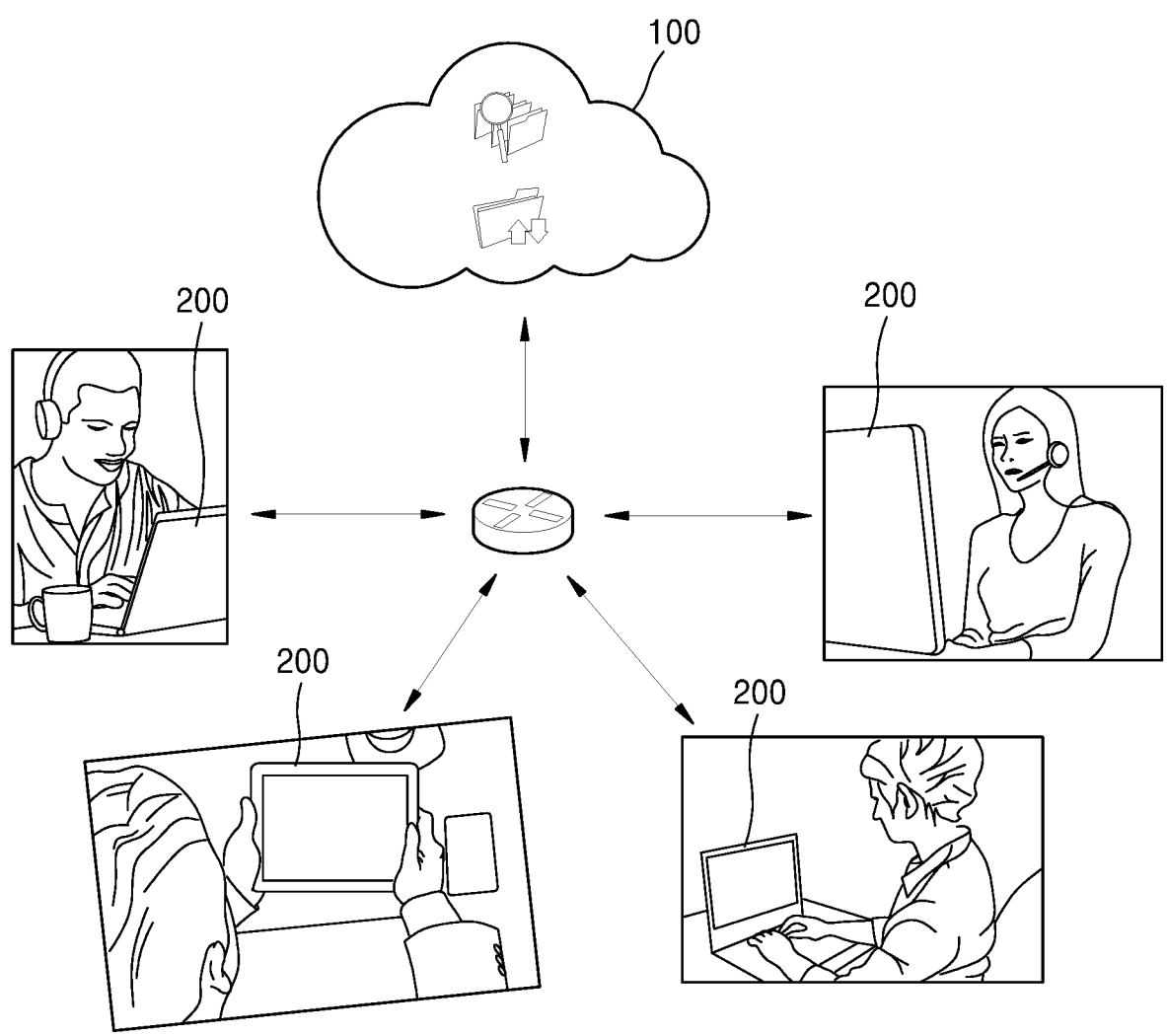
FIG. 1 illustrates an environment for providing collaboration services.

Reference will now be made in detail to embodiments, examples of which are illustrated in the accompanying drawings, wherein like reference numerals refer to the like elements throughout. In this regard, the present embodiments are provided so that this disclosure will be thorough and complete, and should not be construed as being limited to the descriptions set forth herein. Accordingly, exemplary embodiments are merely described below, by referring to the figures, to explain aspects of the present description. Variants or combinations that can be easily inferred from the description and the exemplary embodiments thereof by one of ordinary skill in the art are deemed to be within the scope of the inventive concept. Expressions such as "at least one of," when preceding a list of elements, modify the entire list of elements and do not modify the individual elements of the list.

It will be further understood that the terms "comprises" and/or "comprising," when used in this specification, specify the presence of stated elements, components, steps, and/or operations, but do not preclude the presence or addition of one or more elements, components, steps, and/or operations.

Furthermore, it will be understood that, although the terms "first", "second", etc. may be used herein to describe various elements and/or components, these elements and/or components should not be limited by these terms. These terms are only used to distinguish one element or component from another element or component.

The present embodiments are directed to a method and server for providing collaboration services and a user terminal for receiving collaboration services, and detailed descriptions of functions or constructions that are widely known to those skilled in the art are omitted herein.

FIG. 1 illustrates an environment for providing collaboration services.

Collaboration services refer to a type of services that are provided to a plurality of users when the users collaborate with each other to perform a particular task in pursuit of the same goal. In collaboration services that allow a plurality of users to collaboratively edit a document, document editing programs or tools for communications among the collaborating users may be provided to the users as one type of collaboration services. In this case, the document that is collaboratively edited may be any kind of document that can be executed on a server 100 for providing collaboration services regardless of its type or content. For example, the document may contain a text or multimedia content.

The server 100 may be a server for storing various types of applications and data that allow each user to collaborate with other users. The server 100 may perform both local area communication and remote communication. The server 100 may also be connected to a plurality of user terminals 200 via a network.

The user terminals 200 may be various types of user devices that can be used to connect with the server 100. For example, the user terminals 200 may be smartphones, tablet PCs, desktop computers, or laptop computers that are able to perform wired or wireless communication with the server 100. Furthermore, the user terminals 200 may be user devices configured to capture and reproduce video call images so as to allow users who edit a document collaboratively to engage in a video conference.

In one exemplary embodiment, editing the document may include adding, removing, modifying, and/or formatting text, objects, images, graphics, etc. in a document, image, video, application, etc. However, editing is not limited to the aforementioned exemplary embodiment and may include other operations performed on the document.

In one exemplary embodiment, collaborative editing may include simultaneously or sequentially editing the document by a plurality of users or may include both simultaneously and sequentially editing the document by the plurality of users. However, collaborative editing is not limited to the aforementioned exemplary embodiment and may include other collaborative editing performed on the document.

Figure 2:
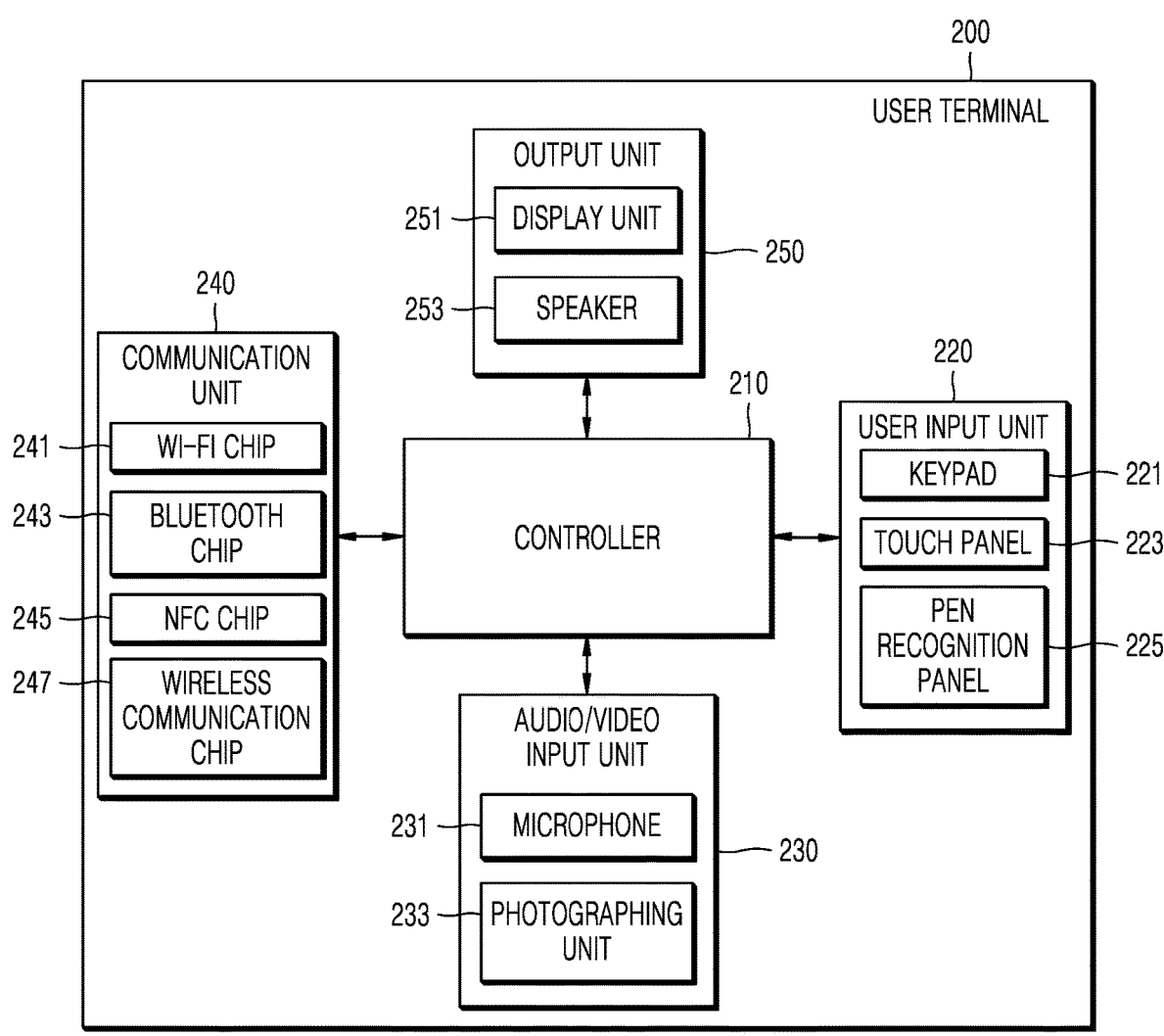
FIG. 2 is a block diagram of a configuration of a user terminal according to an exemplary embodiment.

FIG. 2 is a block diagram of a configuration of a user terminal 200 according to an exemplary embodiment. It will be understood by one of ordinary skill in the art that the user terminal 200 may further include other common components in addition to those illustrated in FIG. 2. Each of the components shown in FIG. 2 may be integrated, added, or omitted according to the specification of the user terminal 200 that is actually implemented. In other words, two or more components may be combined into a single component, or a single component may be split into two or more components if necessary.

Referring to FIG. 2, the user terminal 200 according to the present embodiment may include a controller 210, a user input unit 220 (e.g., a user input), an audio/video input unit 230 (e.g., an audio/video input), a communication unit 240 (e.g., a communicator), and an output unit 250 (e.g., an output).

The controller 210 may control the display unit 251 to display a part of contents stored in a memory (not shown). Alternatively, when a user performs manipulation on a region of a display unit 251, the controller 210 may perform a control operation corresponding to the manipulation.

Although not shown in FIG. 2, the controller 210 may include at least one selected from random access memory (RAM), read-only memory (ROM), central processing unit (CPU), graphic processing unit (not shown), and a data bus. The RAM, the ROM, the CPU, and the graphics processing unit (GPU) may be connected to one another via the data bus.

The CPU accesses a memory (not shown) and performs booting by using operating system (O/S) stored in the memory. The CPU also performs various operations by using various types of programs, contents, and data stored in the memory.

The ROM stores a set of commands to boot a system. For example, when a turn on command is input and power is supplied, the CPU may copy the O/S stored in the memory into the RAM according to a command stored in the ROM, execute the O/S, and boot the system. When booting is completed, the CPU copies various programs stored in the memory into the RAM, executes the programs copied into the RAM, and performs various operations. In detail, the GPU may generate a screen on which an electronic document including various objects such as content, icons, and menus are displayed. The GPU calculates attribute values such as coordinate values, a shape, a size, and a color of each object to be displayed according to layouts of the screen. The GPU may also create a screen in various layouts which include objects based on the calculated attribute values. The screen created by the GPU may be provided to the display unit 251 so that it is displayed on each region of the display unit 251.

The controller 210 controls a video processor (not shown) and an audio processor (not shown) to process video data and audio data contained in content received via the communication unit 240 or content stored in the memory, respectively.

The user input unit 220 may receive various commands from a user. The user input unit 220 may include at least one selected from a keypad 221, a touch panel 223, and a pen recognition panel 225.

The keypad 221 may include various types of keys such as mechanical buttons, wheels, etc., provided on various regions such as a front surface, a side surface, and a rear surface of a main body of the user terminal 200.

The touch panel 223 may detect a user's touch input and output a touch event value corresponding to a detected touch signal. When the touch panel 223 is combined with a display panel (not shown) to form a touch screen (not shown), the touch screen may be realized as various types of touch sensors such as capacitive, resistive, and piezoelectric touch sensors. A capacitive touch sensor uses a dielectric material coated on a surface of a touch screen. When a part of a user's body touches the surface of the touch screen, the capacitive touch sensor detects micro electricity caused by the part of the user's body and calculates touch coordinates. A resistive touch sensor includes two electrode plates embedded in a touch screen. When a user touches a specific point on the screen, the upper and lower electrode plates are brought into contact at the touched point. A resistive touch sensor detects electrical current caused by the contact of the two electrode plates and calculates touch coordinates A touch event on the touch screen may mostly be generated using a human's fingers. However, the touch event may also occur via an object formed of a conductive material that may cause a change in capacitance.

The pen recognition panel 225 senses a pen's proximity input or touch input according to a manipulation of a touch pen (e.g., a stylus pen or a digitizer pen) and outputs a pen proximity event or pen touch event corresponding to the sensed pen's proximity input or touch input. The pen recognition panel 225 may be realized using an Electro Magnetic Resonance (EMR) technique and sense a touch input or proximity input according to a variation in the strength of an electromagnetic field caused by a pen's proximity or touch. Specifically, the pen recognition panel 225 may include an electromagnetic induction coil sensor (not shown) having a grid structure and an electric signal processor (not shown) that sequentially provides alternating current (AC) signals having a predetermined frequency to loop coils of the electromagnetic induction coil sensor. When a pen having a resonant circuit therein is disposed close to a loop coil of the pen recognition panel 225, a magnetic field transmitted from the loop coil generates current based on mutual electromagnetic induction in the resonant circuit of the pen. An induction field is created from a coil of the resonant circuit in the pen based on the current. The pen recognition panel 225 then detects the induction field from a loop coil that is in a signal reception state and senses the position of a point that the pen is held in close proximity to and touches. The pen recognition panel 225 may be disposed below the display panel and have a sufficient area so as to cover a display area of the display panel.

The audio/video input unit 230 may include a microphone 231 and a photographing unit 233. The microphone 231 receives a user's voice or other sounds and converts the user's voice or the other sounds into audio data. The controller 210 may use the user's voice input via the microphone 231 for a video conference, or may store the audio data in the memory. The photographing unit 233 may photograph still or moving images according to a user's control. The photographing unit 233 may be realized using a plurality of cameras such as a front camera and a rear camera.

When the audio/video input unit 230 includes the microphone 231 and the photographing unit 233, the controller 210 may generate a video call image by using a user's voice input via the microphone 231 and a user's video recognized by the photographing unit 233.

The user terminal 200 may operate in a motion control mode or voice control mode. When the user terminal 200 operates in a motion control mode, the controller 210 may activate the photographing unit 233 to photograph a user, track a change in a user's motion, and perform a control operation corresponding to the change. When the user terminal 200 operates in a voice control mode, the controller 210 analyzes a user's voice that is input via the microphone 231 and performs a control operation according to the analyzed user's voice.

The communication unit 240 may perform communication with different types of external devices according to various types of communication methods. The communication unit 240 may include at least one selected from a Wireless Fidelity (Wi-Fi) chip 241, a Bluetooth chip 243, a Near Field Communication (NFC) chip 245, and a wireless communication chip 247. The controller 210 may communicate with various external devices via the communication unit 240.

The Wi-Fi chip 241 and the Bluetooth chip 243 may perform communication by using Wi-Fi and Bluetooth technologies, respectively. The communication unit 240 using the Wi-Fi chip 241 or the Bluetooth chip 243 may transmit or receive various kinds of information after transmitting or receiving connection information such as service set identifiers (SSID) or session keys and establishing a communication connection by using the connection information. The NFC chip 245 refers to a chip that performs communication by using an NFC technology that operates at a 13.56 MHz frequency band among various radio frequency identification (RFID) frequency bands including 135 kHz, 13.56 MHz, 433 MHz, 860 to 960 MHz, and 2.45 GHz. The wireless communication chip 247 refers to a chip that performs communication according to various communication standards such as the Institute of Electrical and Electronics Engineers (IEEE), ZigBee, Third Generation (3G), Third Generation Partnership Project (3GPP), and Long Term Evolution (LTE).

The output unit 250 may include the display unit 251 and a speaker 253.

The display unit 251 may include a display panel (not shown) and a controller (not shown) for controlling the display panel. Examples of the display panel may include a Liquid Crystal Display (LCD), an Organic Light Emitting Diode (OLED) display, an Active-Matrix OELD (AM-OLED), a Plasma Display Panel (PDP), and other various displays. The display panel may be formed as a flexible, transparent, or wearable display. The display unit 251 may be combined with the touch panel 223 of the user input unit 220 to form a touch screen (not shown). For example, the touch screen may include an integrated module in which the display panel is combined with the touch panel 223 to form a layered structure.

The speaker 253 may output audio data generated by an audio processor (not shown).

The above-described components of the user terminal 200 may be given different names than those described above. Furthermore, the user terminal 200 according to the present embodiment may include at least one of the above-described components. The user terminal 200 may not include some of the components or may further include additional components. The user terminal 200 may perform the following operations by using at least one of the above-described components.

The user terminal 200 for receiving collaboration services from the server 100 for providing the collaboration services receive a user's voice and video via the audio/video input unit 230 and editing information about a document that is collaboratively edited via the user input unit 220. In an exemplary embodiment, the document is collaboratively edited by using one or more of a word processing program, spreadsheet program, slideshow program, presentation program, animation program, graphics program, note taking program, notepad program, and other similar programs. The editing information may include information for editing a document, and may include, for example, at least one selected from text information, image information, table information, copy information, paste information, letter spacing information, row spacing information, letter size information, color information, and other various kinds of information related to editing of the document.

The controller 210 of the user terminal 200 may acquire a video call image obtained by performing signal processing on the user's voice and video and the editing information and transmit the video call image and the editing information to the server 100. The communication unit 240 receives from the server 100 a video call image associated with each of users who edit a document collaboratively, an image showing minutes of a conference (hereinafter, referred to as 'conference minutes') that are generated based on a voice included in the video call image associated with each user, and the document being collaboratively edited and which is synchronized to the conference minutes. The output unit 250 outputs the received video call image associated with each user, the conference minutes, and the document being collaboratively edited. The conference minutes may be information outputted as image comprising at least one selected from texts about a conference, a document comprising texts about a conference, and a graph. Furthermore, the conference minutes may include texts generated based on a user's voice, time information of a time when each of the texts is generated, and page information of a collaboratively edited document that is provided to a user who utters a text at a time when the text is generated. In other words, details of the conference minutes may include at least one selected from the texts, the time information, the page information, and image information.

In one exemplary embodiment, edits of the document may be indicated by a corresponding indicator that may be one or more of a marker, highlight, object, icon, or image from the video call image, e.g., a thumbnail image of a user, etc.

In addition, since the conference minutes and the document are synchronized to each other, a user input for at least one of the conference minutes and the document may accompany a change in the other. For example, the communication unit 240 may transmit information about a text selected by a user from the conference minutes to the server 100 and, in response to the transmission, receive information about an edited portion of the document synchronized to the selected text. The output unit 250 may then output the edited portion of the document synchronized to the selected text.

The conference minutes may be a textual record of items generated based on a voice of the user in the video. The conference minutes may also be the textual record of items generated based on an edit of the editable document by the user.

Figure 3:
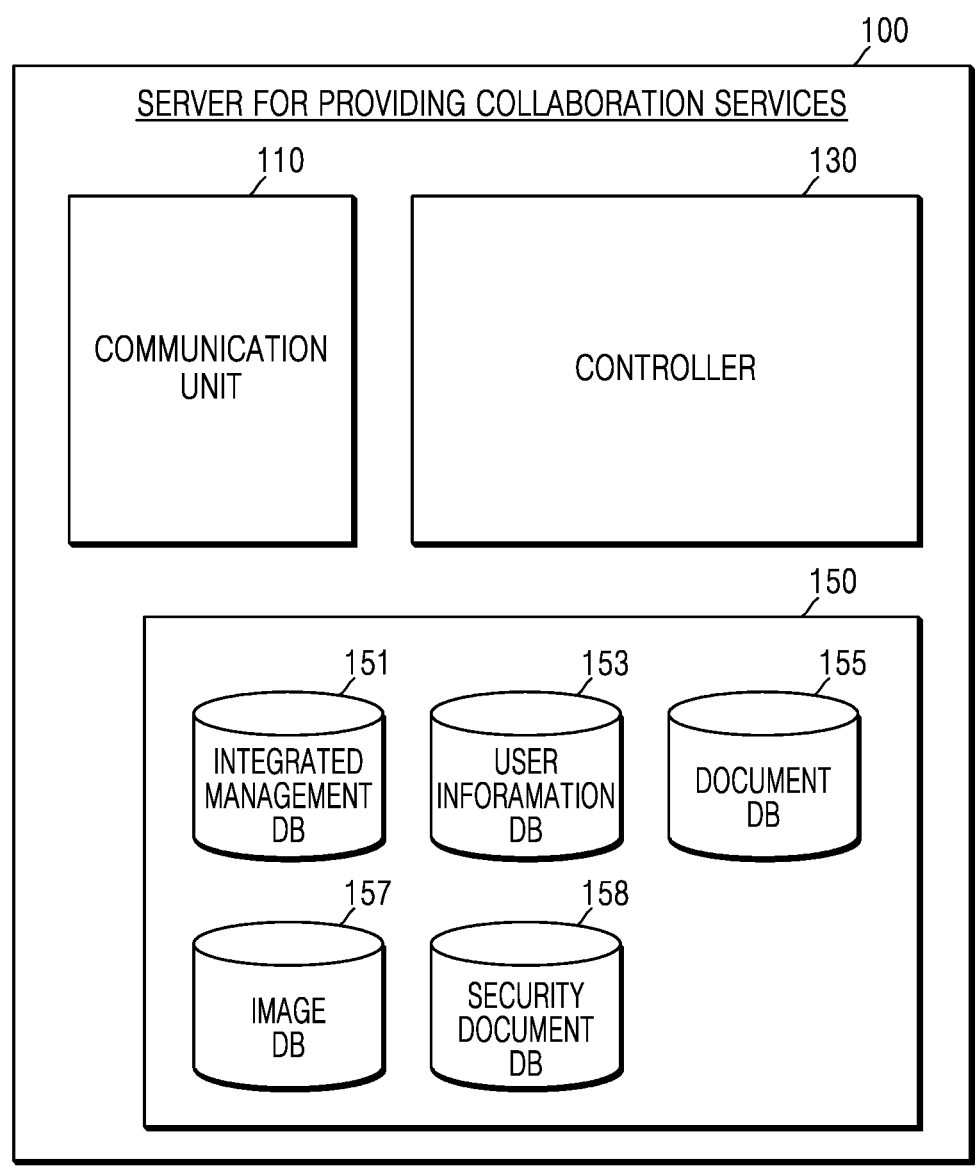
FIG. 3 is a block diagram of a configuration of a server for providing collaboration services according to an exemplary embodiment.

FIG. 3 is a block diagram of a configuration of a server 100 for providing collaboration services according to an exemplary embodiment. It will be understood by one of ordinary skill in the art that the server 100 may further include other common components in addition to those illustrated in FIG. 3. Each of the components shown in FIG. 3 may be integrated, added, or omitted according to actual implementation of the server 100. In other words, two or more components may be combined into a single component, or a single component may be split into two or more components if necessary.

A communication unit 110 may perform communication with external devices including the user terminal (200 in FIG. 2). For example, the server 100 for providing the collaboration services that allow collaborative editing of a document may receive from the user terminal 200 various requests related to the collaboration services, including a request for initiation of the collaboration services, setting information necessary for creating a collaborative work environment, and editing information about the document that is collaboratively edited. Furthermore, in response to the various requests related to the collaboration services, the server 100 may provide all matters related to provision of the collaboration services.

A controller 130 may perform an overall control over the server 100. The controller 130 acquires information and requests received via the communication unit 110 and stores the received information and requests in a memory 150. The memory 150 may include a storage or a database. The controller 130 may also process the received information and requests. For example, the controller 130 may generate an image to be used in the collaboration services based on information received from a fourth user terminal (600 in FIG. 48) or perform processing for managing the received information. Furthermore, in response to the acquired requests. The controller 130 may transmit information necessary for providing the collaboration services to the user terminal 200.

The controller 130 may perform overall management of a video call image associated with each user who edits a document collaboratively, conference minutes generated based on a voice included in the video call image, and the document that is collaboratively edited according to the received editing information. The video call image, the conference minutes, and the document are used in the collaboration services. For example, the controller 130 may perform management operations such as generation, storage, processing, and deletion of the video call image associated with each user, and the conference minutes, and the document being collaboratively edited. The controller 130 of the server 100 will now be described in more detail with reference to FIGS. 3 and 4.

Figure 4:
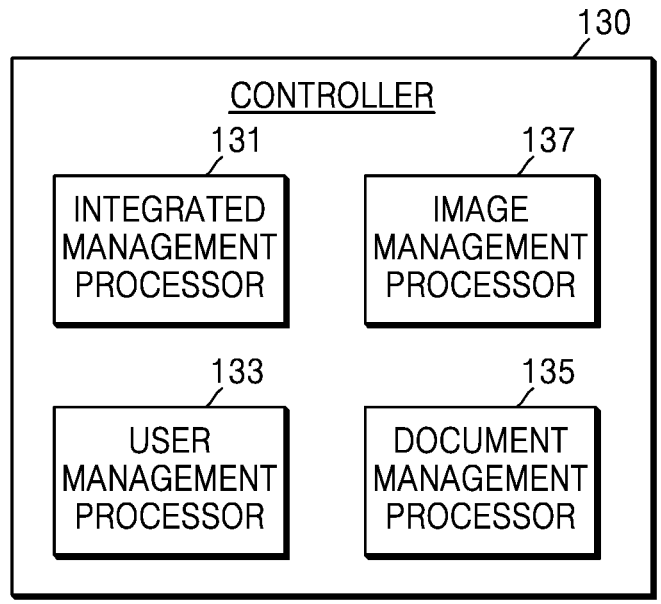
FIG. 4 illustrates a controller of a server for providing collaboration services according to an exemplary embodiment.

FIG. 4 illustrates the controller 130 of the server 100 for providing collaboration services according to an exemplary embodiment. Referring to FIG. 4, the controller 130 of the server 100 may include an integrated management processor 131, a user management processor 133, a document management processor 135, and an image management processor 137. It will be understood by one of ordinary skill in the art that the controller 130 may further include other common components in addition to those illustrated in FIG. 4. The controller 130 may include a plurality of processors as illustrated in FIG. 4, or unlike in FIG. 4, some or all of processors may be integrated into a single controller.

The integrated management processor 131 performs overall control for providing the collaboration services. The integrated management processor 131 may assign received information and requests related to the collaboration services separately to the user management processor 133, the document management processor 135, and the image management processor 137 and control processing of the information and requests. Furthermore, in response to requests related to the collaboration services, the integrated management processor 131 may transmit information about the collaboration services by using at least one selected from the user management processor 133, the document management processor 135, and the image management processor 137. Collaboration service related information used by the integrated management processor 131 in integrated management for providing the collaboration services, collaboration service related information that is generated, modified, and deleted according to the integrated management, and collaboration service support software may be stored in an integrated management database (DB) 151.

In order to achieve synchronization among a video call image associated with each of users who edit a document collaboratively, conference minutes generated based on a voice included in the video call image associated with each user, and the document that is collaboratively edited, the integrated management processor 131 may add log data to the video call image, editing information of the document, and/or a result of editing of the document according to the editing information, which are input to the communication unit 240 from the user terminal 200. For example, if the editing information is text information for inserting a text, the result of editing of the document may be a document having the text therein or the text inserted into the document. If the editing information is copy information for copying and pasting a text, the result of editing of the document may be a document to which the text is copied or a copied text is pasted into a document. If the editing information is information for adjusting a letter size, the result of editing of the document may be a document or text in which a font size has been adjusted. As described above, the video call image, the conference minutes, and the document are used in the collaboration services. In this case, the log data may be data related to a time when the video call image or the editing information is received by the server 100. In other words, a portion of the video call image and the editing information are synchronized to each other based on the time or within predetermined range of the time when the video call image or the editing information is received by the server 100. Accordingly, the video call image may be synchronized to the document that is collaboratively edited. Furthermore, the conference minutes may be synchronized to the document that is collaboratively edited by using the log data itself added to the video call image. Attributes of log data added for synchronization between various types of images and a document that is collaboratively edited and a synchronization interval may be changed.

In an exemplary embodiment, instead of a video call image, there may be a still image of a user that edits the document and audio of the user may be synchronized with the document that is collaboratively edited. In yet another exemplary embodiment, the still image of the user corresponds to a portion or the entirety of the audio of the user.

The log data may be a textual record of items generated based on a voice of the user in the video. The log data may be the textual record of items generated based on an edit of the editable document by the user.

The user management processor 133 may manage information about a plurality of users who use collaboration services. In other words, the user management processor 133 may manage personal information about each user and information about group members in each group. User information used by the user management processor 133 in user management and user information that is generated, modified, and deleted according to the user management may be stored in user information DB 153.

The document management processor 135 performs overall control over a document that is collaboratively edited according to editing information received from the user terminal 200. When a program used to process a document is executed on the server 100 for providing collaboration services, the document management processor 135 may perform overall control over a document that is collaboratively edited according to editing information and requests related to processing of the document received from the user terminal 200. For example, the document management processor 135 may perform management operations such as creation, editing, storage, and deletion of the document. Document information used by the document management processor 135 for document management and documents that are generated, modified, and deleted according to the document management may be stored in a document DB 155.

The image management processor 137 performs overall control over a video call image associated with each of users who edit a document collaboratively and conference minutes generated based on a voice included in the video call image associated with each user. For example, the image management processor 137 may perform management operations such as creation, storage, processing, and deletion of the video call image associated with each user as well as the conference minutes. Image information used by the image management processor 137 for image management and image information that is generated, modified, and deleted according to the image management may be stored in an image DB 157. The image management processor 137 will now be described in more detail with reference to FIG. 5.

Figure 5:
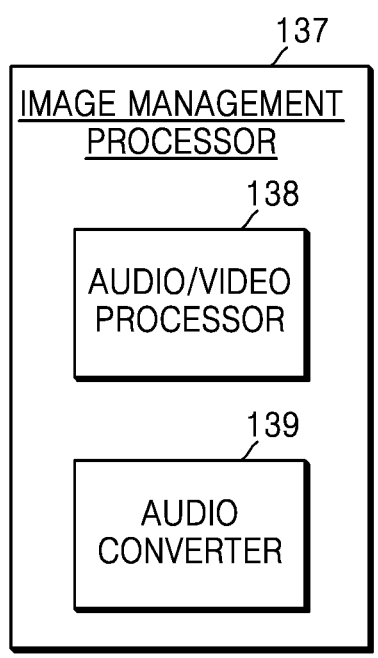
FIG. 5 illustrates an image management processor that may be included in a controller of a server for providing collaboration services according to an exemplary embodiment.

FIG. 5 illustrates the image management processor 137 that may be included in the controller 130 of the server 100 for providing collaboration services according to an exemplary embodiment.

Referring to FIG. 5, the image management processor 137 may include an audio/video processor 138 and an audio converter 139. It will be understood by one of ordinary skill in the art that the image management processor 137 may further include other common components in addition to those illustrated in FIG. 5.

The audio/video processor 138 may perform signal processing on an input image signal. In this case, the signal processing may mean creation or processing of an image. Processing of the image may mean editing thereof. The resulting image signal containing an audio signal and a video signal may be transmitted to the user terminal 200 via the communication unit 110 or be stored in the image DB 157.

The audio converter 139 may convert a voice included in a video call image associated with each user who receives collaboration services into information in text form. The image management processor 137 may receive the information in text form from the audio converter 139 in order to create a conference minutes.

Referring back to FIG. 3, the server 100 may include a memory 150. The memory 150 includes at least one selected from the integrated management DB 151, the user information DB 153, the document DB 155, a security document DB 158, and the image DB 157 as described in more detail below with reference to FIGS. 6 through 9.

Figure 6:
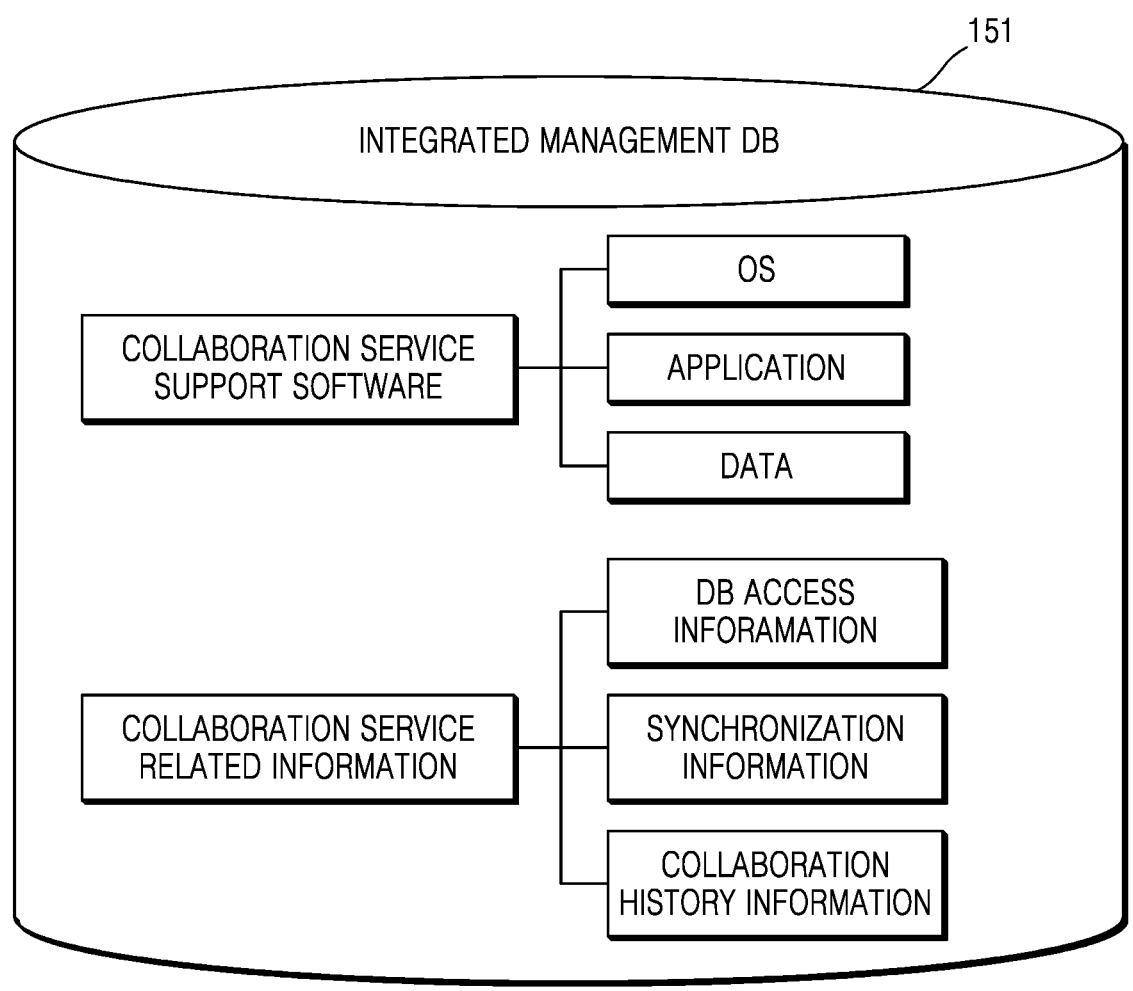
FIG. 6 illustrates an integrated management database (DB) that may be stored in a memory of a server for providing collaboration services according to an exemplary embodiment.

FIG. 6 illustrates the integrated management DB 151 that may be stored in the memory 150 of the server 100 for providing collaboration services according to an exemplary embodiment.

The integrated management DB 151 may store various kinds of software and information necessary for the server 100 to provide the collaboration services. Referring to FIG. 6, the integrated management DB 151 may store collaboration service support software and collaboration service related information.

The collaboration service support software may include OS and applications that are executed on the server 100 and various types of data used to support the collaboration services. The collaboration service related information may include information about access to various databases, synchronization information such as attributes of log data added for synchronization between various types of images and a document that is collaboratively edited and a synchronization interval, and collaboration history information that is generated when collaboration is performed using collaboration services provided by the server 100.

Figure 7:
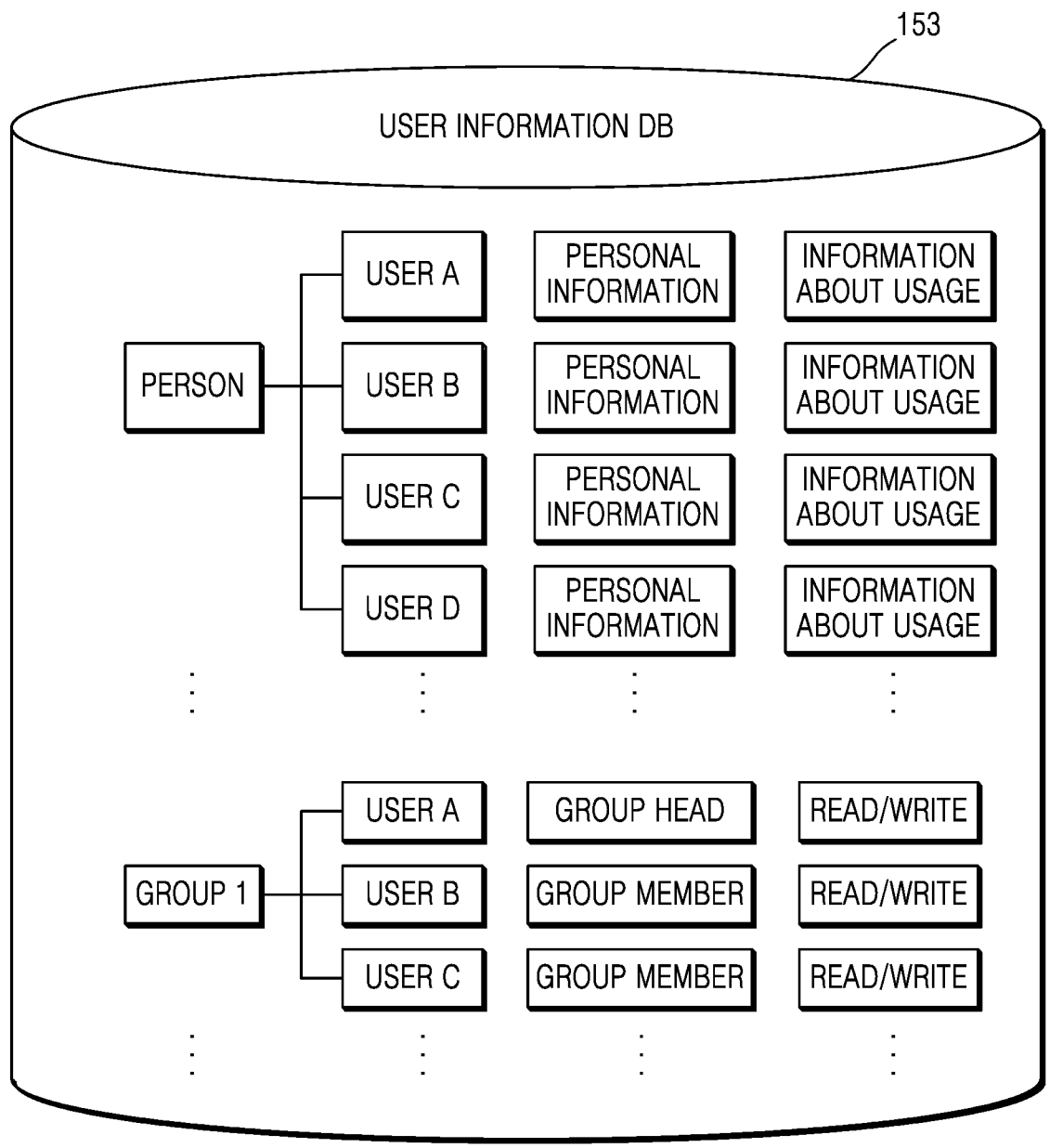
FIG. 7 illustrates a user information DB that may be stored in a memory of a server for providing collaboration services according to an exemplary embodiment.

FIG. 7 illustrates the user information DB 153 that may be stored in the memory 150 of the server 100 for providing collaboration services according to an exemplary embodiment.

Referring to FIG. 7, the user information DB 153 may store personal information about each user of the collaboration services and information about group members in each group. The user information DB 153 may store, for each user, a unique identifier such as an account for gaining access to the server 100, personal information stored in the server 100, and information about usage of the collaboration services provided by the server 100. The personal information stored in the server 100 may be various types of data and applications uploaded to the server 100. The information about usage of the collaboration services provided by the server 100 may be information representing a period during which a user is allowed to use the collaboration services or authority to use the collaboration services.

Figure 8:
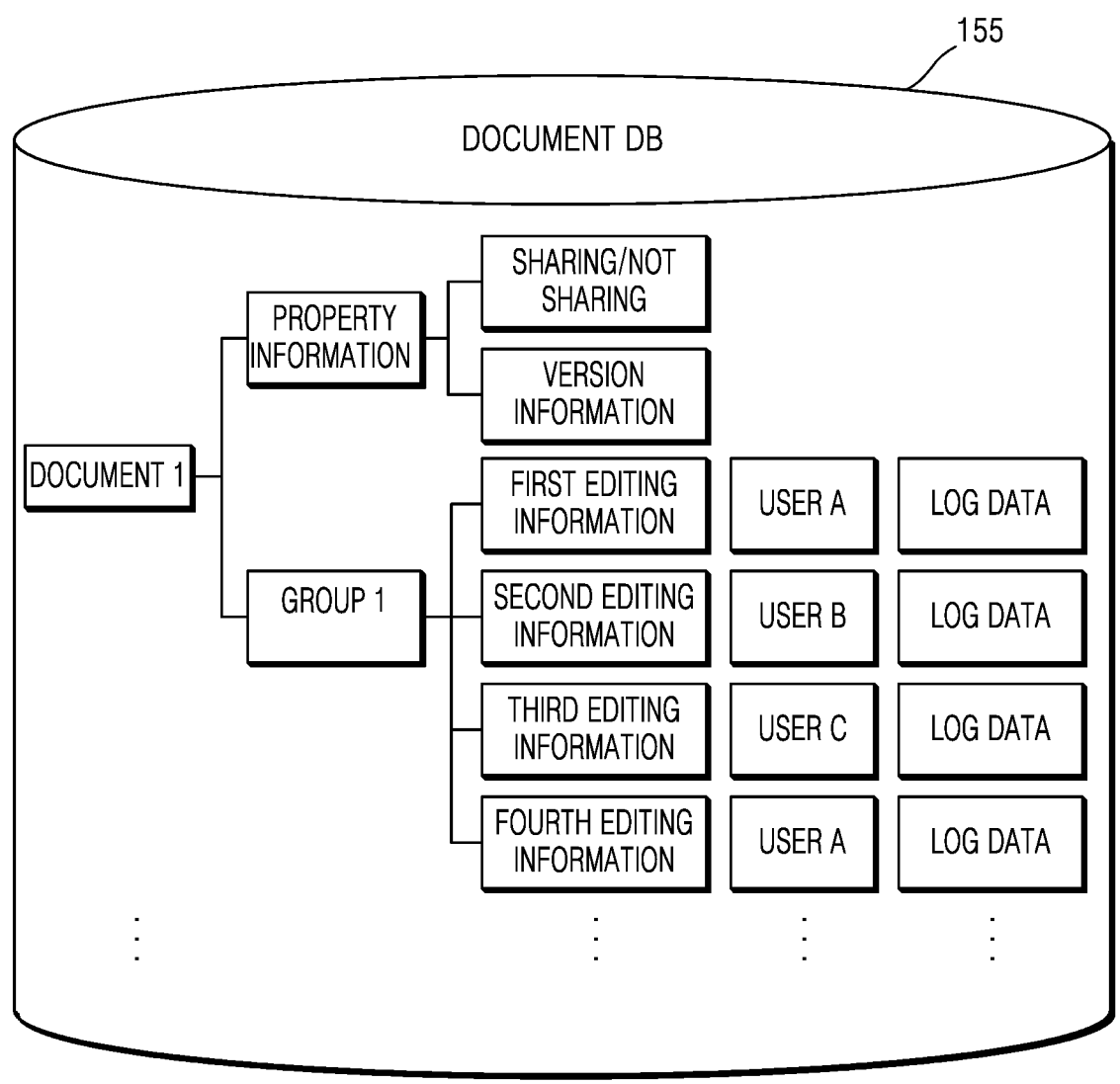
FIG. 8 illustrates a document DB that may be stored in a memory of a server for providing collaboration services according to an exemplary embodiment.

FIG. 8 illustrates the document DB 155 that may be stored in the memory 150 of the server 100 providing collaboration services according to an exemplary embodiment.

Referring to FIG. 8, the document DB 155 may store documents that are created or edited by using the server 100. As illustrated in FIG. 8, the document DB 155 may store property information of a document that may include information about sharing/not sharing of the document and version information. When the document is edited using the collaboration services, the document DB 155 may store editing information about each user along with an account of a user that edits the document and log data that is used for synchronization.

In addition, if collaborative writing requiring security is performed, the server 100 may have a separate security-enhanced region where documents and editing information are separately stored. The security document DB 158 may store documents that are created or edited by using the server 100 like the document DB 155, but the security document DB 158 may be a DB whose security is further enhanced. For example, documents stored in the security document DB 158 may be double or triple encrypted for storage, or authentication of a user or user terminal may be required to execute the documents or use collaboration services that allow editing of the documents. The authentication of a user or user terminal may be performed based on, for example, a password, an authentication key, a personal identification number (PIN), biological information, a public key certificate, a medium access control (MAC) address, and/or approval via a phone.

Furthermore, documents stored in the security document DB 158 may be provided only when users pay separate fees for use thereof or users are located at specific places.

When a collaboratively edited document is stored in the security document DB 158 in this way, management operations such as, for example, creation, editing, storage, and deletion, may be performed via the security document DB 158. For example, if editing information is received from the user terminal 200, the server 100 may perform activities that may occur during editing of a document via the security document DB 158, such as, for example, temporary storage of previous documents and editing information, storage of a result of editing, and/or storage of editing commands.

In detail, a method of determining, by a user, a document to be stored in the security document DB 158 will be explained in detail below by describing exemplary embodiments where a group using collaboration services is created and a collaboratively edited document is stored.

Figure 9:
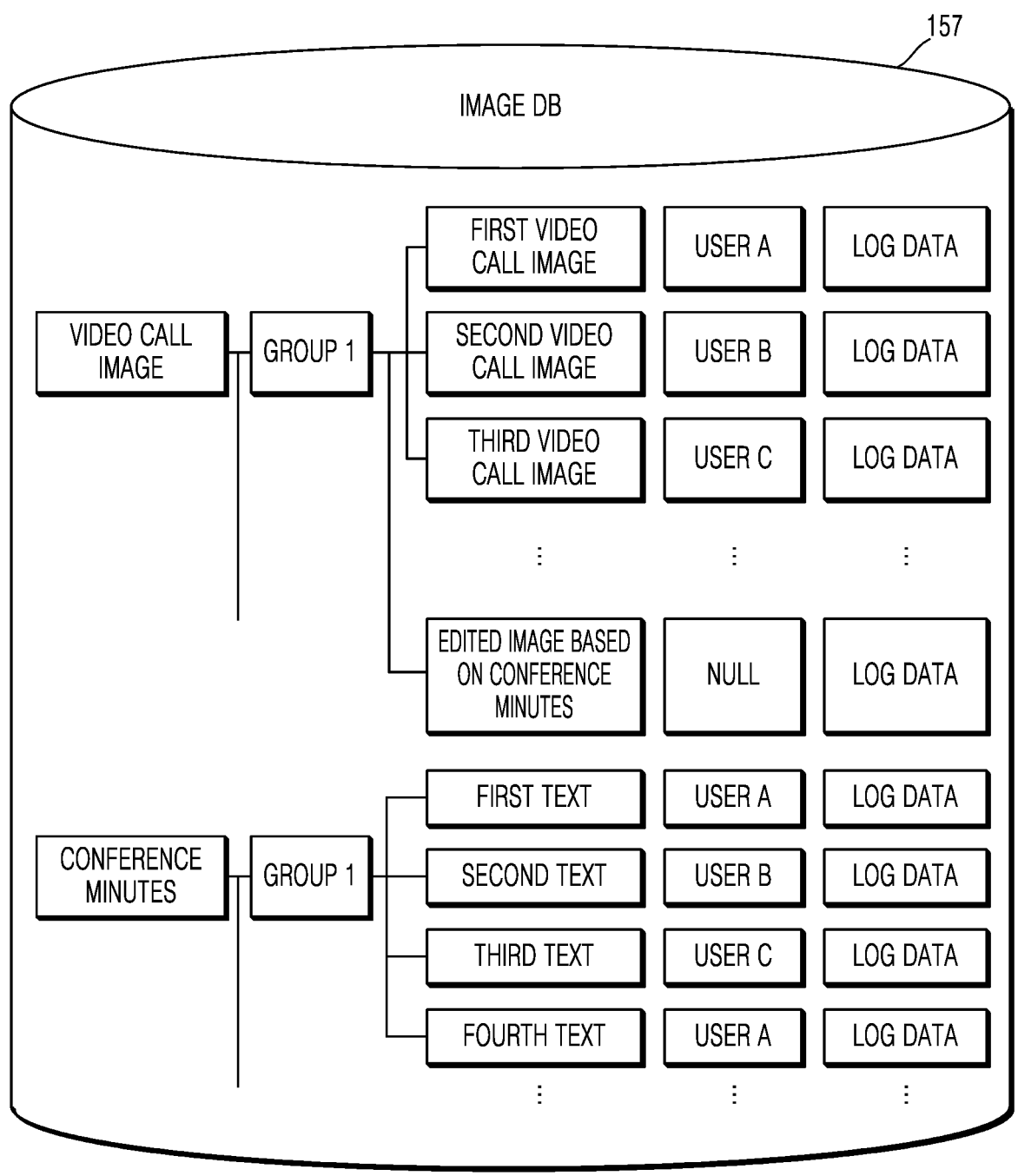
FIG. 9 illustrates an image DB that may be stored in a memory of a server for providing collaboration services according to an exemplary embodiment.

FIG. 9 illustrates the image DB 157 that may be stored in the memory 150 of the server 100 for providing collaboration services according to an exemplary embodiment.

Referring to FIG. 9, the image DB 157 may store a video call image associated with each of users who edit a document collaboratively and a conference minutes generated based on a voice included in the video call image associated with each user. As illustrated in FIG. 9, the image DB 157 may store a video call image associated with each user together with an account of each user and log data, for each group who edits the document collaboratively. The image DB 157 may also store, for each group, a conference minutes along with an account of a user who speaks each text and log data used for synchronization.

Referring back to FIG. 3, the above-described components of the server 100 may be given different names than those described above. Furthermore, the server 100 for providing collaboration services according to the present embodiment may include at least one of the above-described components. The server 100 may not include some of the components or may further additional components. The server 100 may perform the following operations by using at least one of the above-described components.

The server 100 for providing collaboration services that allow collaborative editing of a document may receive a video call image associated with each of users who edit the document collaboratively and editing information about the document from user terminals that request the collaboration services and store the received video call image associated with each user, conference minutes generated based on a voice included in the video call image associated with each user, and the document that is collaboratively edited according to the received editing information.

In addition, the server 100 may synchronize the document to the conference minutes so that users may identify context information while editing the document collaboratively. In other words, the server 100 may synchronize the document to the conference minutes so that a user may identify the status of the document being collaboratively edited through a text contained in the conference minutes.

Synchronization refers to matching the times when events are performed. Synchronization may also include matching the times of occurrence of events already performed. Furthermore, it may mean simultaneous occurrence of events or adjusting a time interval at which events occur so that they are performed within a predetermined range. For example, a text (e.g., a text included in conference minutes) spoken by a user who collaborates with other users to edit a document may be synchronized to the document that is collaboratively edited at the time when the text is generated. In this case, synchronizing to a document may include synchronizing a text spoken by a user to editing information about the document that is edited at the time when the text is generated or to the result of editing of the document according to the editing information. The result of editing may be a document edited according to the editing information or a part of the edited document. If the result of editing is a part of the edited document, the editing information may be the same as the result of editing. For example, if the editing information is an input text that a user desires to add to a document, the result of editing may be an edited document having the input text therein.

Furthermore, synchronization may include correlating a plurality of tasks that occur simultaneously or almost simultaneously (e.g., in less than 5 second) with one another. In this case, correlating the plurality of tasks may mean that the plurality of tasks are clustered into a group and managed together, or the times when the plurality of tasks are executed (e.g., are stored, output, or displayed) are matched to each other.

In exemplary embodiments, for example, if a user edits a document while discussing a conference detail via a voice, synchronization may include connecting editing information or result of editing with a text spoken by the user at the time when the editing information is received by the server 100 or when the result of editing is generated in the server 100. In this case, information about the synchronization and connection between the editing information or the result of editing and the text spoken by the user may be stored in the memory 150.

Furthermore, synchronization may include correlating a plurality of tasks that occur together for a short period (e. g., in less than 10 minutes) with each other. Alternatively, synchronization may include correlating with one another some of a plurality of tasks that occur over a specific period (e.g., in less than 5 minutes) before or after one of the plurality of tasks occurs.

In this case, correlating a plurality of tasks may mean that the plurality of tasks that occur together over a short period are clustered into a group and managed together, or the times when the plurality of tasks are executed (e.g., are stored, output, or displayed) are matched to each other.

For example, while entering or copying a text 'patent strategy' in or to a document that is collaboratively edited between 3:10 pm and 3:15 pm, a user may utter a voice 'highly important' during the same time interval. In this case, the voice may be converted into a text and then stored in conference minutes.

In this situation, the text 'patent strategy' entered or copied between 3:10 pm and 3:15 pm may interconnect with the text 'highly important' uttered by the user. For example, interconnecting texts may mean, if one text is displayed later, displaying the other text together. Interconnecting the result of editing with a text spoken by the user in this way may be referred to as both being synchronized to each other.

The server 100 may also generate an edited image based on conference minutes by extracting a portion corresponding to each of texts in the conference minutes from a video call image associated with each user, so that a user may identify context information while editing the document collaboratively. Since the edited image based on the conference minutes are deemed as being synchronized to the conference minutes, and the conference minutes are synchronized to the document, the edited image, the conference minutes, and the document are synchronized to one another.

Furthermore, the server 100 may synchronize the conference minutes and the document to the video call image associated with each user for storage.

In addition, during reviewing after editing the document collaboratively, users may identify context information existed at the time of collaborative editing by using various types of images synchronized to the document.

Figure 10:
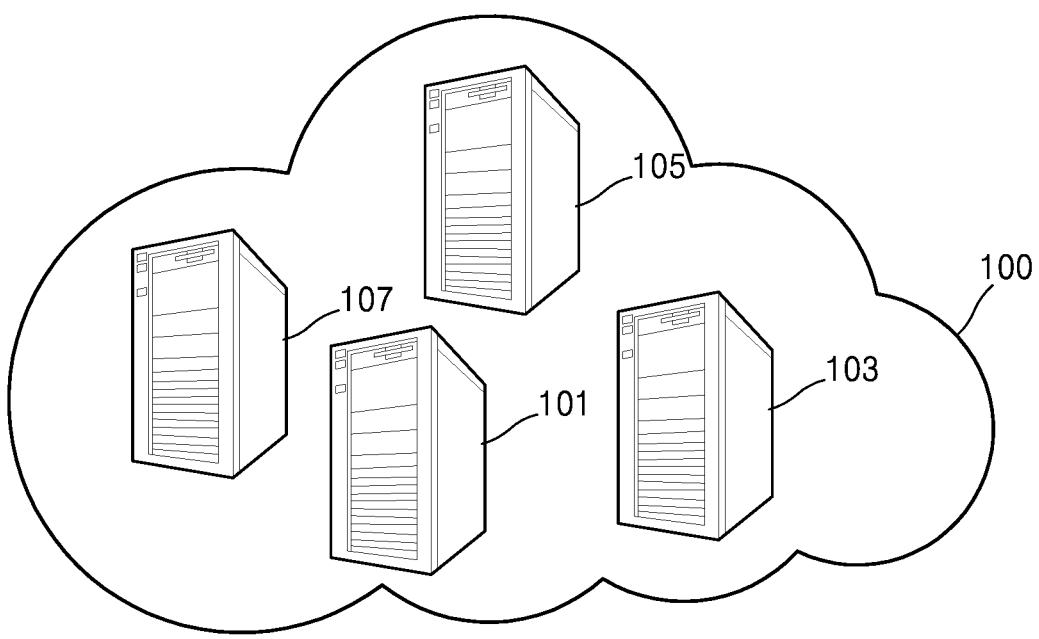
FIG. 10 is a diagram illustrating a server for providing collaboration services is implemented as a plurality of dispersed servers according to another exemplary embodiment.

FIG. 10 is a diagram illustrating the server 100 for providing collaboration services is implemented as a plurality of dispersed servers according to another exemplary embodiment. Even if omitted, the above descriptions with respect to the server 100 may be applied to the server 100 shown in FIG. 10.

Referring to FIG. 10, dispersed servers for providing collaboration services may include an integrated management server 101, a user management server 103, a document management server 105, and an image management server 107. Unlike in the server 100 of FIG. 3, various processors integrated into the controller 130 and various databases stored in the memory 150 are implemented as the plurality of dispersed servers.

One of the integrated management server 101, the user management server 103, the document management server 105, and the image management server 107 may perform communication with another server and exchange various types of data with each other. For example, the integrated management server 101 may perform communication with the user terminal 200 to transmit received information and requests related to collaboration services to at least one selected from the user management server 103, the document management server 105, and the image management server 107. The integrated management server 101 may also acquire a response to the transmission from another server and provide the collaboration services to the user terminal 200. When the server 100 is implemented as the plurality of dispersed servers in this way, this configuration may facilitate maintenance and management of the server 100.

Figure 11:
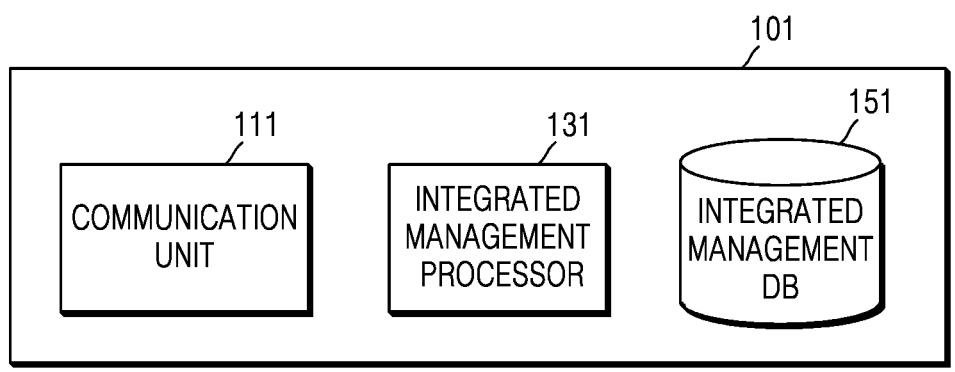
FIG. 11 is a block diagram of an integrated management server as one of dispersed servers for providing collaboration services according to another exemplary embodiment.

FIG. 11 is a block diagram of the integrated management server 101 as one of dispersed servers for providing collaboration services according to another exemplary embodiment.

Referring to FIG. 11, the integrated management server 101 may include a communication unit 111, an integrated management processor 131, and an integrated management DB 151. The descriptions of the integrated management processor 131 shown in FIG. 4 and the integrated management DB 151 shown in FIG. 6 may be applied to the integrated management processor 131 and the integrated management DB 151. It will be understood by one of ordinary skill in the art that the integrated management server 101 may further include other common components in addition to those illustrated in FIG. 11.

The integrated management server 101 may request the user management server 103 to confirm whether a user who connects to the server 100 for providing collaboration services is authorized to use the collaboration services. The integrated management server 101 may also request the document management server 105 to edit a document according to editing information received from the user terminal 200, or acquire documents stored in the document management server 105. The integrated management server 101 may also store video call images or conference minutes used in collaboration services in the image management server 107 or acquire images stored in the image management server 107. The integrated management server 101 may use user information and log data in order to acquire an image and/or a document synchronized to each other. For example, the integrated management server 101 may acquire all texts in conference minutes and editing information about a document that is collaboratively edited, which have the same user information and log data, and provide collaboration services that use the conference minutes and the document synchronized to each other to the user terminal 200.

Figure 12:
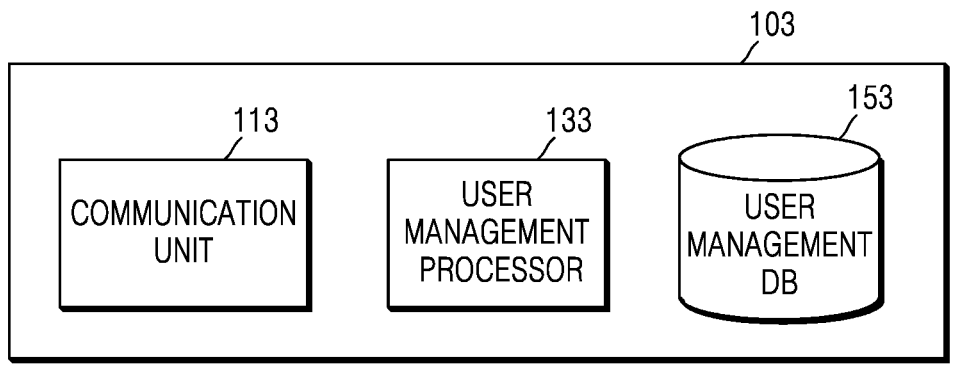
FIG. 12 is a block diagram of a user management server as one of dispersed servers for providing collaboration services according to another exemplary embodiment.

FIG. 12 is a block diagram of the user management server 103 as one of dispersed servers for providing collaboration services according to another exemplary embodiment.

Referring to FIG. 12, the user management server 103 may include a communication unit 113, a user management processor 133, and user information DB 153. The descriptions of the user management processor 133 shown in FIG. 4 and the user information DB 153 shown in FIG. 7 may be applied to the user management processor 133 and the user information DB 153. It will be understood by one of ordinary skill in the art that the integrated management server 103 may further include other common components in addition to those illustrated in FIG. 12.

The user management server 103 may manage information about a plurality of users who use collaboration services. The user management processor 133 may manage personal information about each user and information about group members in each group. User information used in user management and user information that is generated, modified, and deleted according to the user management may be stored in the user information DB 153.

Figure 13:
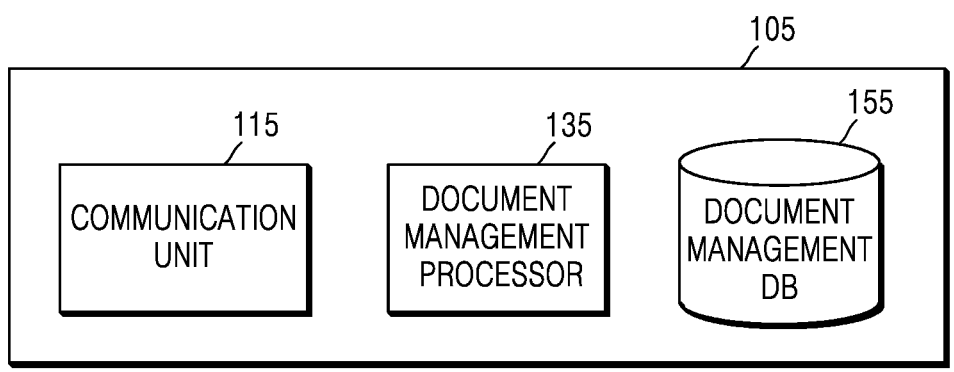
FIG. 13 is a block diagram of a document management server as one of dispersed servers for providing collaboration services according to another exemplary embodiment.

FIG. 13 is a block diagram of the document management server 105 as one of dispersed servers for providing collaboration services according to another exemplary embodiment.

Referring to FIG. 13, the document management server 105 may include a communication unit 115, a document management processor 135, and a document DB 155. In order to perform collaborative writing requiring security, the document management server 105 may further include a security document DB 158. The descriptions of the document management processor 135 shown in FIG. 4 and the document DB 155 shown in FIG. 8 may be applied to the document management processor 135 and the document DB 155. It will be understood by one of ordinary skill in the art that the document management server 105 may further include other common components in addition to those illustrated in FIG. 13.

The document management server 105 may perform overall control over a document that is edited collaboratively according to editing information thereof. Document information used for document management and documents that are generated, modified, and deleted according to the document management may be stored in the document DB 155. The document management server 105 may also communicate with other servers via the communication unit 115. For example, the document management server 105 may receive a request for editing of a document stored therein or documents via the communication unit 115.

Figure 14:
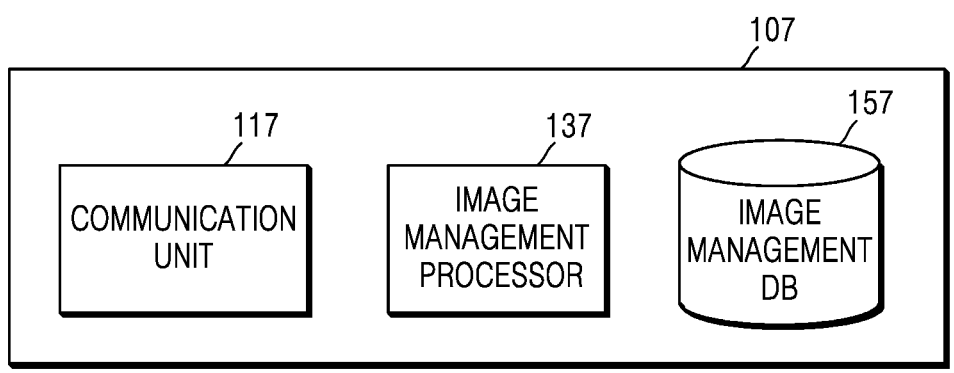
FIG. 14 is a block diagram of an image management server as one of dispersed servers for providing collaboration services according to another exemplary embodiment.

FIG. 14 is a block diagram of the image management server 107 as one of dispersed servers for providing collaboration services according to another exemplary embodiment.

Referring to FIG. 14, the image management server 105 may include a communication unit 117, an image management processor 137, and an image DB 157. The descriptions of the image management processor 137 shown in FIG. 4 and the image DB 157 shown in FIG. 9 may be applied to the image management processor 137 and the image DB 157. It will be understood by one of ordinary skill in the art that the document management server 107 may further include other common components in addition to those illustrated in FIG. 14.

The image management server 107 may perform overall control over a video call image associated with each of users who are collaboratively edited and conference minutes generated based on a voice contained in the video call image associated with each user. The image management server 107 may also communicate with other servers via the communication unit 117. For example, the image management server 107 may receive a request for an image stored therein or receive images to be stored therein via the communication unit 117.

Figure 15:
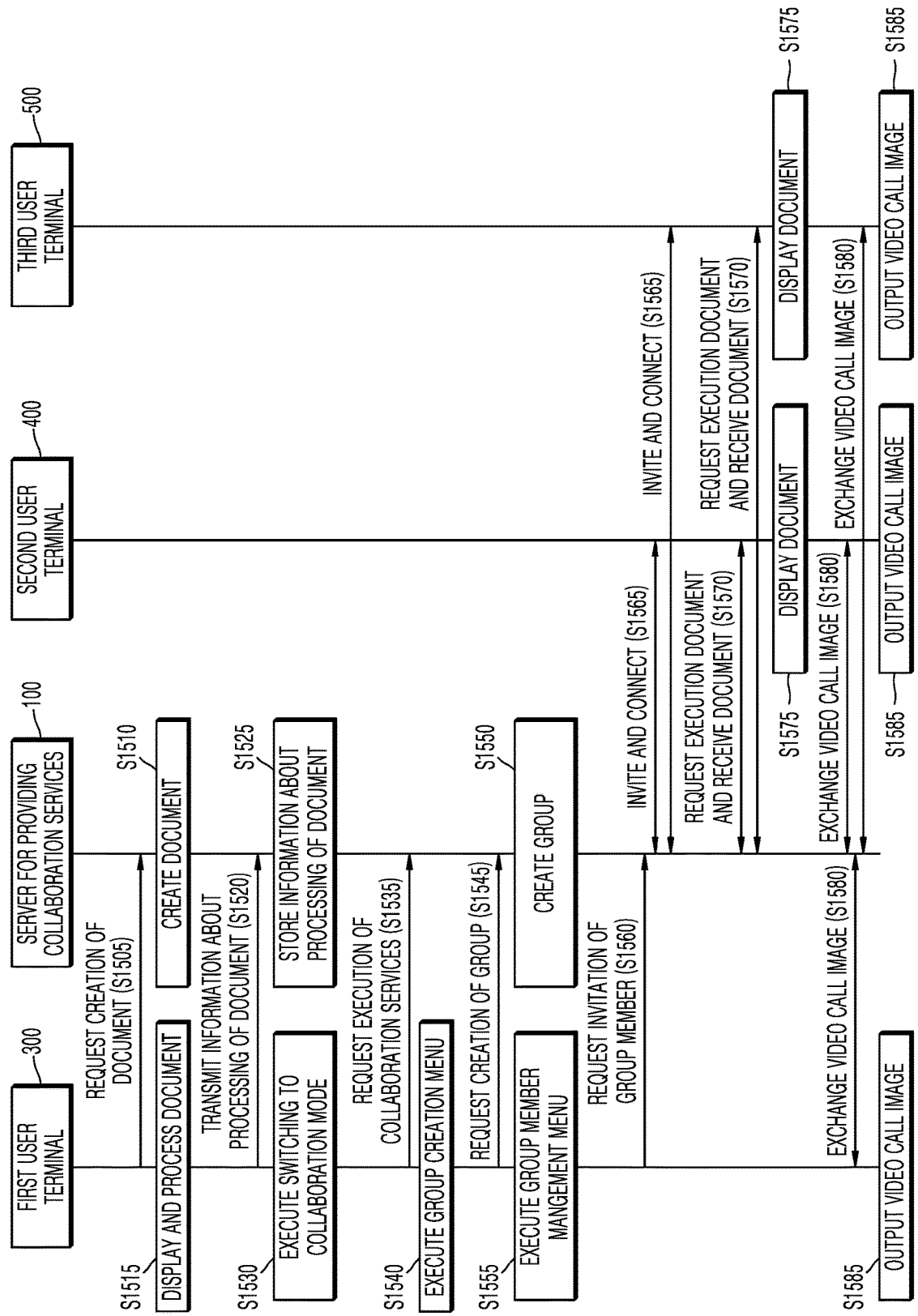
FIG. 15 illustrates a process of initiating collaboration services upon request for execution of the collaboration services while processing a document by using a server for providing the collaboration services according to an exemplary embodiment.

FIG. 15 illustrates a process of initiating collaboration services upon request for execution of the collaboration services while processing a document by using a server 100 for providing the collaboration services, according to an exemplary embodiment. In detail, FIG. 15 illustrates a process of preparing reception of the collaboration services. When a first user requests execution of collaboration services while processing a document by using the server 100, the collaboration services are provided so as to edit the document collaboratively through a video conference with group members. However, exemplary embodiments are not limited to the process of preparing reception of the collaboration services.

A program used for processing a document may be installed on the server 100. The first user may log in to the server 100 using his or her user account via a first user terminal 300 and request execution of the program used for processing a document on the server 100. Second and third users may log in to the server 100 using their user accounts and receive collaboration services provided by the server 100.

Referring to FIG. 15, the first user terminal 300 may request creation of a document from the server 100 (operation S1505). Since a program used for processing a document is installed on the server 100, the first user may log in to the server 100 and request creation of a document having a desired format.

The server 100 creates the document according to the request from the first user terminal 300 (operation S1510).

The first user terminal 300 displays the document created by the server 100 on a screen thereof, and the first user may process the document through the screen (operation S1515). In this case, the document executed on the sever 100 may be displayed on a web browser screen that is executed on the first user terminal 300. In other words, the server 100 provides a web-based document to the first user terminal 300, and the first user terminal 300 may view the web-based document through the web browser screen.

The first user terminal 300 may transmit information about processing of the document to the server 100 (operation S1520). A time interval at which the information about processing of the document is transmitted may be adjusted. The first user terminal 300 may transmit the information about processing of the document to the server 100 each time events related to processing of the document occur.

The server 100 may store the information about processing of the document received from the first user terminal 300 (operation S1525).

The first user may select execution of switching to a collaboration mode in the first user terminal 300 (operation S1530).

The first user terminal request execution of the collaboration services from the server 100 (operation S1535). A state of the first user terminal 300 that requests execution of the collaboration services will now be described with reference to FIG. 16.

Figure 16:
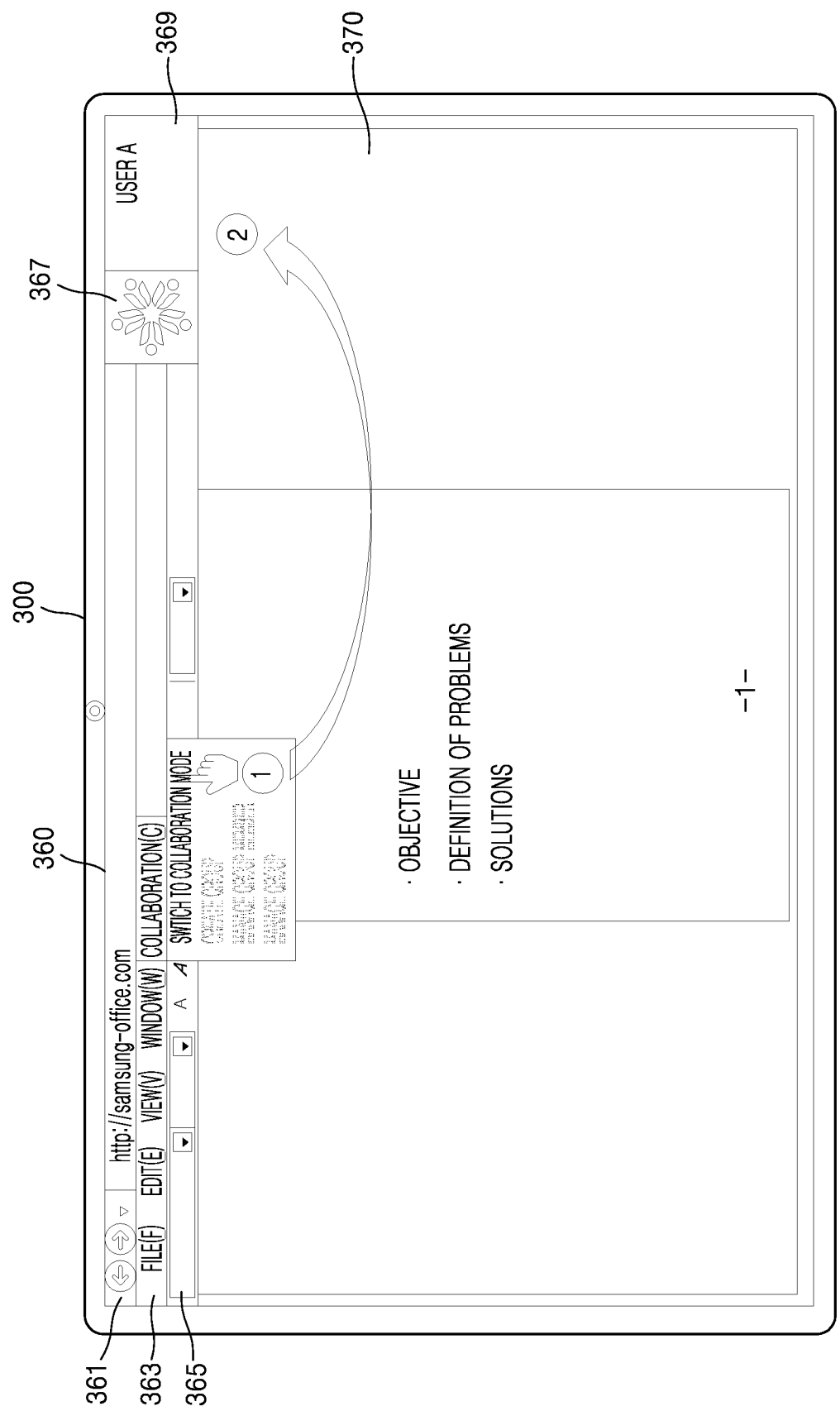
FIG. 16 illustrates an example where a user terminal for receiving collaboration services requests the execution of the collaboration services, according to an exemplary embodiment.

FIG. 16 illustrates an example where the first user terminal 300 for receiving collaboration services requests the execution of the collaboration services, according to an exemplary embodiment. In detail, FIG. 16 shows a user interface screen 360 of the first user terminal 300. From top to bottom, the user interface screen 360 includes an address window 361 for entering an address of the server 100, a menu bar 363, and a ribbon menu bar 365. The menu bar 363 and the ribbon menu bar 365 may have different shapes according to the type of a program executed on the server 100.

First, the first user may select a "Collaboration" menu in the menu bar 363, click on (or touches) "Switch to collaboration mode" in a displayed submenu, and execute switching to a collaboration mode.

Then, upon request for execution of switching to a collaboration mode from the first user, a mode indicator 367 indicating that a current mode is a collaboration mode and an access user display window 369 showing users who gain access to a current document appear at the top right side of the user interface screen 360. A window 370 showing a document being collaboratively edited may be displayed below the ribbon menu bar 365.

Referring back to FIG. 15, the first user may execute a group creation menu in the first user terminal 300 (operation S1540).

The first user terminal 300 may request creation of a group from the server 100 (operation S1545).

Figure 17:
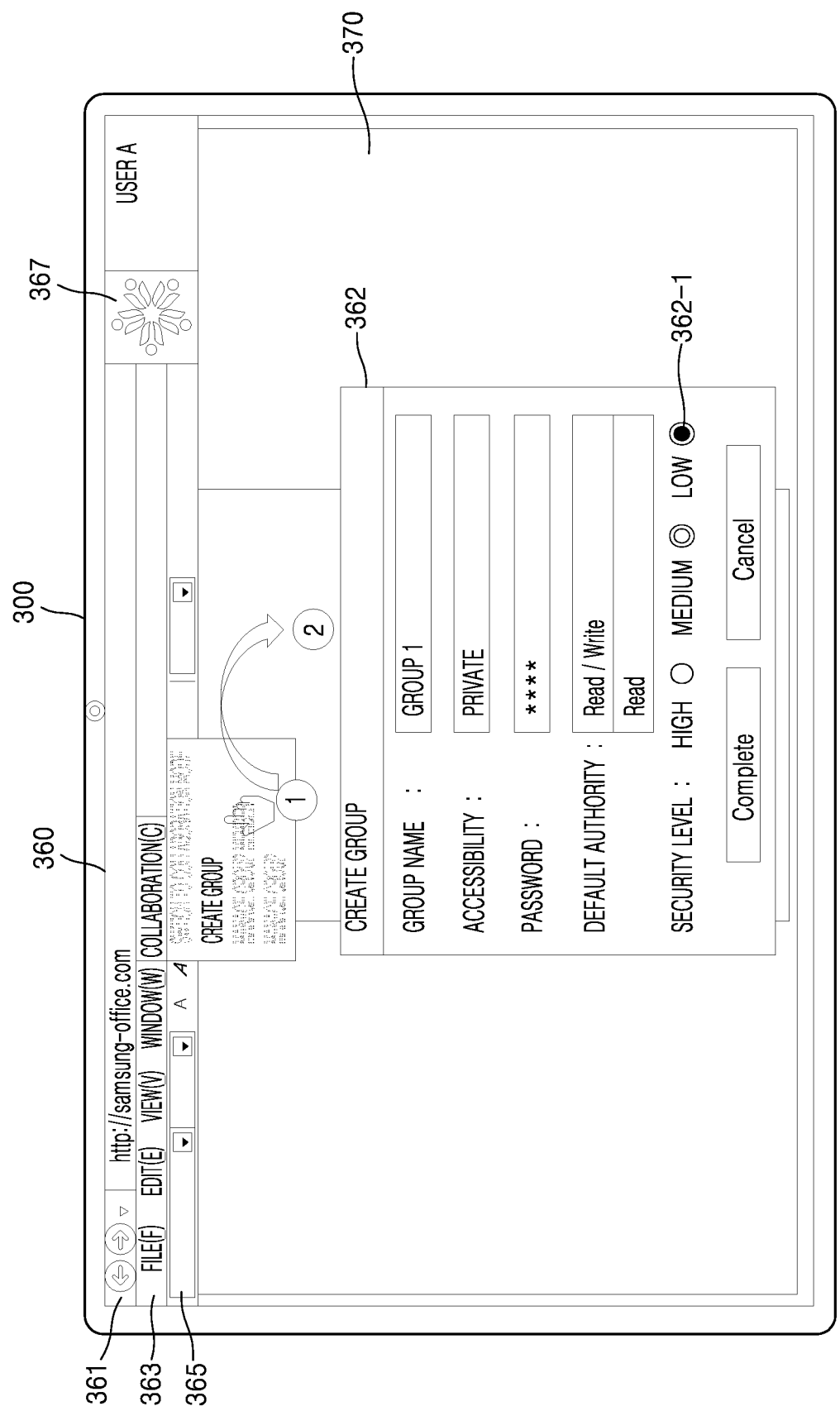
FIG. 17 illustrates an example where a user terminal for receiving collaboration services requests the creation of a group, according to an exemplary embodiment.

FIG. 17 illustrates an example where the first user terminal 300 for receiving collaboration services requests the creation of a group, according to an exemplary embodiment. On the user interface screen 360 of the first user terminal 300, the first user may select a "Collaboration" menu in the menu bar 363 between the address window 361 and the ribbon menu bar 365 and then "Create group" in a displayed submenu.

Selecting "Create group" displays a Create Group window 362 on the user interface screen 360 of the first user terminal 300. In order to create a group, the first user may enter appropriate values in group name, accessibility, password, and default authority and press a complete button. As shown in FIG. 17, the first user may select and enter "Group 1', "Private", "'**'" (not displayed so that other users cannot view it), and "Read/Write" in the group name, accessibility, password, and default authority, respectively. In this case, if the first user sets a password, group members are allowed to use collaboration services by participating in a created group via an input of the password. Furthermore, the Create Group window 362 may further include a menu 362-1 for selecting a mode for setting a security level of a document that is edited via collaboration services. For example, if buttons for respectively setting security levels to high, medium, and low are provided via the menu 362-1**, a user may determine a security level of a document on which group members collaboratively execute collaboration services by selecting one of buttons corresponding to high, medium, and low.

According to an exemplary embodiment, if the user sets a security level to high, a document that is edited via collaboration services may be stored in the security document DB 158. Furthermore, if the user sets the security level to medium, a document that is edited via collaboration services may be stored in the document DB 155 but may require further authentication in addition to an input of a corresponding password. Furthermore, if the user sets the security level to low, a document on a created group works may be stored in the document DB 155 and may be accessed by any user without requiring an input of a password or without a password.

According to another exemplary embodiment, if the user sets a security level to high, group members who participate in collaboration services may be restricted. For example, participation in a group may be restricted only to users who are located at places that are within a predetermined range away from the first user or at predesignated places. Alternatively, users who access via a predesignated IP band may only be allowed to participate in the group. As another example, users who access via predesignated device identification information (e.g., a MAC address, etc.) may only be allowed to participate in the group.

According to another exemplary embodiment, if the user sets a security level to high, execution of another application may be restricted while a document is being edited via collaboration services. For example, execution of another application on a user terminal may be restricted to prevent capturing, copying or transmission of a document being edited.

According to another exemplary embodiment, if the user sets a security level to high, the complexity of encryption of a document being edited via collaboration services may be increased when the document is being stored. This increased complexity of encryption may increase the time taken to store the document being edited but further enhance security of the document.

According to another exemplary embodiment, if the user sets a security level to high, the server 100 may transmit a document being edited to a user terminal via a separate security channel. For example, the server 100 may convert a document being edited into an image to provide the image to the user terminal in the form of stream data via the security channel. If the document being edited is an image, security of the document may be further enhanced because the user terminal has difficulty in parsing the structure, content, or text of the document.

Referring back to FIG. 15, the server 100 may create a group according to the request from the first user terminal 300 (operation S1550). According to the example described above, a private group having a group name "Group 1" may be registered with the server 100, and the first user (e.g., user A) may be a current group member in Group 1.

The first user terminal 300 may execute a group member management menu (operation S1555).

The first user terminal 300 may request invitation of a group member from the server 100 (operation S1560). Management of a group member will now be described in more detail with reference to FIG. 18.

Figure 18:
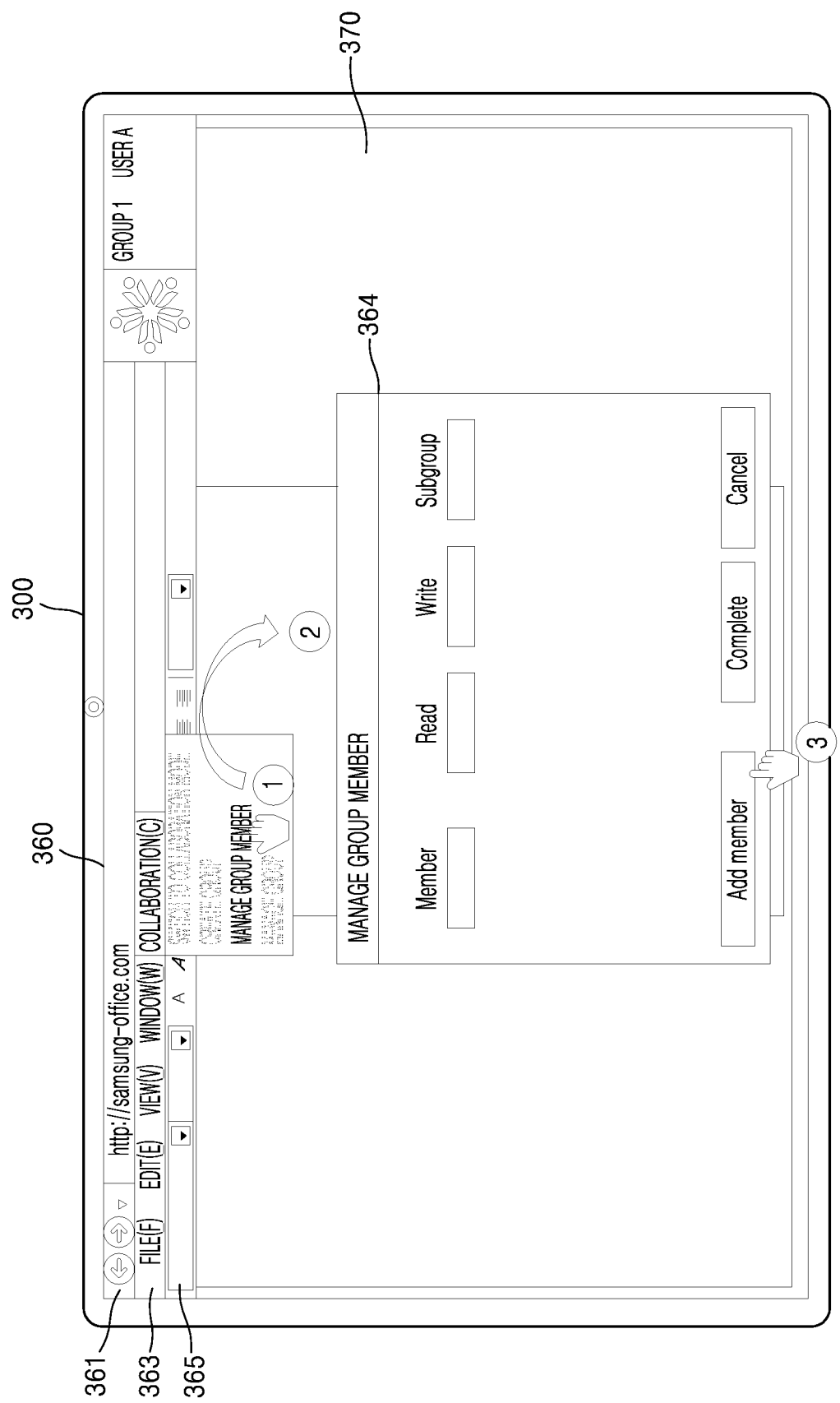
FIG. 18 illustrates an example where a user terminal for receiving collaboration services perform management of a group member, according to an exemplary embodiment.

FIG. 18 illustrates an example where the first user terminal 300 for receiving collaboration services performs management of a group member, according to an exemplary embodiment.

On the user interface screen 360 of the first user terminal 300, the first user may select a "Collaboration" menu in the menu bar 363 between the address window 361 and the ribbon menu bar 365 and then "Manage group member" in a displayed submenu.

Then, a Manage Group Member window 364 may be displayed on the user interface screen 360 of the first user terminal 300. The first user may request invitation of a group member from the server 100 by pressing an "Add member" button.

Referring back to FIG. 15, the server 100 may invite second and third user terminals 400 and 500, and the second and third user terminal 400 and 500 may connect to the server 100 (operation S1565).

In this case, if the first user sets a password during creation of a group, the server 100 may receive passwords from the second and third user terminals 400 and 500. In this case, the passwords may be texts entered by group members, and may be encrypted before being transmitted to the server 100.

Upon receipt of the passwords, the server 100 may perform authentication of group members by determining whether the received passwords are the same as the password created by the first user. When the authentication is confirmed, the server 100 may provide the second and third user terminals 400 and 500 with rights to use collaboration services.

In addition, although a password is generally assigned to each group, a different password may be given to each group member. For example, the first and second user terminals 400 and 500 may use different passwords to participate in the group. Alternatively, only one of the second and third user terminals 400 and 500 may be required to enter its password.

The second and third user terminals 400 and 500 may request execution of a document that is collaboratively edited and receive a web-based document from the server 100 (operation S1570).

The second and third user terminals 400 and 500 may display a document being executed on the server 100 on screens of the second and third user terminals 400 and 500, respectively (operation S1575). In this case, the document executed on the sever 100 may be displayed on web browser screens that are executed on the second and third user terminals 400 and 500.

The first through third user terminals 300, 400, and 500 may exchange video call images with one another via the server 100 (operation S1580). The exchange of the video call images may continue until a request for termination of the collaboration services is made.

Video call images of other parties may be output to the first through third user terminals 300, 400, and 500, respectively (operation S1585). For example, video call images associated with second and third users may be output to the first user terminal 300.

Figure 19:
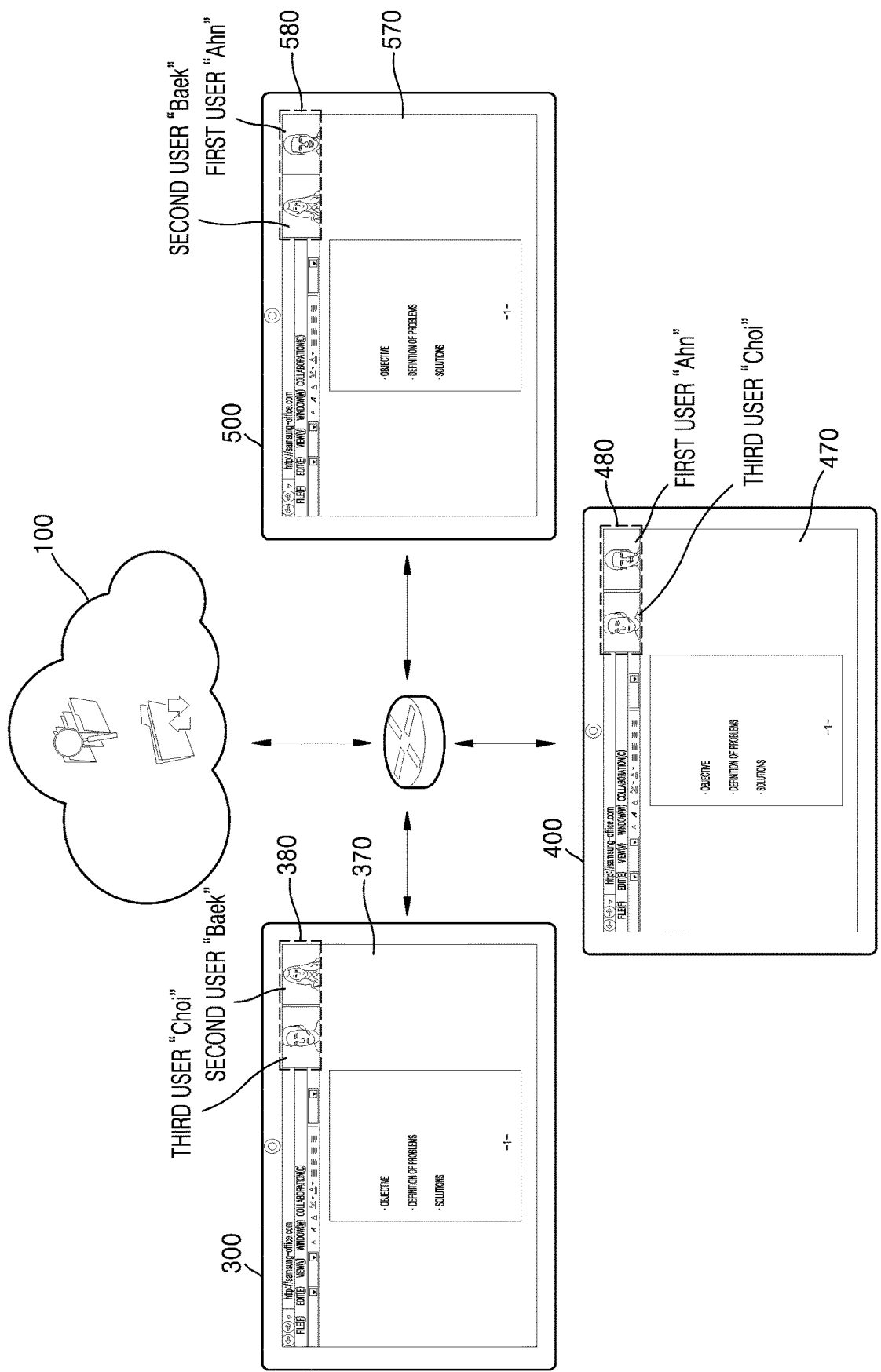
FIG. 19 illustrates a state of each user terminal when collaboration services are initiated while a document is being processed so that the user terminal is ready to edit the document collaboratively, according to an exemplary embodiment.

FIG. 19 illustrates states of the first through third user terminals 300, 400, and 500 when collaboration services are initiated while a document is being processed so that the first through third user terminals 300, 400, and 500 are ready to collaboratively edit the document, according to an exemplary embodiment. Referring to FIG. 19, the first through third user terminals 300, 400, and 500 may be connected to the server 100.

A window 370 showing a document being collaboratively edited and a window 380 showing video call images of second and third users (e.g., "Baek" and "Choi") may be displayed on the first user terminal 300.

Similarly, a window 470 showing a document being collaboratively edited and a window 480 showing video call images of first and third users (e.g., "Ahn" and "Choi") may be displayed on the second user terminal 400.

Likewise, a window 570 showing a document being collaboratively edited and a window 580 showing video call images of first and second users (e.g., "Ahn" and "Baek") may be displayed on the third user terminal 500. In an exemplary embodiment, the video call images may include moving visual images. In yet another exemplary embodiment, the moving visual images are processed using a video codec.

In one exemplary embodiment, the video call images may be still images of the first and the second users, while audio provided by the first and second users is played.

Figure 20:
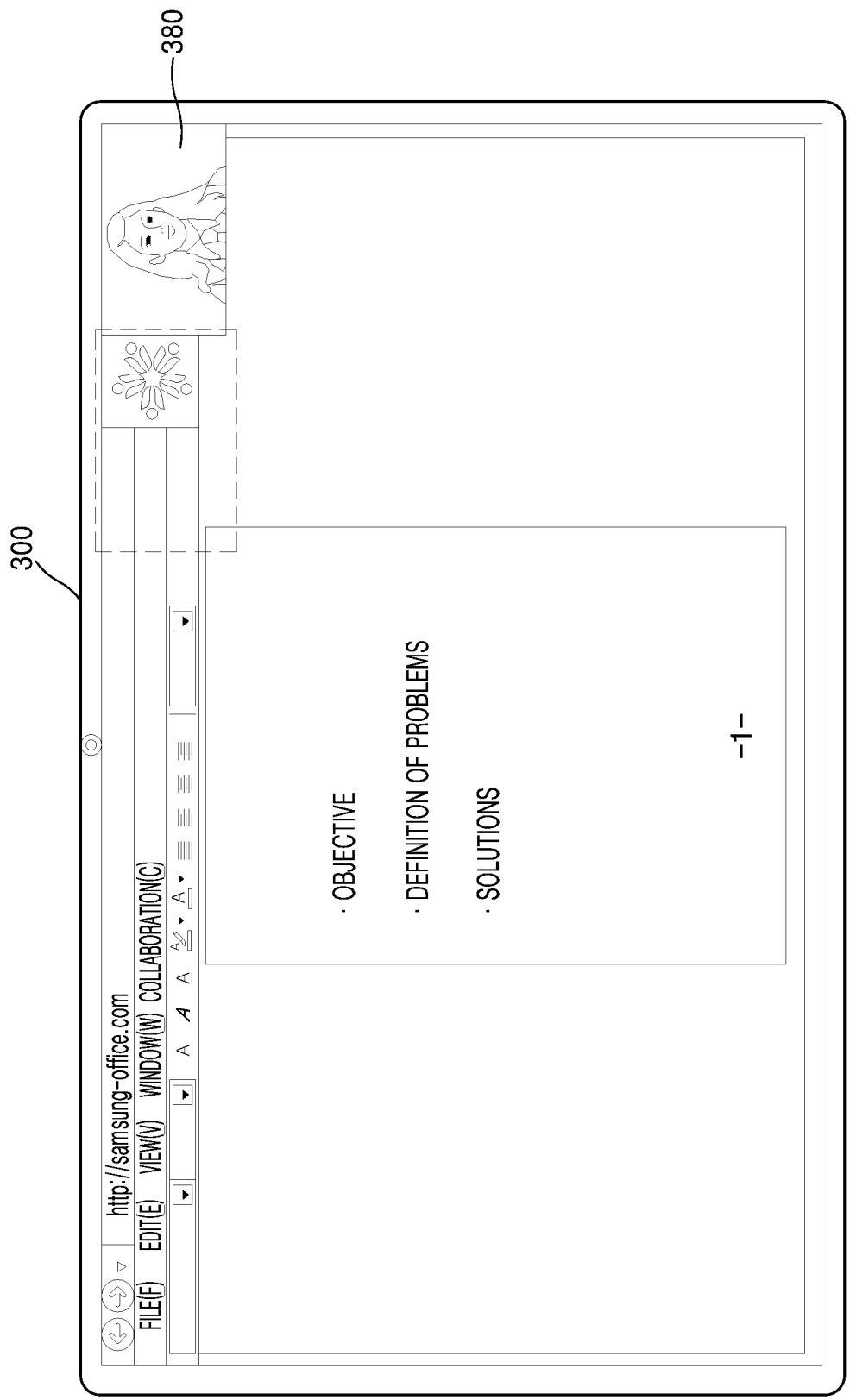
FIG. 20 illustrates a method whereby a user interface including an address window and a menu and a video call image are displayed on a user terminal for receiving collaboration services according to an exemplary embodiment.

FIG. 20 illustrates a method whereby a user interface including an address window and a menu and a video call image are displayed on a first user terminal 300 for receiving collaboration services according to an exemplary embodiment.

Referring to FIG. 20, a window 380 showing a video call image may be displayed on the right side of the first user terminal 300 on which an address window, a menu bar, and a ribbon bar are displayed. As described above with reference to FIG. 19, video call images of second and third users (e.g., "Baek" and "Choi") may appear in the window 380 on the first user terminal. However, the first user may manipulate video call images of some of the users who edit a document collaboratively so that they are not displayed on the first user terminal 300.

Figure 21:
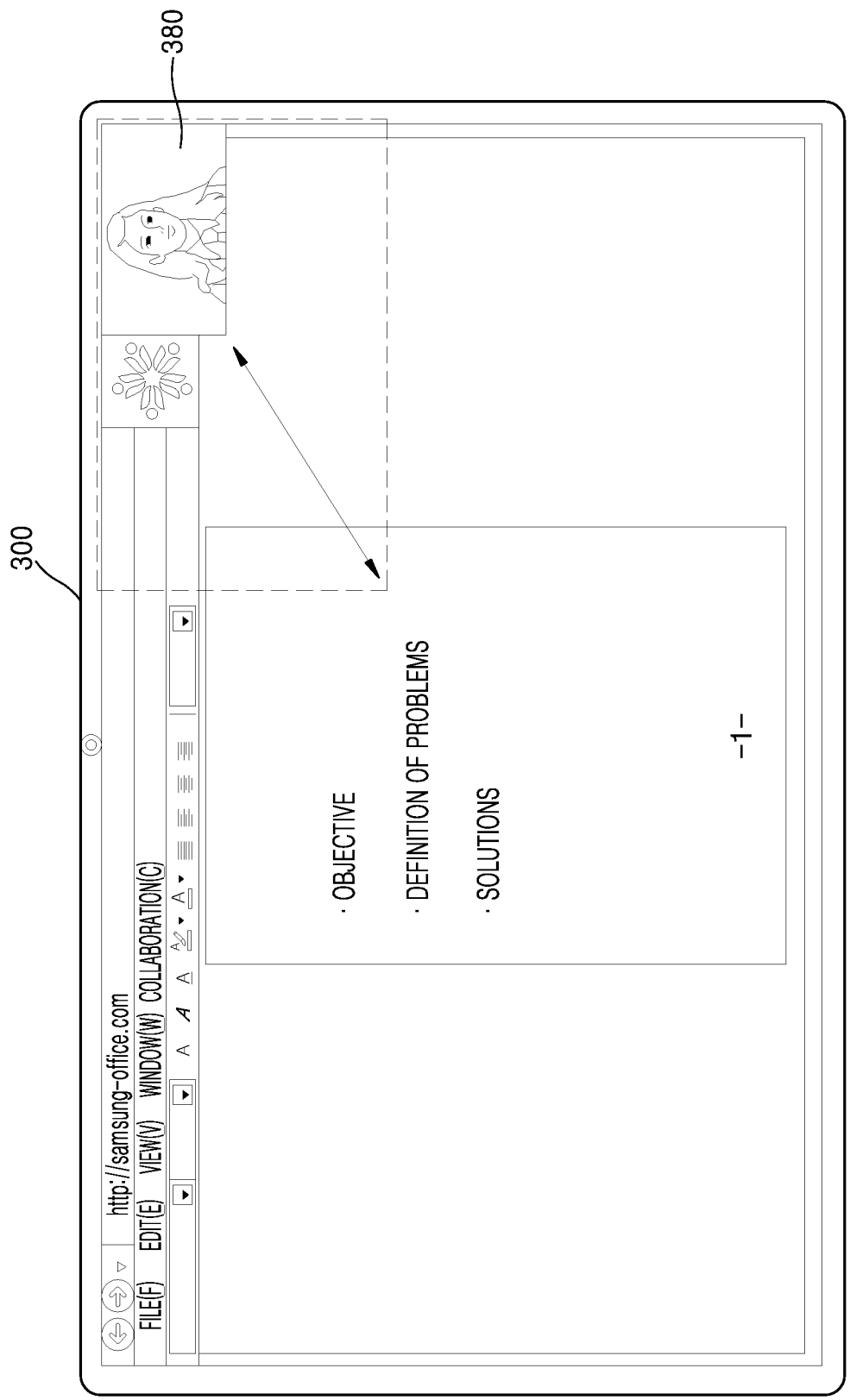
FIG. 21 illustrates a method whereby a video call image is displayed on a user terminal for receiving collaboration services according to an exemplary embodiment.

FIG. 21 illustrates a method whereby a video call image is displayed on a first user terminal 300 for receiving collaboration services according to an exemplary embodiment.

Referring to FIG. 21, a size of a window 380 showing a video call image displayed on the first user terminal 300 may be adjusted. In other words, it is possible to adjust a size of the window 380 showing a video call image displayed according to a default size preset in the first user terminal 300. The size of the window 380 may be adjusted using multi-finger gestures, a click-and-drag method, or the like.

Figure 22:
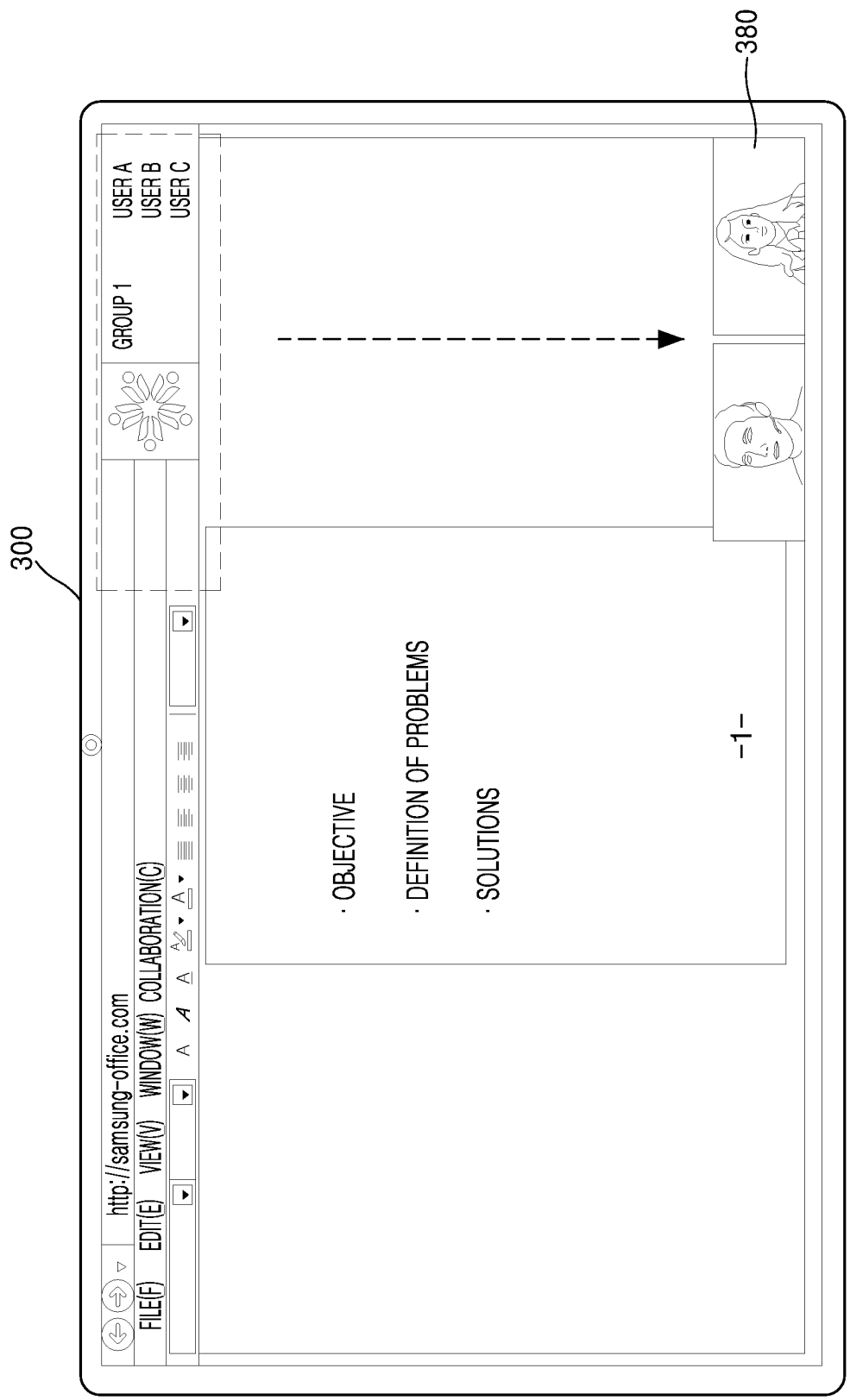
FIG. 22 illustrates another method whereby a video call image is displayed on a user terminal for receiving collaboration services according to an exemplary embodiment.

FIG. 22 illustrates another method whereby a video call image is displayed on a first user terminal 300 for receiving collaboration services according to an exemplary embodiment.

Referring to FIG. 22, a location of a window 380 showing a video call image displayed on the first user terminal 300 may be adjusted. In other words, it is possible to adjust a location of the window 380 showing a video call image displayed according to a default location preset in the first user terminal 300. The location of the window 380 may be adjusted using a drag-and-drop method or the like.

Figure 23:
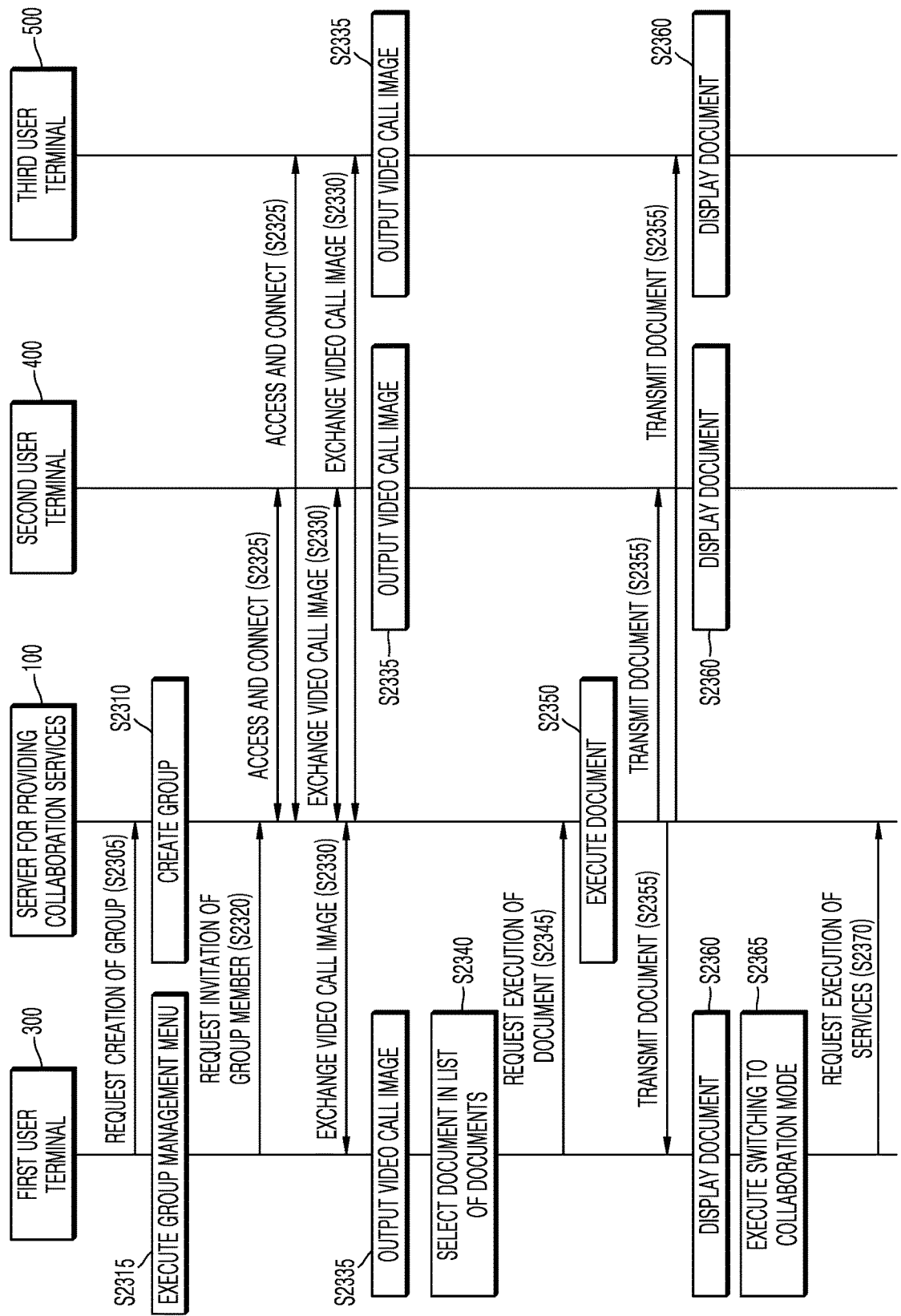
FIG. 23 illustrates a process of initiating collaboration services upon request for execution of the collaboration services during a video conference using a server for providing the collaboration services according to an exemplary embodiment.

FIG. 23 illustrates a process of initiating collaboration services upon request for execution of the collaboration services during a video conference using a server 100 for providing the collaboration services according to an exemplary embodiment. In detail, FIG. 23 illustrates a process of preparing reception of the collaboration services. When a first user runs a video conference a document by using the server 100, the collaboration services are provided so as to share a document and edit the document collaboratively during the video conference. However, embodiments are not limited to the process of preparing reception of the collaboration services.

Referring to FIG. 23, a first user terminal 230 may request creation of a group for a video conference from the server 100 (operation S2305).

The server 100 may create a group upon request from the first user terminal 300 (operation S2310).

The first user terminal 300 may execute a group member management menu (operation S2315).

The first user terminal 300 may request invitation of a group member for the video conference from the server 100 (operation S2320).

In this case, the creation of a group and invitation of a group member for the video conference may be performed in similar ways to those described above with reference to FIGS. 17 and 18.

The server 100 invites second and third user terminals 400 and 500, and the second and third user terminals 400 and 500 may connect to the server 100 (operation S2325).

The first through third user terminals 300, 400, and 500 may exchange video call images with one another via the server 100 (operation S2330). The exchange of the video call images may continue until a request for termination of the collaboration services is made.

Video call images of other parties may be output to the first through third user terminals 300, 400, and 500, respectively (operation S2335). For example, video call images associated with second and third users may be output to the first user terminal 300. In operations S2305 through S2335, the group for a video conference is created, a group member is invited, and the video conference is performed. A user interface screen for a video conference will now be described in detail with reference to FIG. 24.

Figure 24:
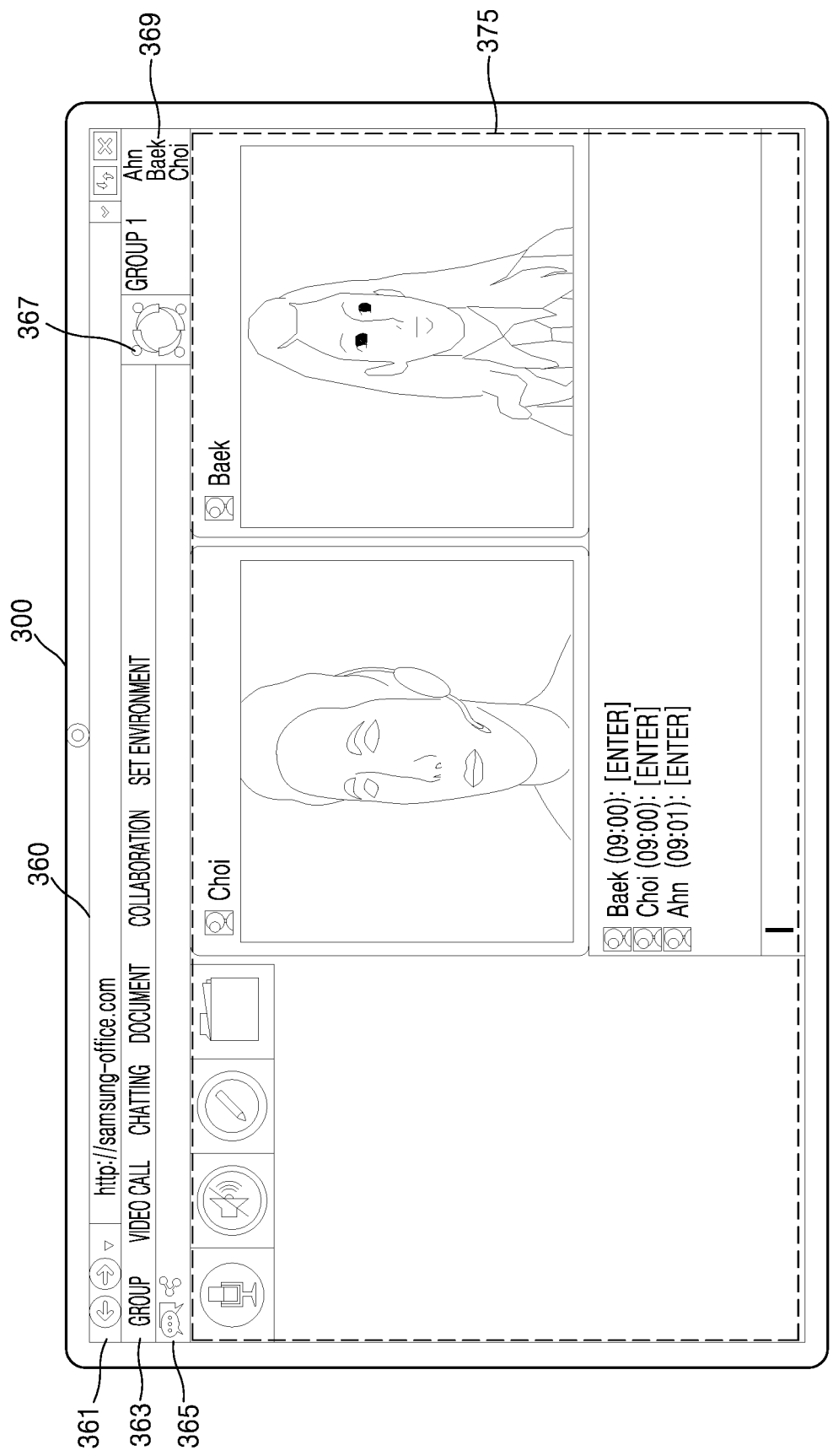
FIG. 24 illustrates an example where a video conference is performed in a user terminal for receiving the collaboration services before a request for execution of collaboration services is made, according to an exemplary embodiment.

FIG. 24 illustrates an example where a video conference is performed in the first user terminal 300 for receiving the collaboration services before a request for execution of the collaboration services is made, according to an exemplary embodiment.

In detail, FIG. 24 shows a user interface screen 360 of the first user terminal 300. From top to bottom, the user interface screen 360 includes an address window 361 for entering an address of the server 100, a menu bar 363, and a ribbon menu bar 365. The menu bar 363 and the ribbon menu bar 365 may have different shapes according to the type of a program executed on the server 100. The user interface screen 360 shown in FIG. 24 has a similar structure to that shown in FIG. 16, but is different therefrom in that shapes of the menu bar 363 and the ribbon bar 365 are changed to match a program that is used for a video conference.

In addition, a mode indicator 367 may indicate that a current mode is a video conference mode, and an access user display window 369 may show names of users who are currently participating in the video conference.

A region for displaying a video call image of the other party, a chat region, and simple icons representing essential functions used during the video conference appear on a video conference window 375. The video conference window 375 may further include a memo region or a region for displaying a shared document, which is required to run the video conference.

Referring back to FIG. 23, the first user may select a document that he or she desires to share with other users participating in the video conference from a document list (operation S2340).

Figure 25:
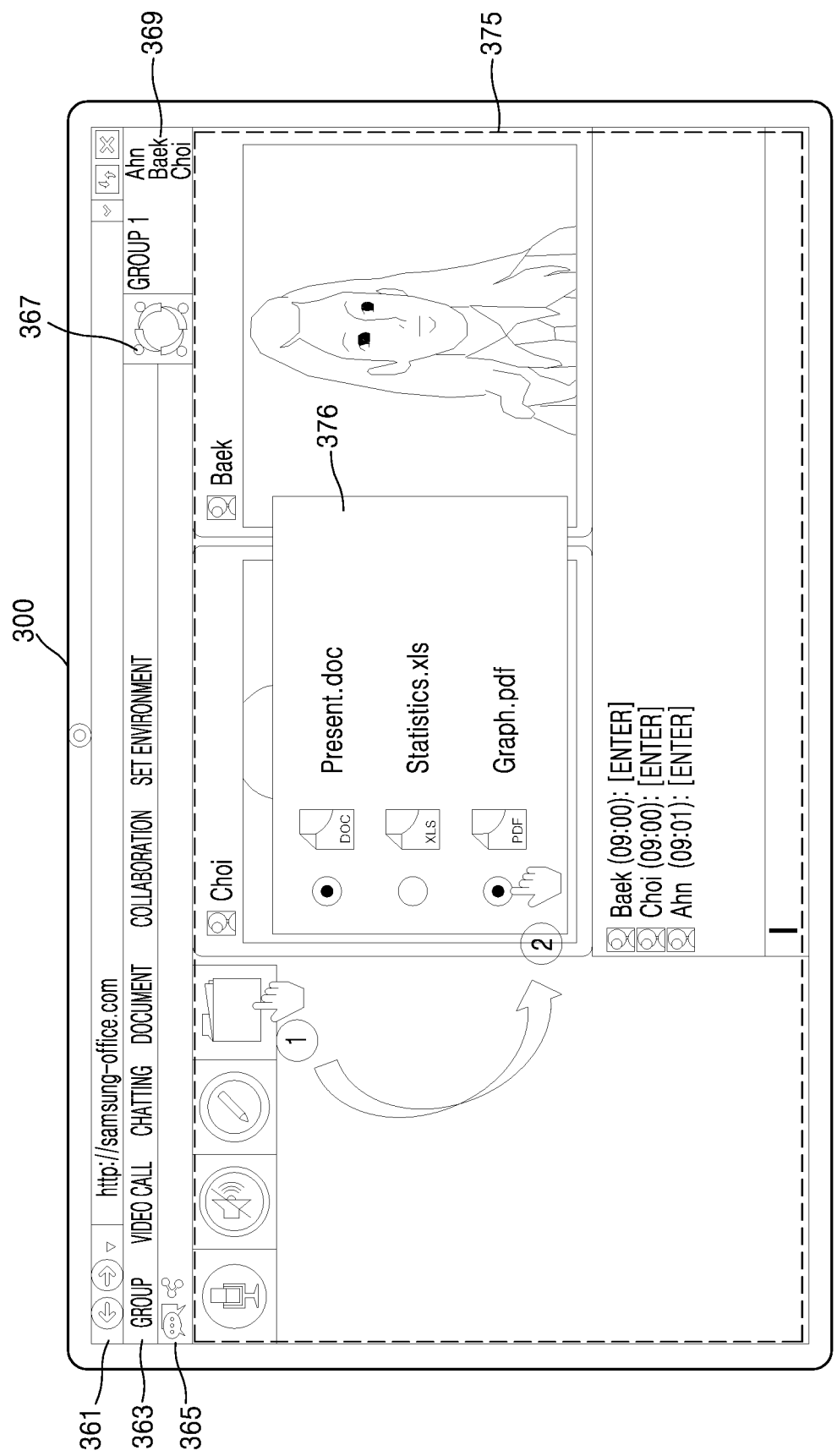
FIG. 25 illustrates a process of selecting a document that is shared during a video conference before a request for execution of collaboration services is made, in a user terminal for receiving the collaboration services, according to an exemplary embodiment.

FIG. 25 illustrates a process of selecting a document that is shared during a video conference before a request for execution of collaboration services is made, in the first user terminal 300 for receiving the collaboration services, according to an exemplary embodiment.

Referring to FIG. 25, in a video conference window 375 displayed on the first user terminal 300, a first user may select a folder where shared documents are stored from among simple icons representing essential functions used during the video conference and open the folder to identify a document list 376 that can be shared.

The first user may select at least one document from the list of documents and share the selected document with other users. In this case, the first user may select two files having different document formats so as to share two documents simultaneously. Referring to FIG. 25, the first user may select both present.doc" and "Graph.pdf" files from the document list 376.

Referring back to FIG. 23, the first user terminal 300 may request the server 100 to execute a document selected from a document list (operation S2345).

The server 100 may execute the document which the first user terminal 300 requests to be executed (operation S2350). A program used to execute the document may be installed on the server 100.

The server 100 may transmit the document executed on the server 100 to the first through third user terminals 300, 400, and 500 as a web-based document (operation S2355).

The first through third user terminals 300, 400, and 500 may display the document transmitted as a web-based document via web browsers, respectively (operation S2360).

Figure 26:
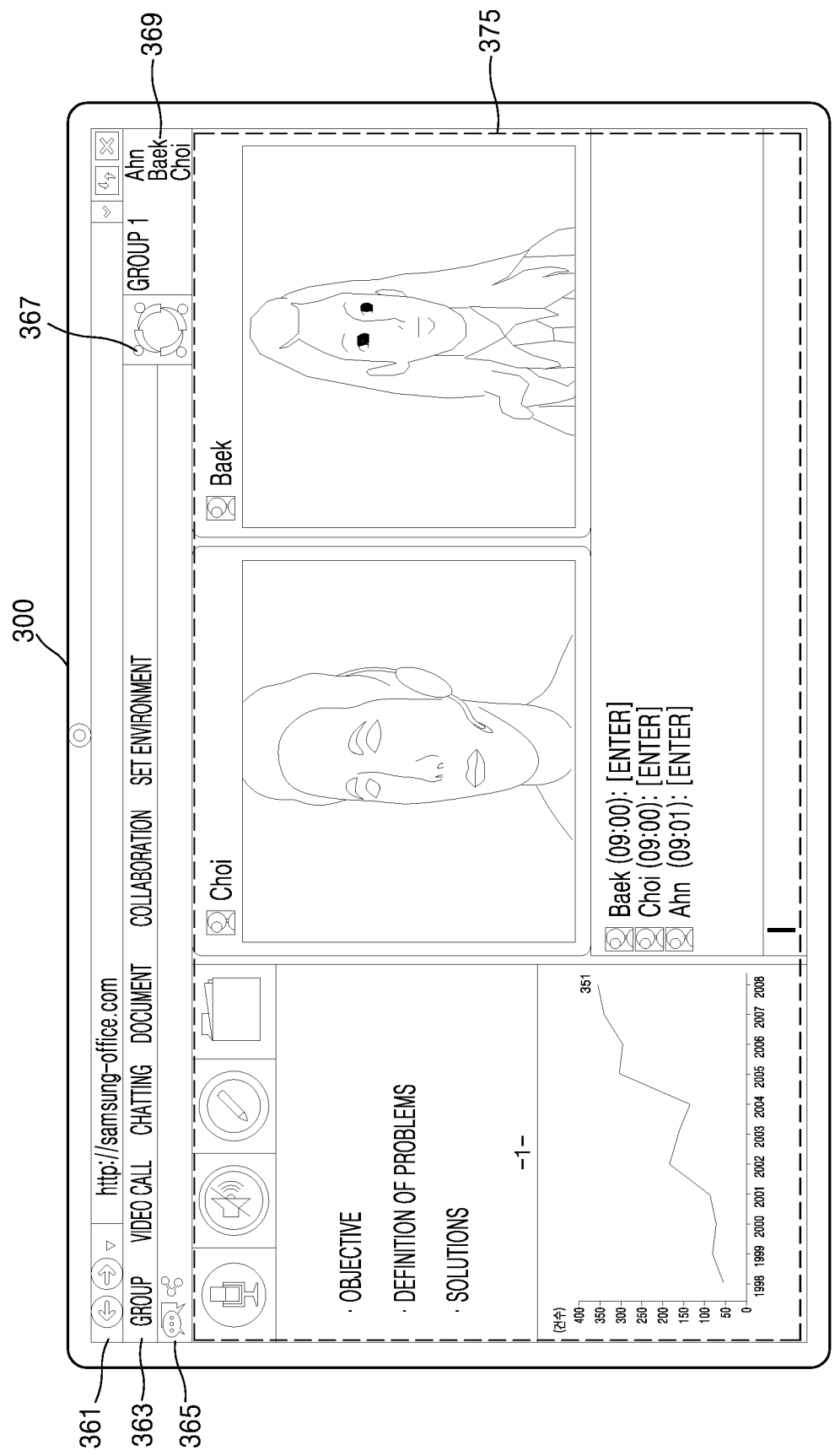
FIG. 26 illustrates an example where a document shared in a video conference is displayed on a user terminal for receiving collaboration services before a request for execution of the collaboration services is made, according to an exemplary embodiment.

FIG. 26 illustrates an example where a document shared during a video conference is displayed on the first user terminal 300 for receiving collaboration services before a request for execution of the collaboration services is made, according to an exemplary embodiment.

Referring to FIG. 26, a region for displaying a video call image of the other party, a chat region, and simple icons representing essential functions used during the video conference appear on a video conference window 375 of the first user terminal 300. Unlike in FIG. 25, two types of shared documents selected by a first user may be displayed together on the video conference window 375.

Referring back to FIG. 23, the first user may select execution of switching to a collaboration mode in the first user terminal 300 (operation S2365). Selection of execution of switching to a collaboration mode in the first user terminal 300 will now be described with reference to FIG. 27.

Figure 27:
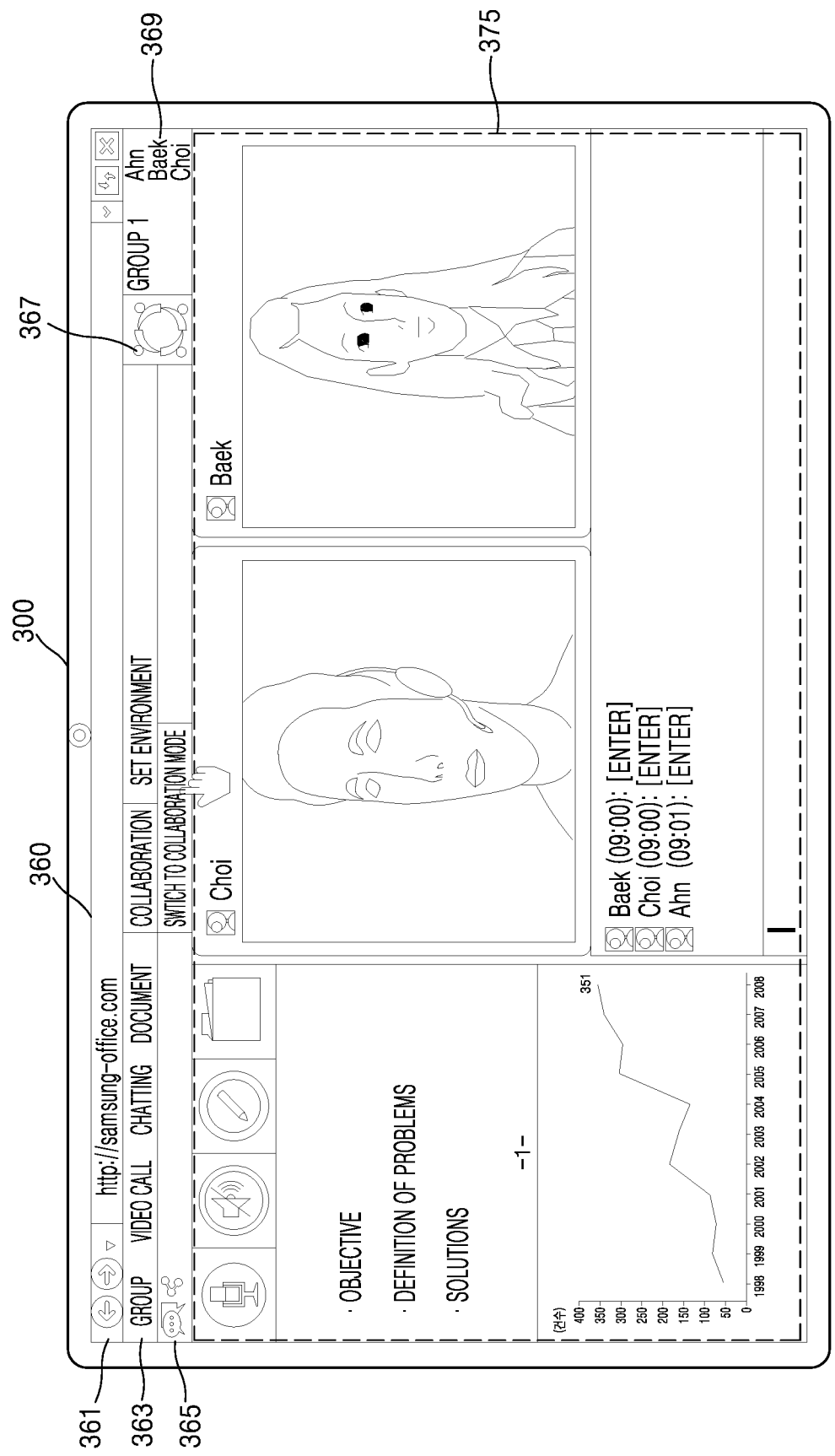
FIG. 27 illustrates an example where a user terminal for receiving collaboration services requests execution of the collaboration services during a video conference, according to an exemplary embodiment.

FIG. 27 illustrates an example where the first user terminal 300 for receiving collaboration services requests execution of the collaboration services during a video conference, according to an exemplary embodiment.

In detail, FIG. 27 shows a user interface screen 360 of the first user terminal 300. From top to bottom, the user interface screen 360 includes an address window 361 for entering an address of the server 100, a menu bar 363, and a ribbon menu bar 365. A mode indicator 367 may indicate that a current mode is a video conference mode, and an access user display window 369 may display names of users who are currently participating in the video conference.

Referring to FIG. 27, the first user selects a "Collaboration" menu in the menu bar 363, click on (or touches) "Switch to collaboration mode" in a displayed submenu, and executes switching to a collaboration mode.

Referring back to FIG. 23, the first user terminal 300 may request execution of collaboration services that allow collaborative editing of a document from the server 100 (operation S2370). In this case, a menu for setting a security status of a document that is collaboratively edited may further be provided. For example, in response to a user input, i.e., clicking on (or touching) "Switch to collaboration mode," a security level of a document that is collaboratively edited may be set. A security level may be provided via buttons for respectively selecting high, medium, and low, and a location of a DB on the server 100 where the document is stored may selectively vary depending on a selected security level. For example, if the user sets a security level to high, a document which a created group works on may be stored in the security document DB 158. On the other hand, if the user sets a security level to medium or low, a document which a created group works on may be stored in the document DB 155.

States of the first through third user terminals 300, 400, and 500 when execution of the collaboration services that allow collaborative editing of a document is requested will now be described in detail with reference to FIG. 28.

Figure 28:
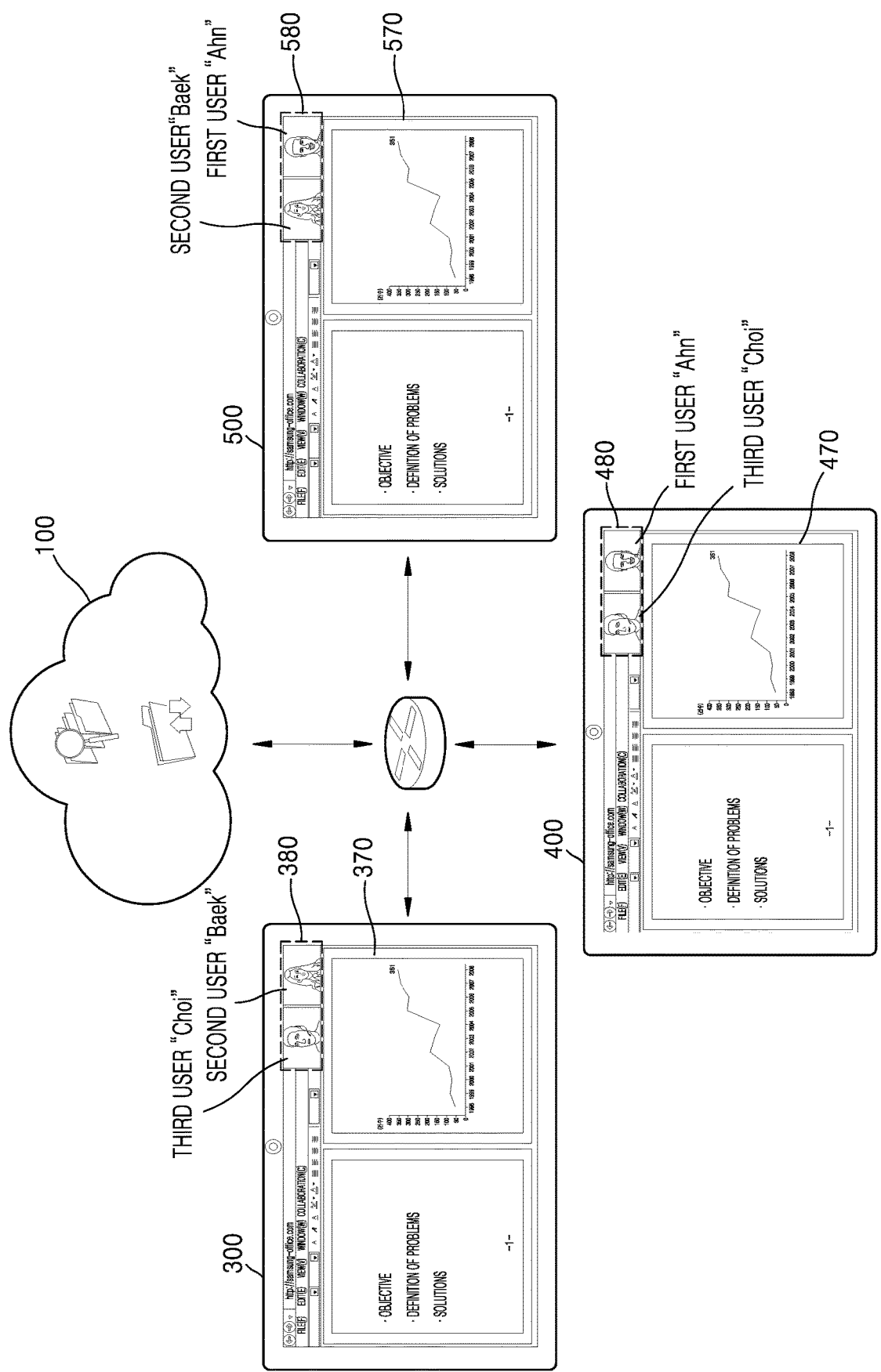
FIG. 28 illustrates a state of each user terminal when collaboration services are initiated during a video conference so that each user terminal is ready to edit the document collaboratively, according to an exemplary embodiment.

FIG. 28 illustrates states of the first through third user terminals 300, 400, and 500 when collaboration services are initiated during a video conference so that he first through third user terminals 300, 400, and 500 are ready to collaboratively edit the document, according to an exemplary embodiment. Referring to FIG. 28, the first through third user terminals 300, 400, and 500 may be connected to the server 100.

A window 370 showing a document being collaboratively edited and a window 380 showing video call images of second and third users (e.g., "Baek" and "Choi") may be displayed on the first user terminal 300.

Similarly, a window 470 showing a document being collaboratively edited and a window 480 showing video call images of first and third users (e.g., "Ahn" and "Choi") may be displayed on the second user terminal 400.

Likewise, a window 570 showing a document being collaboratively edited and a window 580 showing video call images of first and second users (e.g., "Ahn" and "Baek") may be displayed on the third user terminal 500.

FIG. 19 illustrates states of the first through third user terminals 300, 400, and 500 when collaboration services are initiated while a document is being processed so that the first through third user terminals 300, 400, and 500 are able to collaboratively edit the document. FIG. 28 illustrates states of the first through third user terminals 300, 400, and 500 when collaboration services are initiated during a video conference so that the first through third user terminals 300, 400, and 500 are able to collaboratively edit the document. FIGS. 19 and 28 both show a process of preparing reception of collaboration services so as to edit a document collaboratively. Each of the first through third terminals 300, 400, and 500 shows the same state after receiving the collaboration services that allows collaborative editing of the document according to execution of switching to a collaboration mode. The example shown in FIG. 28 is only different from that shown in FIG. 19 in that two different types of documents are displayed in the windows 370, 470, and 570, respectively.

Figure 29:
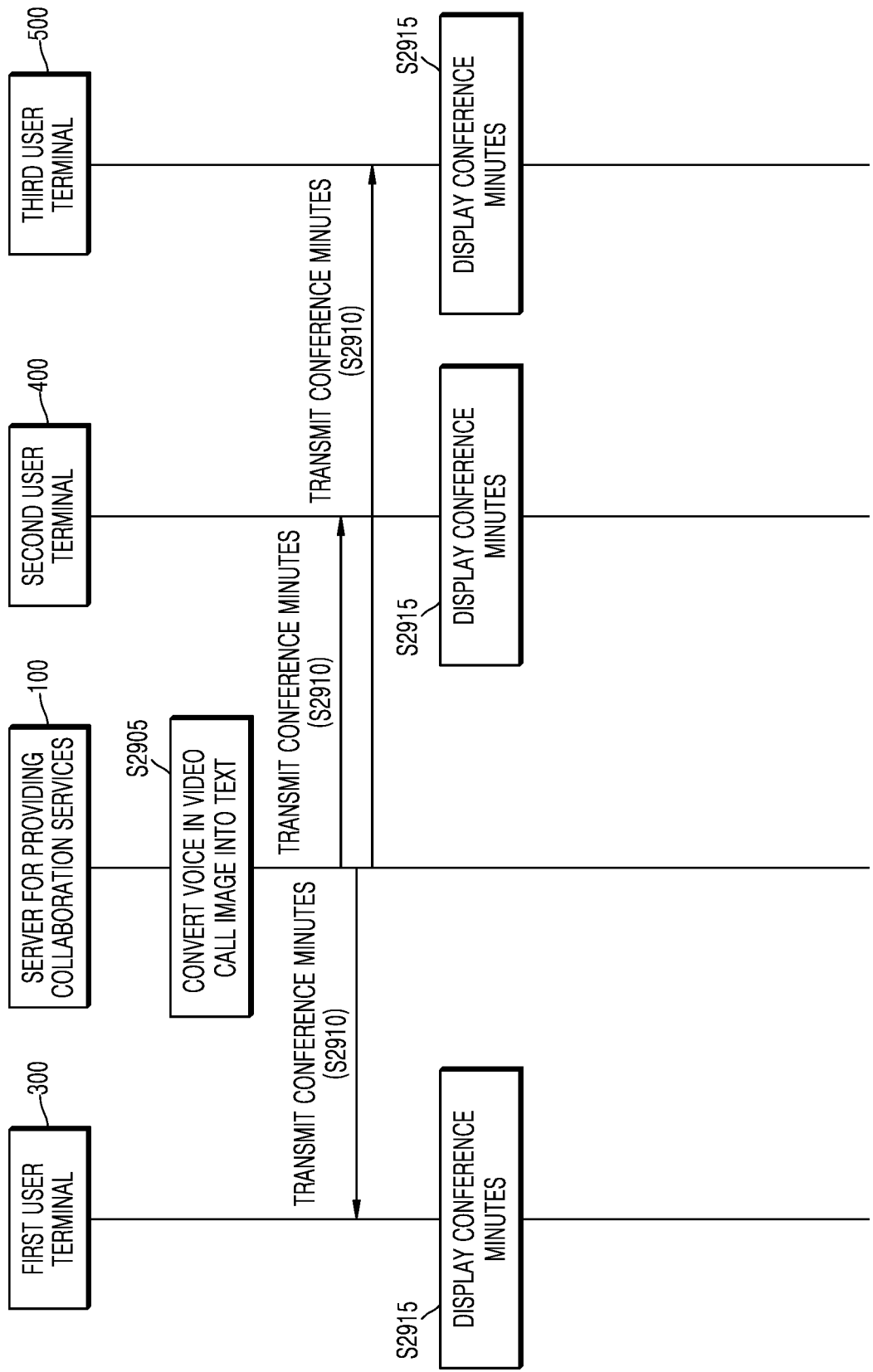
FIG. 29 illustrates a process of generating an image showing minutes of a conference (hereinafter, referred to as conference minutes) from a video call image and transmitting the conference minutes to each of user terminals in a server for providing collaboration services, according to an exemplary embodiment.

FIG. 29 illustrates a process of generating conference minutes from a video call image and transmitting the conference minutes to each of first through third terminals 300, 400, and 500 in a server 100 for providing collaboration services, according to an exemplary embodiment. As described above, when a document is ready to be edited collaboratively, video call images may be exchanged among user terminals, and the document may be displayed on a screen of each user terminal. Since conference minutes are generated based on a voice included in a video call image, video call images should be exchanged between each user terminal. In other words, since transmission/reception of video call images continues until a request for termination of collaboration services is made even if the transmission/reception thereof is not described, it is assumed herein that the video call images are continuously exchanged between each user terminal.

Referring to FIG. 29, the server 100 may convert a voice included in a video call image into a text (operation S2905). The server 100 may convert a voice contained in a video call image associated with each user into a text and generate conference minutes based on the text. In other words, since each of the first through third terminals 300, 400, and 500 transmits or receives a video call image via the server 100, each time a video call image associated with each user is transmitted or received, the server 100 may convert a voice included in the video call image into a text.

The server 100 may transmit conference minutes to the first through third user terminals 300, 400, and 500 (operation S2910). For example, each time a video call image of each user is transmitted or received, the server 100 may convert a voice in the video call image into a text and transmit conference minutes including the text to each of the first through third terminals 300, 400, and 500.

Each of the first through third terminals 300, 400, and 500 may display the conference minutes received from the server 100 (operation S2915). From the time when the conference minutes are displayed on each of the first through third terminals 300, 400, and 500, collaboration services that allow collaborative editing of a document may be considered to be completely provided.

Figure 30:
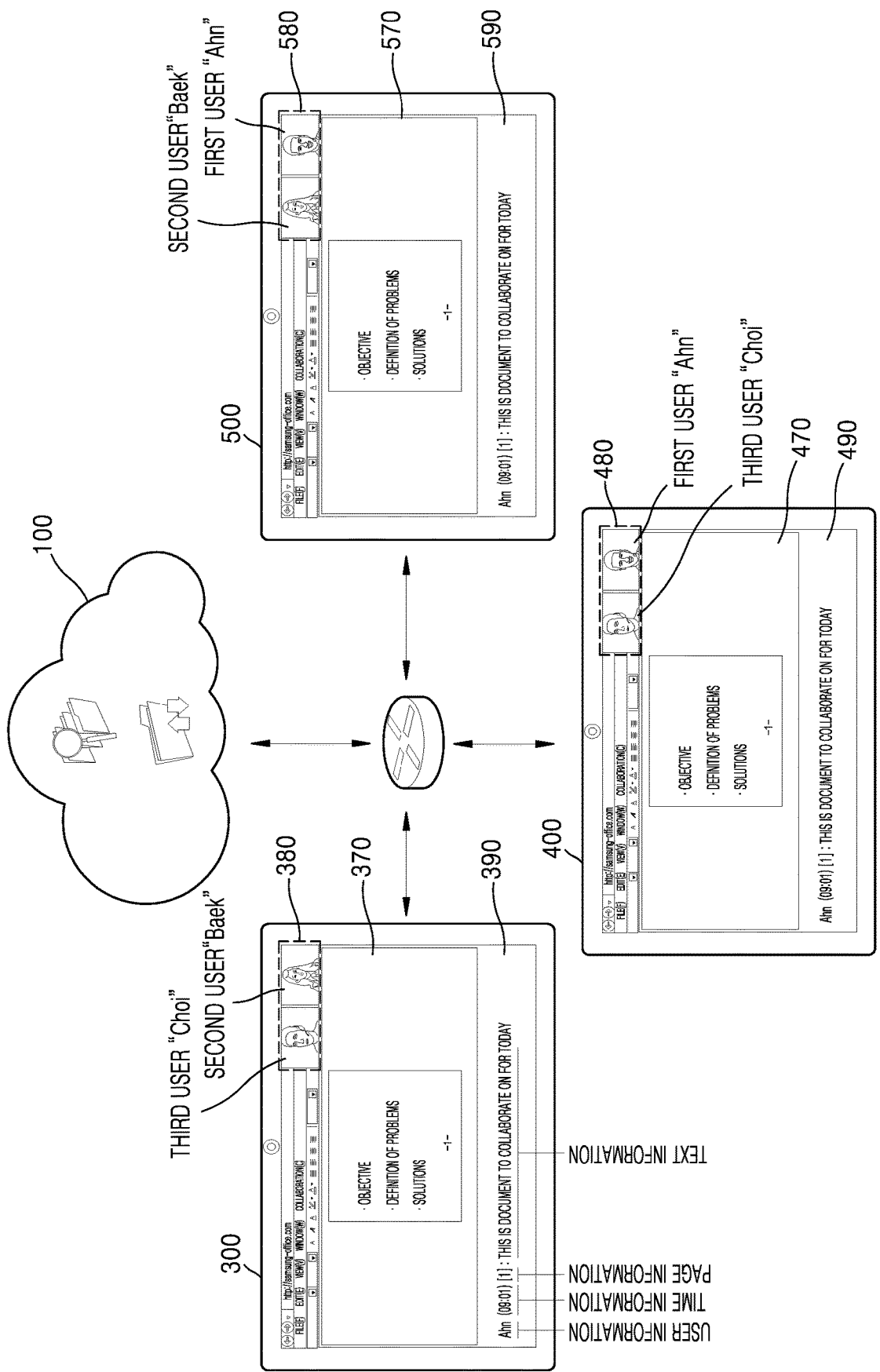
FIG. 30 illustrates an example where conference minutes are displayed on each user terminal for receiving collaboration services according to an exemplary embodiment.

FIG. 30 illustrates an example where conference minutes are displayed on each of first through third terminals 300, 400, and 500 for receiving collaboration services according to an exemplary embodiment. Referring to FIG. 30, the first through third user terminals 300, 400, and 500 may be connected to a server 100 for providing the collaboration services.

A window 370 showing a document being collaboratively edited, a window 380 showing video call images of second and third users (e.g., "Baek" and "Choi"), and a window 390 showing conference minutes may be displayed on the first user terminal 300.

Similarly, a window 470 showing a document being collaboratively edited, a window 480 showing video call images of first and third users (e.g., "Ahn" and "Choi"), and a window 490 showing conference minutes may be displayed on the second user terminal 400.

Likewise, a window 570 showing a document being collaboratively edited, a window 580 showing video call images of first and second users (e.g., "Ahn" and "Baek"), and a window 590 showing conference minutes may be displayed on the third user terminal 500.

As evident from FIG. 30, the window 390 displayed on the first user terminal 300 displays what the first user (e.g., "Ahn") speaks during a video conference as a text. In detail, the conference minutes may include "Ahn" that is user information, "(09:01)" that is information about a time when a text occurs, "[1]" that is information about a page in a document being collaboratively edited and viewed by a user who speaks the text at the time when the text occurs, and "This is a document to be edited collaboratively today." that is the text into which a voice in the video call image is converted. In other words, the conference minutes may include information about a time when each of texts in the conference minutes occurs and information about a page in the document viewed by a user who speaks the text at the time when the text occurs.

In addition, the windows 490 and 590 showing conference minutes displayed on the second and third user terminals 400 and 500 include the same details as the window 390 displayed on the first user terminal 300.

Figure 31:
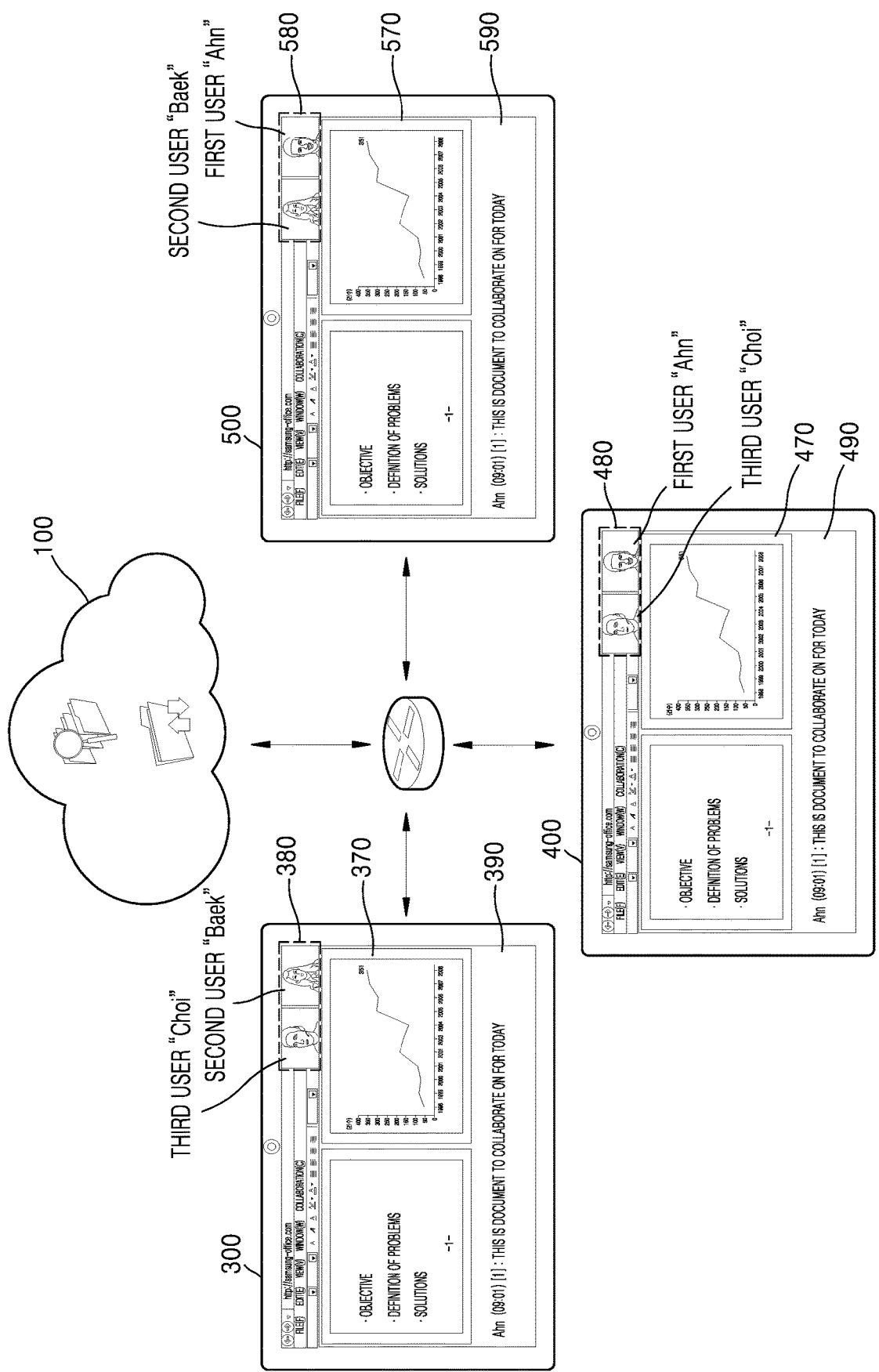
FIG. 31 illustrates another example where conference minutes are displayed on each user terminal for receiving collaboration services according to an exemplary embodiment.

FIG. 31 illustrates another example where conference minutes are displayed on each of first through third terminals 300, 400, and 500 for receiving collaboration services according to an exemplary embodiment. Referring to FIG. 31, the first through third user terminals 300, 400, and 500 may be connected to a server 100 for providing the collaboration services.

As described above with reference to FIG. 30, windows 370, 470, ad 570 showing a document being collaboratively edited, windows 380, 480, and 580 showing video call images of the remaining users other than a particular user, and windows 390, 490, and 590 showing conference minutes may be displayed on the first through third user terminals 300, 400, and 500, respectively. In this case, the conference minutes may include information about a time when each of texts in the conference minutes occurs and information about a page in the document viewed by a user who speaks the text at the time when the text occurs.

FIGS. 30 and 31 show the results obtained by performing the processes of FIGS. 15 and 23, respectively. The example shown in FIG. 31 is only different from that shown in FIG. 30 in that two different types of documents are displayed in the windows 370, 470, and 570, respectively.

Figure 32:
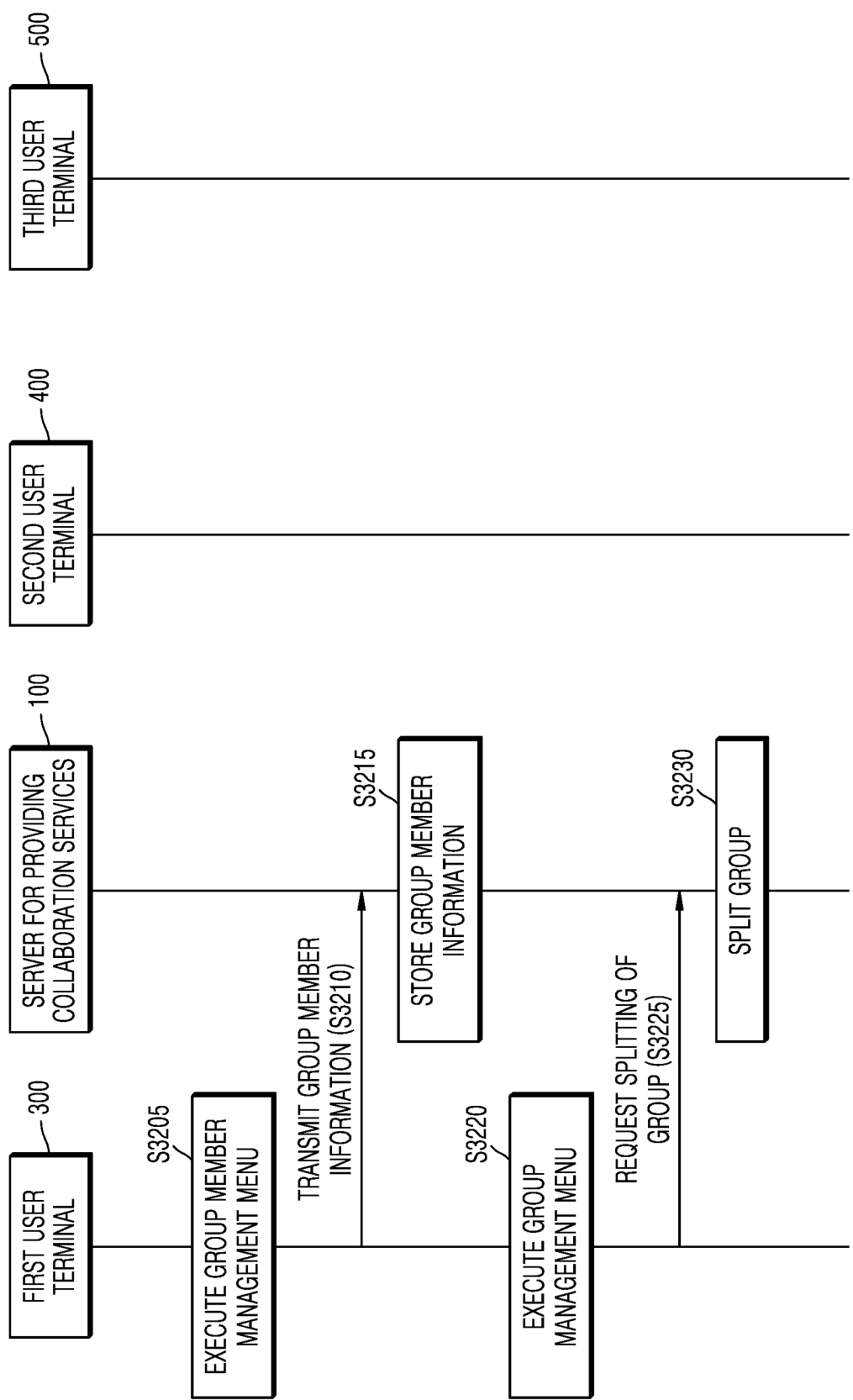
FIG. 32 illustrates a process of requesting management of group members and a group collaborating with each other from a server for providing collaboration services according to an exemplary embodiment.

FIG. 32 illustrates a process of requesting management of group members and a group who collaborate with each other from a server 100 for providing collaboration services according to an exemplary embodiment. While the server 100 is providing collaboration services that allow collaborative editing of a document, a first user who is a head of a group may think it necessary to manage group members or the group. In other words, the first user may desire to change information about each member in the group or split the group having a large size into several smaller groups.

Management of a group member will now be described with reference to FIG. 32.

Referring to FIG. 32, a first user terminal 300 may execute a group member management menu (operation S3205). A first user may set authority of each group member or subgroups to which each group member belongs in a group member window that pops up upon execution of the group member management menu.

The first user terminal 300 may transmit information about each group member to the server 100 (operation S3210). In other words, if the first user terminal 300 executes the group member management menu so that a change is made to information about each group member, the first user terminal 300 may transmit the information about each group member to the server 100 so that the change is reflected.

The server 100 may store the information about each group member (operation S3215). Management of group members by setting information about each group member will now be described in detail with reference to FIG. 33.

Figure 33:
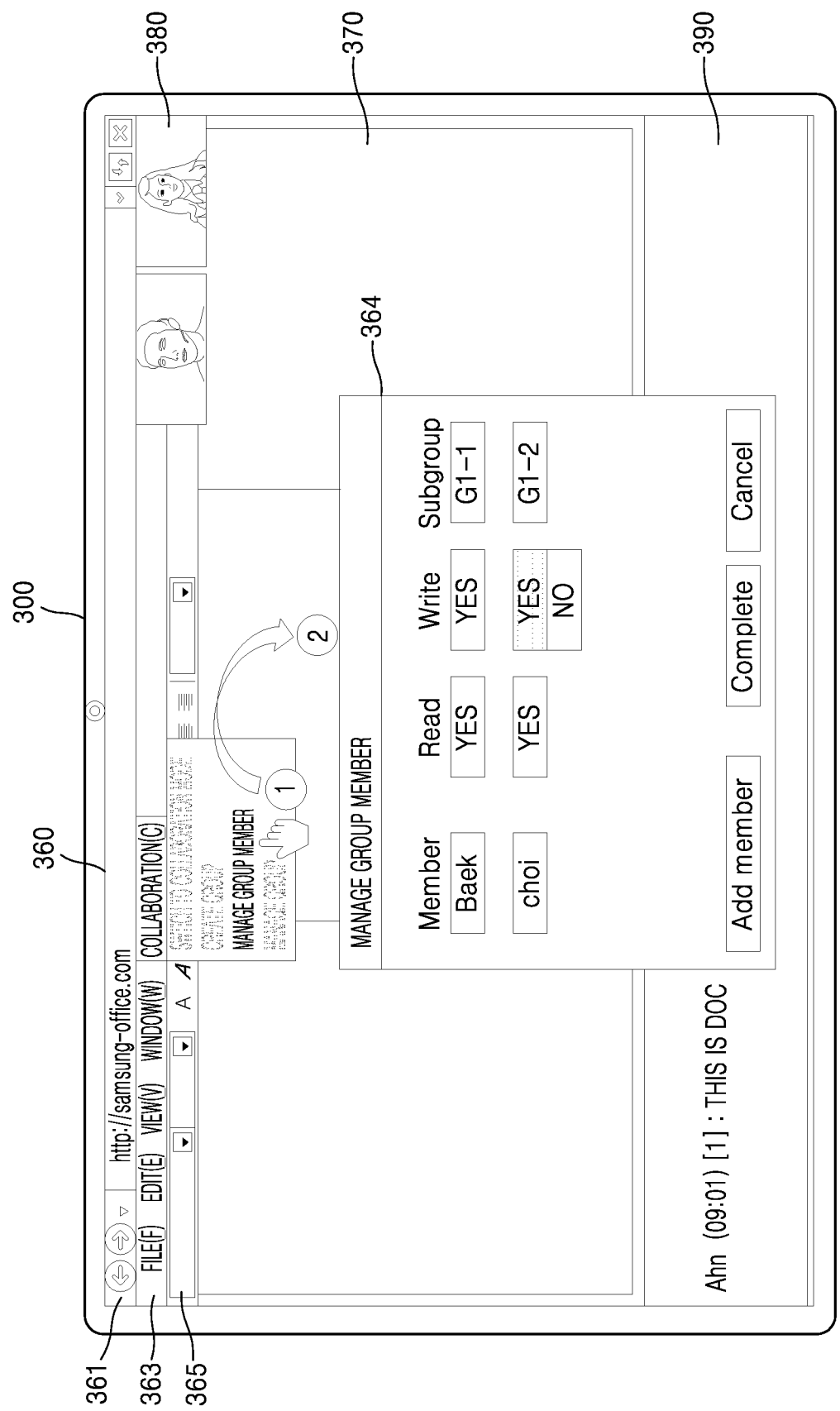
FIG. 33 illustrates an example where information about each group member is set in a user terminal for receiving collaboration services according to an exemplary embodiment.

FIG. 33 illustrates an example where information about each group member is set in the first user terminal 300 for receiving collaboration services according to an exemplary embodiment.

Referring to FIG. 33, on a user interface screen 360 of the first user terminal 300, the first user may select a "Collaboration" menu in a menu bar 363 between an address window 361 and a ribbon menu bar 365 and then "Manage group member" in a displayed submenu.

Then, a Manage Group Member window 364 may be displayed on the user interface screen 360 of the first user terminal 300. The first user may set information about each group member by changing or setting information about a current member and pressing a "Complete" button. Referring to FIG. 33, a second user (e.g., "Baek") has authority to Read and Write and belongs to a subgroup G1-1. Similarly, a third user (e.g., "Choi") has authority to Read and Write and belongs to a subgroup G1-2.

Referring back to FIG. 32, the first user terminal 300 may execute a group management menu (operation S3220).

The first user terminal 300 may request splitting of a group from the server 100 (operation S3225).

The server 100 may split the group into smaller groups according to the request from the first user terminal 300 (operation S3230). Management of the group will now be described in detail with reference to FIG. 34.

Figure 34:
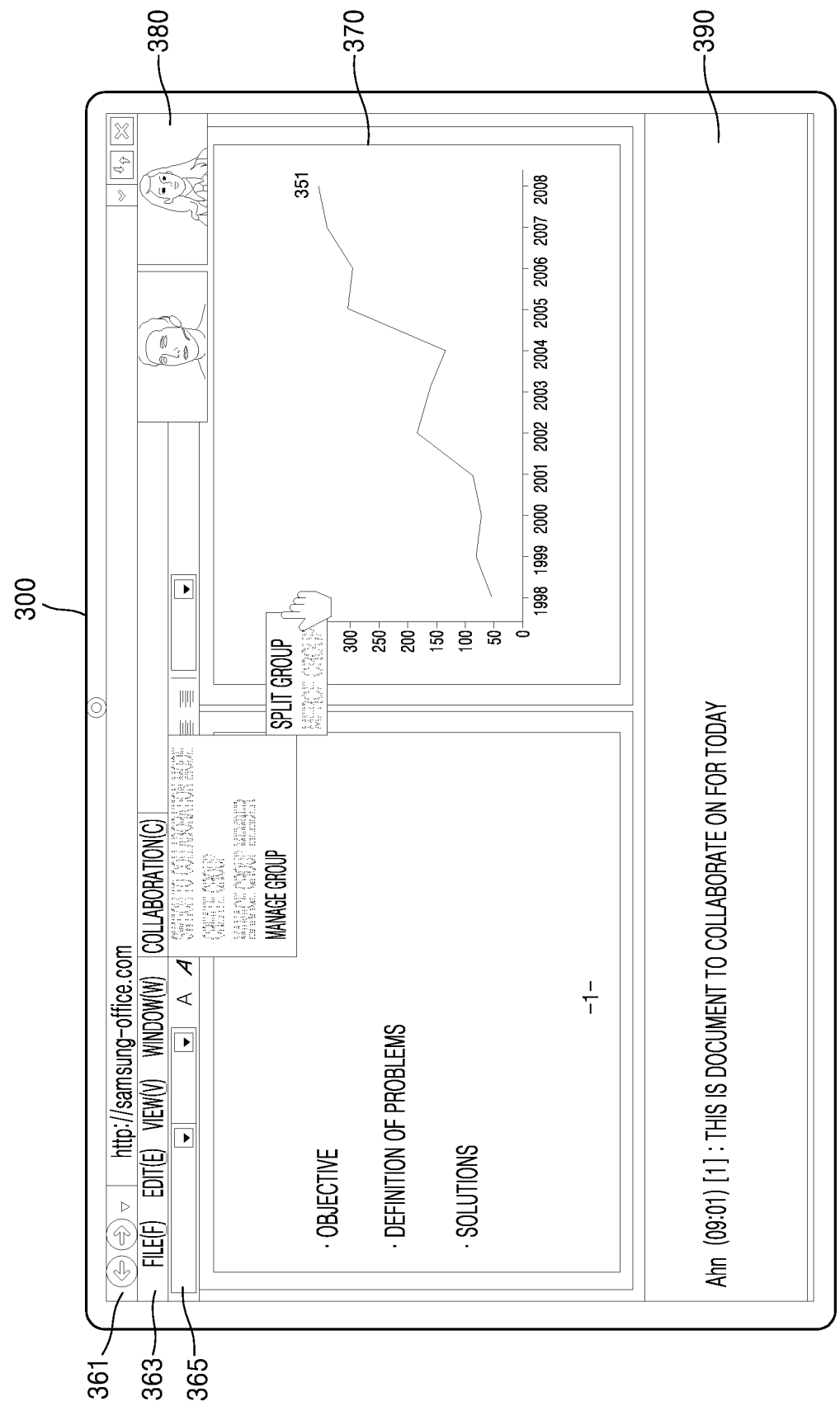
FIG. 34 illustrates an example where a current group is split into a plurality of groups in a user terminal for receiving collaboration services according to an exemplary embodiment.

FIG. 34 illustrates an example where a current group is split into a plurality of groups in the first user terminal 300 for receiving collaboration services according to an exemplary embodiment.

As described above with reference to FIG. 33, the information about each group member may be set so that the second user (e.g., "Baek") belongs to a different subgroup than the third user (e.g., "Choi"). If a plurality of users having different subgroups belong to a single group, the first user as a head of the group may split the group.

Referring to FIG. 34, on a user interface screen 360 of the first user terminal 300, the first user may select a "Collaboration" menu in a menu bar 363 between an address window 361 and a ribbon menu bar 365 and then "Manage group" in a displayed submenu.

Then, submenus "Split group" and "Merge group" may be further displayed. If a plurality of users having different subgroups belong to a current group, and thus the current group is to be split, the submenu "Split group" may be activated. By selecting the submenu "Split group", the first user may split the current group into a plurality of subgroups. The result of splitting a group will now be described in detail with reference to FIG. 35.

Figure 35:
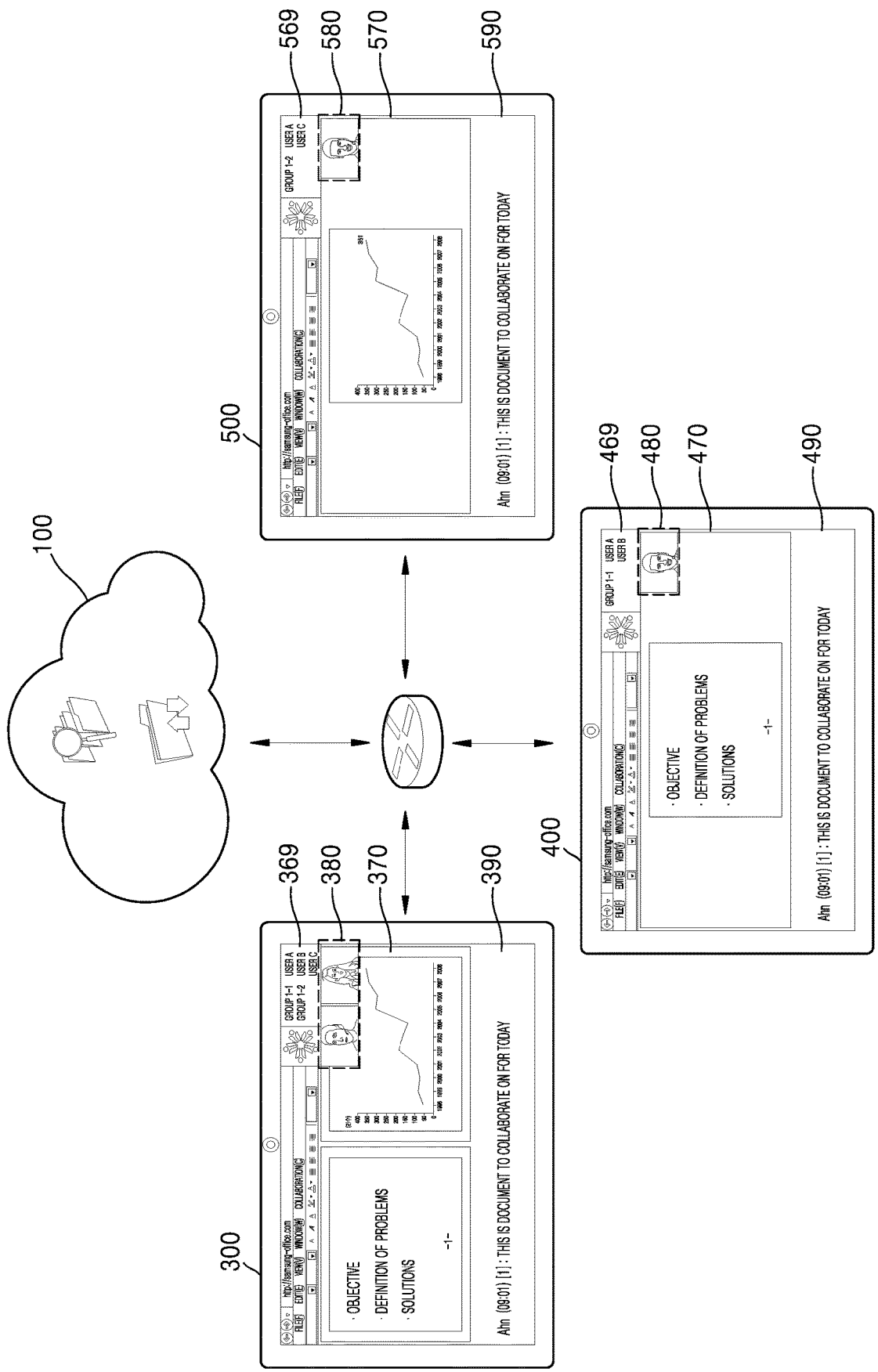
FIG. 35 illustrates a state of each user terminal when a current group is split into a plurality of groups.

FIG. 35 illustrates states of each of first through third user terminals 300, 400, and 500 when a current group is split into a plurality of groups.

Referring to FIG. 35, the first through third user terminals 300, 400, and 500 may be connected to a server 100 for providing collaboration services.

A window 370 showing a document being collaboratively edited, a window 380 showing video call images of second and third users (e.g., "User B" and "User C"), and a window 390 showing conference minutes may be displayed on the first user terminal 300. In addition, an access user display window 369 indicates that a first user (e.g., "User A") belongs to "Group 1-1" and "Group 1-2" and that "User B" and "User C" are currently accessing the server 100 among users belonging to at least one same group as the first user.

A window 470 showing a document being collaboratively edited, a window 480 showing a video call image of the first user (e.g., "User A"), and a window 490 showing conference minutes may be displayed on the second user terminal 400. In addition, an access user display window 469 indicates that the second user (e.g., "User B") belongs to "Group 1-1" and that "User A" is currently accessing the server 100 among users belonging to the same group as the second user.

A window 570 showing a document being collaboratively edited, a window 580 showing a video call image of the first user (e.g., "User A"), and a window 590 showing conference minutes may be displayed on the third user terminal 500. In addition, an access user display window 569 indicates that the third user (e.g., "User C") belongs to "Group 1-2" and that "User A" is currently accessing the server 100 among users belonging to the same group as the third user.

In other words, since the first and second users, i.e., "User A" and "User B" belong to "Group 1-1", and the first and third users, i.e., "User A" and "User C" belong to "Group 1-2", it can be seen that the second and third users do not belong to the same group due to splitting of the current group.

If two types of documents are to be edited collaboratively and collaboration is needed for each type of document, as illustrated in FIG. 35, an efficient collaboration may be achieved by splitting a group into a plurality of subgroups.

Figure 36:
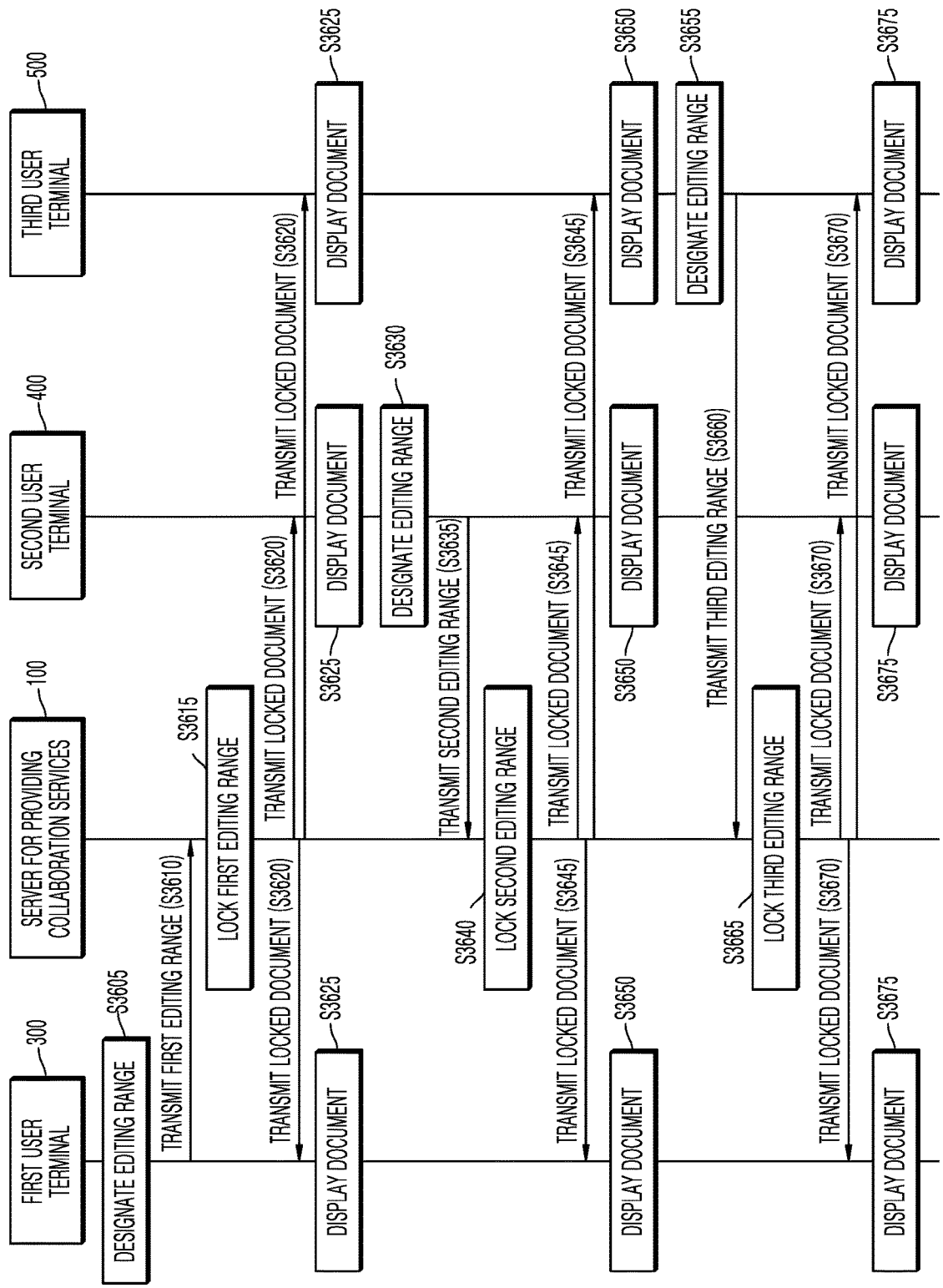
FIG. 36 illustrates a process of restricting an editing range of a document being collaboratively edited in a server for providing collaboration services according to an exemplary embodiment.

FIG. 36 illustrates a process of restricting an editing range of a document being collaboratively edited in a server 100 for providing collaboration services according to an exemplary embodiment. Since a document is collaboratively edited when a plurality of users collaborate with each other on the document, an editing range may be pre-designated for each user in order to prevent conflicts during editing.

First, an example in which a first editing range is locked by a first user will be described with reference to FIG. 36.

The first user may designate a first editing range by using a first user terminal 300 (operation S3605).

The first user terminal 300 may transmit the first editing range designated by the first user to the server 100 (operation S3610).

The server 100 may lock a portion of a document being collaboratively edited corresponding to the first editing range based on the first editing range (operation S3615)

The server 100 may transmit the document having the locked first editing range to the first through third user terminals 300, 400, and 500 as a web-based document (operation S3620).

The first through third user terminals 300, 400, and 500 may display the document having the locked first editing range and transmitted as a web-based document via web browsers, respectively (operation S3625).

Next, an example in which a second editing range is locked by a second user will be described with reference to FIG. 36.

The second user may designate a second editing range by using the second user terminal 400 (operation S3630).

The second user terminal 400 may transmit the second editing range designated by the second user to the server 100 (operation S3635).

The server 100 may lock a portion of a document being collaboratively edited corresponding to the second editing range based on the second editing range (operation S3640)

The server 100 may transmit the document having the locked second editing range to the first through third user terminals 300, 400, and 500 as a web-based document (operation S3645).

The first through third user terminals 300, 400, and 500 may display the document having the locked second editing range and transmitted as a web-based document via web browsers, respectively (operation S3650).

Lastly, an example in which a third editing range is locked by a third user will be described with reference to FIG. 36.

The third user may designate a third editing range by using a third user terminal 500 (operation S3655).

The third user terminal 500 may transmit the third editing range designated by the third user to the server 100 (operation S3660).

The server 100 may lock a portion of a document being collaboratively edited corresponding to the third editing range based on the third editing range (operation S3665)

The server 100 may transmit the document having the locked third editing range to the first through third user terminals 300, 400, and 500 as a web-based document (operation S3670).

The first through third user terminals 300, 400, and 500 may display the document having the locked third editing range and transmitted as a web-based document via web browsers, respectively (operation S3675).

Methods of displaying a document having an editing range locked for each user will now be described in detail with reference to FIGS. 37 through 40.

Figure 37:
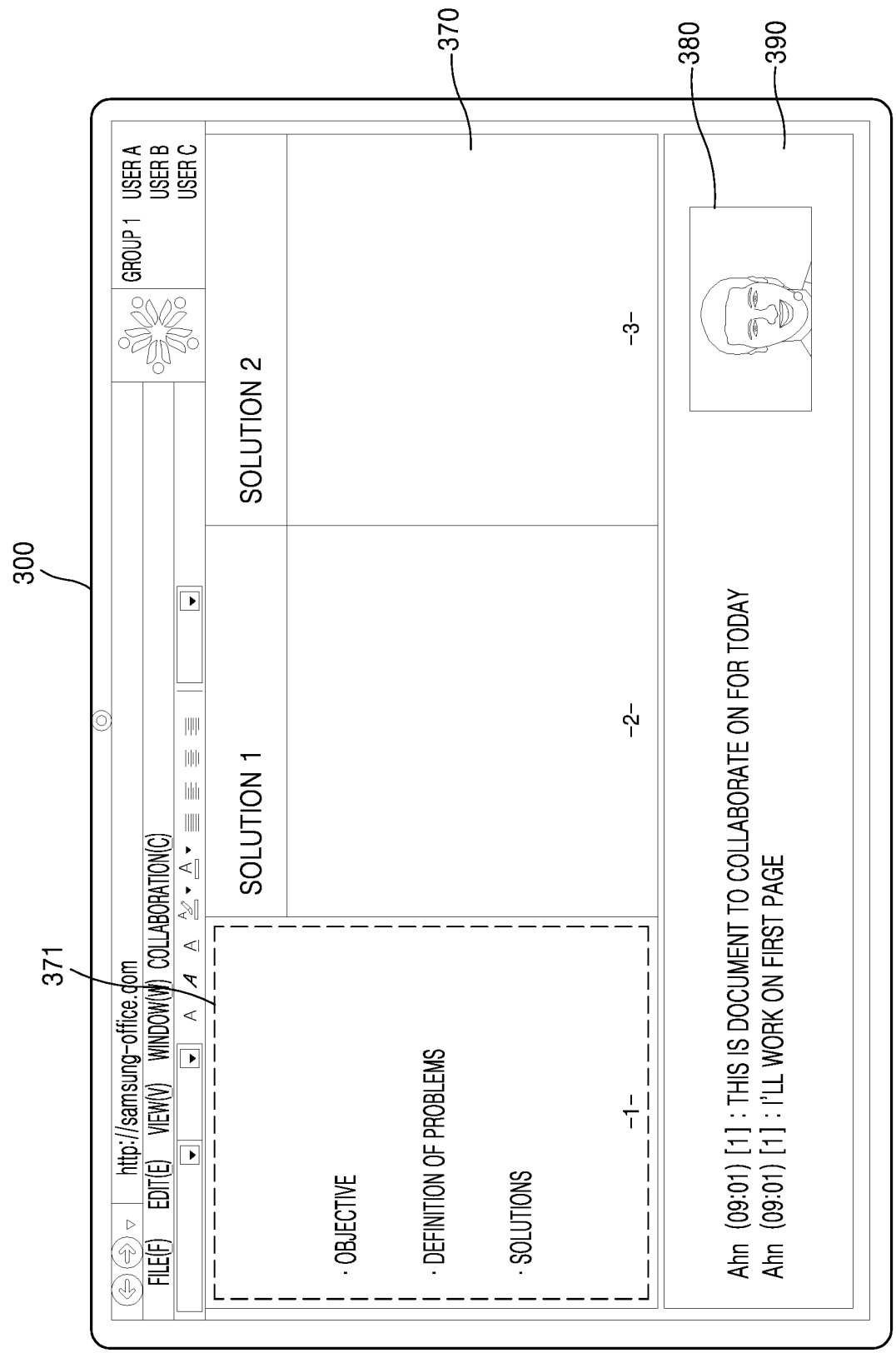
FIG. 37 illustrates an example where a first editing range is locked by a first user in a user terminal for receiving collaboration services according to an exemplary embodiment.

FIG. 37 illustrates an example where a first editing range 371 is locked by a first user in a first user terminal 300 for receiving collaboration services according to an exemplary embodiment.

Referring to FIG. 37, a window 370 showing a document being collaboratively edited, a window 380 showing a video call image, and a window 390 showing conference minutes may be displayed on the first user terminal 300. In this case, when the first user (e.g., "Ahn") designates a first page in the document displayed in the window 370 and requests the server (100 in FIG. 36) for providing collaboration services to lock the first editing range 371, a document having the locked first editing range 371 may be displayed as illustrated in FIG. 37. It is possible to indicate that an editing range for each user is locked by using a predetermined color, pattern, or marker corresponding to each user, so that other users may recognize it.

In addition, a video call image of the first user is output to the window 380, and a text that the first user speaks is displayed in the window 390. In other words, a video call image associated with a user who speaks a text in the conference minutes may be displayed together with the conference minutes. For this purpose, only a video call image corresponding to a text in the conference minutes may be displayed in the window 380.

Figure 38:
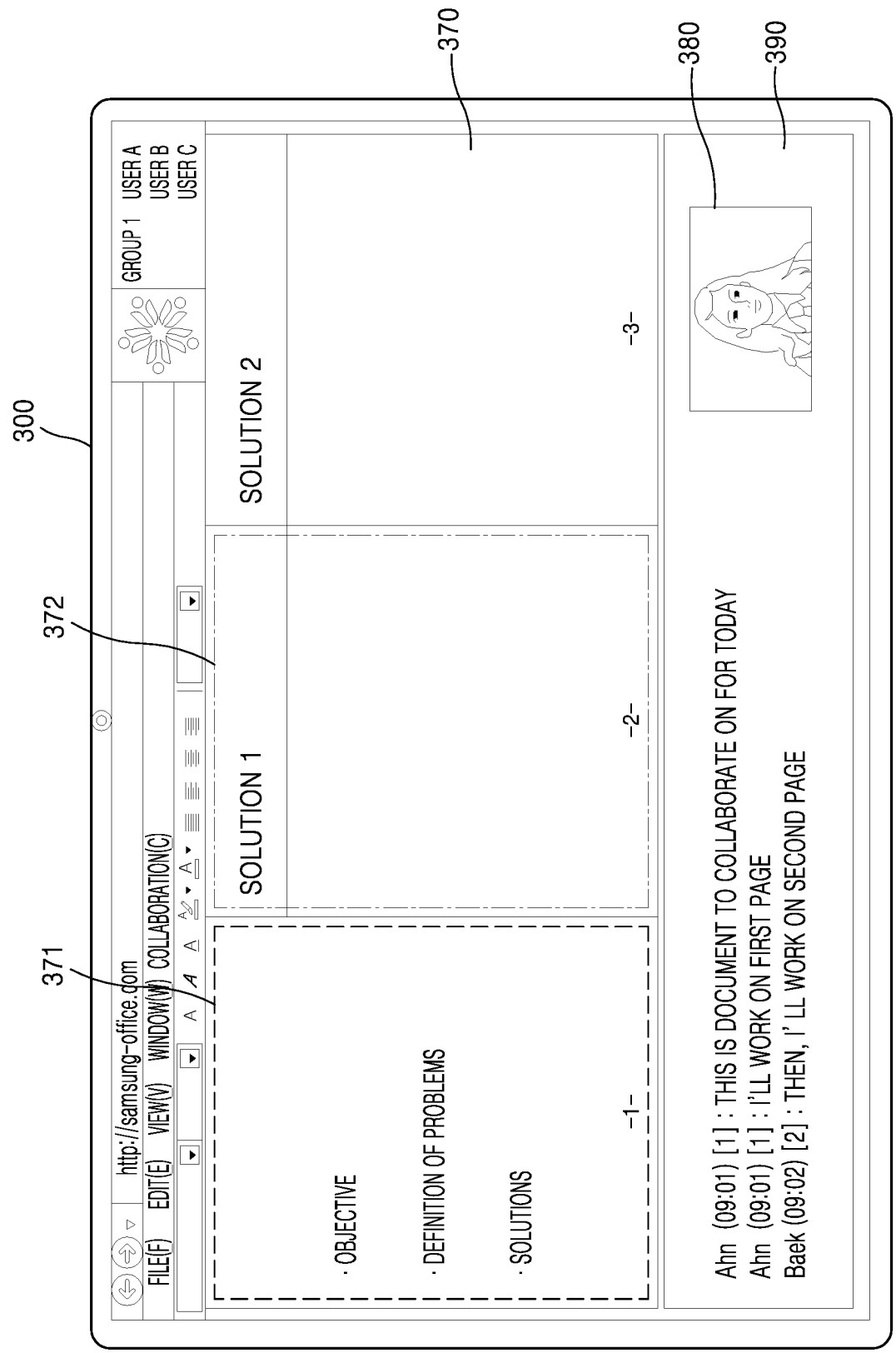
FIG. 38 illustrates an example where a second editing range is locked by a second user in a user terminal for receiving collaboration services according to an exemplary embodiment.

FIG. 38 illustrates an example where a second editing range 372 is locked by a second user in a first user terminal 300 for receiving collaboration services according to an exemplary embodiment.

Referring to FIG. 38, a window 370 showing a document being collaboratively edited, a window 380 showing a video call image, and a window 390 showing conference minutes may be displayed on the first user terminal 300. In this case, when the second user (e.g., "Baek") designates a second page in the document being collaboratively edited and requests the server (100 in FIG. 36) to lock the second editing range 372 by using a second user terminal 400, a document having the locked second editing range 372 may be displayed as illustrated in FIG. 38.

In addition, a video call image of the second user is output to the window 380, and a text that the second user speaks is displayed in the window 390. In other words, a video call image associated with a user who speaks a text in the conference minutes may be displayed together with the conference minutes. For this purpose, only a video call image corresponding to a text in the conference minutes may be displayed in the window 380.

Figure 39:
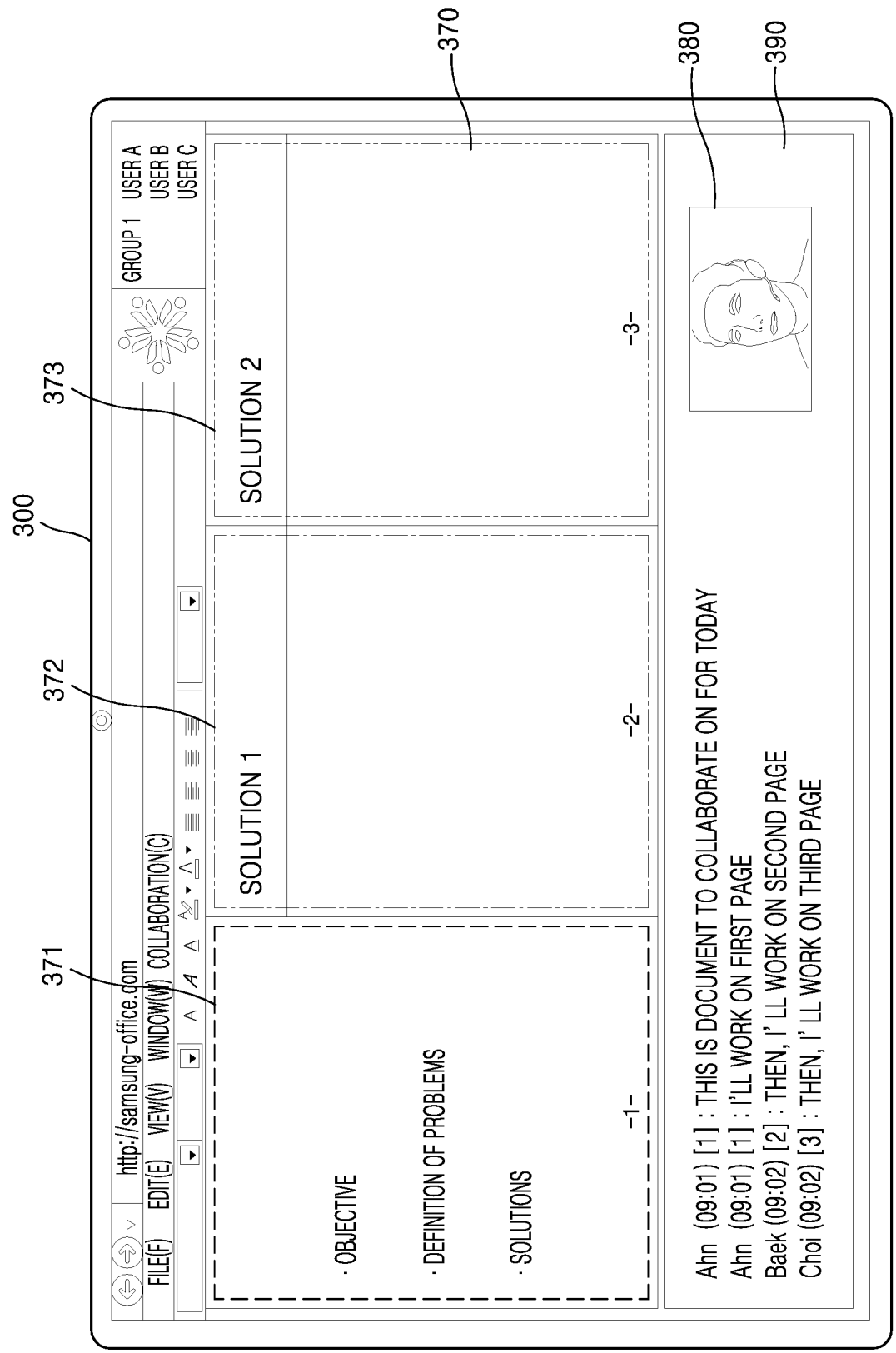
FIG. 39 illustrates an example where a third editing range is locked by a third user in a user terminal for receiving collaboration services according to an exemplary embodiment.

FIG. 39 illustrates an example where a third editing range 373 is locked by a third user in a first user terminal 300 for receiving collaboration services according to an exemplary embodiment.

Referring to FIG. 39, a window 370 showing a document being collaboratively edited, a window 380 showing a video call image, and a window 390 showing conference minutes may be displayed on the first user terminal 300. In this case, when the third user (e.g., "Choi") designates a third page in the document being collaboratively edited and requests the server (100 in FIG. 36) to lock the third editing range 373 by using a third user terminal 500, a document having the locked third editing range 373 may be displayed as illustrated in FIG. 39.

In addition, a video call image of the third user is output to the window 380, and a text that the third user speaks is displayed in the window 390. In other words, a video call image associated with a user who speaks a text in the conference minutes may be displayed together with the conference minutes. For this purpose, only a video call image corresponding to a text in the conference minutes may be displayed in the window 380.

Referring to FIGS. 37 through 39, each of the first through third users may designate an editing range for each page in a document being collaboratively edited. Furthermore, a page number of the document that each of the first through third users views on his or her own user terminal is displayed together with a text in the conference minutes. A text may be obtained by converting a voice in a video call image of each user. Information about a time when the text occurs may also be displayed together with the text and the page number, and a video call image of a user corresponding to the latest text in the conference minutes are displayed.

Figure 40:
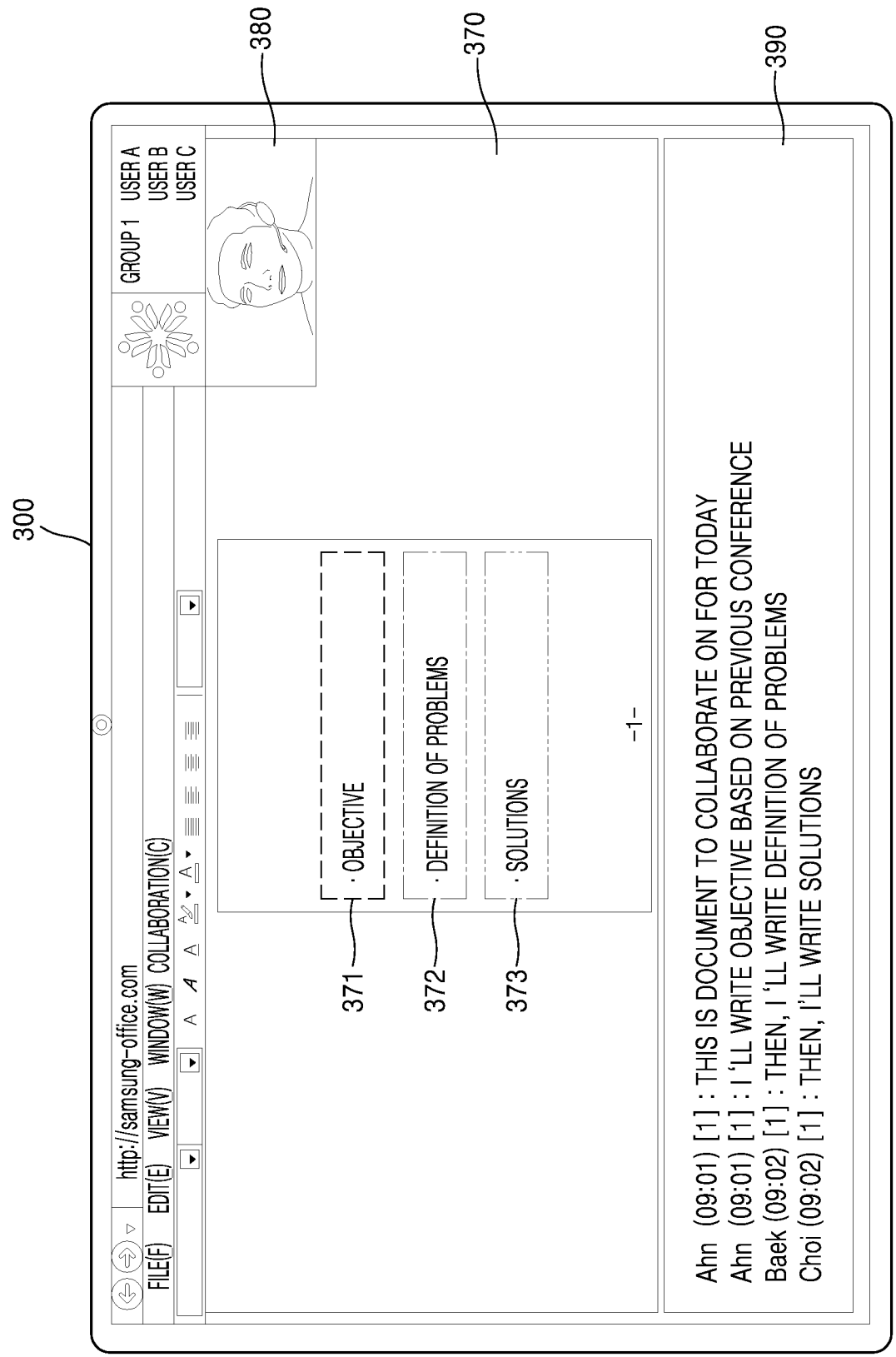
FIG. 40 illustrates an example where first through third editing ranges are locked for a plurality of regions in a page in a user terminal for receiving collaboration services according to an exemplary embodiment.

FIG. 40 illustrates an example where first through third editing ranges 371 through 373 are locked for a plurality of regions in a page in a first user terminal 300 for receiving collaboration services according to an exemplary embodiment.

Referring to FIG. 40, a window 370 showing a document being collaboratively edited, a window 380 showing a video call image, and a window 390 showing conference minutes may be displayed on the first user terminal 300.

When a first user (e.g., "Ahn") designates a region in a first page of the document displayed in the window 370 as the first editing range 371 and requests the server (100 in FIG. 36) for providing collaboration services to lock the region, a document having the locked first editing range 371 may be displayed as illustrated in FIG. 40.

Furthermore, when a second user (e.g., "Baek") designates a region in the first page of the document being collaboratively edited as the second editing range 372 and requests the server (100 in FIG. 36) to lock the second editing range 372 by using a second user terminal 400, a document having the locked second editing range 372 may be displayed as illustrated in FIG. 40.

In this case, when a third user (e.g., "Choi") designates a region in the first page of the document being collaboratively edited as the third editing range 373 and requests the server (100 in FIG. 36) to lock the third editing range 373 by using a third user terminal 500, a document having the locked third editing range 373 may be displayed as illustrated in FIG. 40.

In addition, a video call image of the third user is output to the window 380, and a text that the third user speaks is displayed in the window 390. In other words, a video call image associated with a user who speaks a text in the conference minutes may be displayed together with the conference minutes. For this purpose, only a video call image corresponding to a text in the conference minutes may be displayed in the window 380.

Referring to FIG. 40, each of the first through third users may designate an editing range for each region in a page within a document being collaboratively edited. Furthermore, a page number of the document that each of the first through third users views on his or her own user terminal is displayed together with a text in the conference minutes. A text may be obtained by converting a voice in a video call image of each user. Information about a time when the text occurs may also be displayed together with the text and the page number, and a video call image of a user corresponding to the latest text in the conference minutes are displayed.

Figure 41:
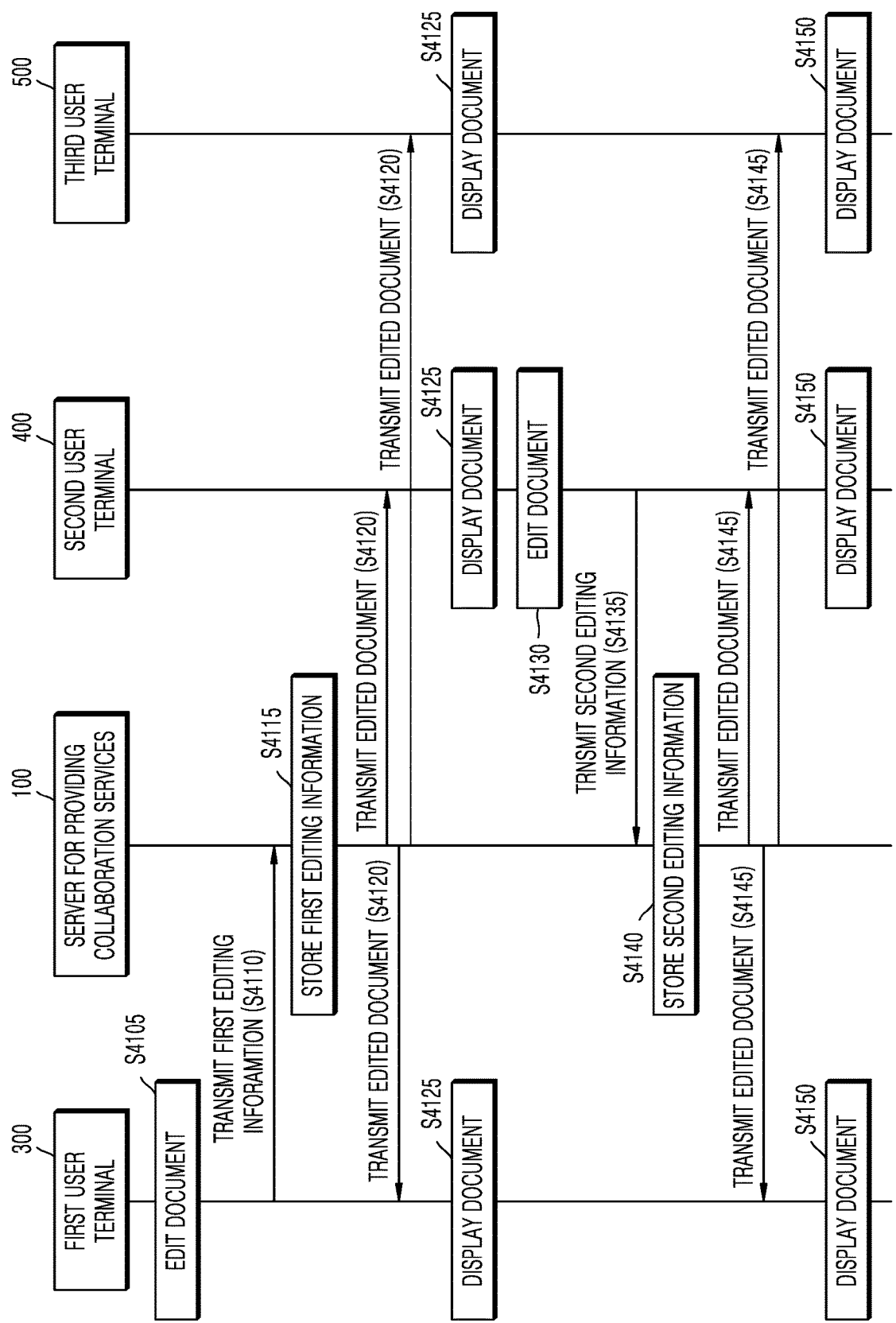
FIG. 41 illustrates a process of editing a document collaboratively in a server for providing collaboration services according to an exemplary embodiment.

FIG. 41 illustrates a process of editing a document that is collaboratively edited in a server 100 for providing collaboration services according to an exemplary embodiment.

First, an example where a document that is collaboratively edited is edited by a first user according to first editing information and displayed will be described in detail with reference to FIG. 41.

The first user may edit a document that is collaboratively edited in a first user terminal 300 (operation S4105).

The first user terminal 300 may transmit the first editing information to the server 100 (operation S4110).

The server 100 may store the first editing information (operation S4115).

The server 100 may transmit the edited document to the first through third user terminals 300, 400, and 500 as a web-based document (operation S4120).

The first through third user terminals 300, 400, and 500 may display the document that is edited according to the first editing information and transmitted as a web-based document via web browsers, respectively (operation S4125).

Next, an example where a document that is collaboratively edited is edited by a second user according to second editing information and displayed will be described in detail with reference to FIG. 41.

The second user may edit a document that is collaboratively edited in the second user terminal 400 (operation S4130).

The second user terminal 400 may transmit the second editing information to the server 100 (operation S4135).

The server 100 may store the second editing information (operation S4140).

The server 100 may transmit the edited document to the first through third user terminals 300, 400, and 500 as a web-based document (operation S4145).

The first through third user terminals 300, 400, and 500 may display the document that is edited according to the second editing information and transmitted as a web-based document via web browsers, respectively (operation S4150).

An example where a document that is collaboratively edited is sequentially edited by first and second users according to first editing information and second editing information will now be described with reference to FIGS. 42 and 43.

Figure 42:
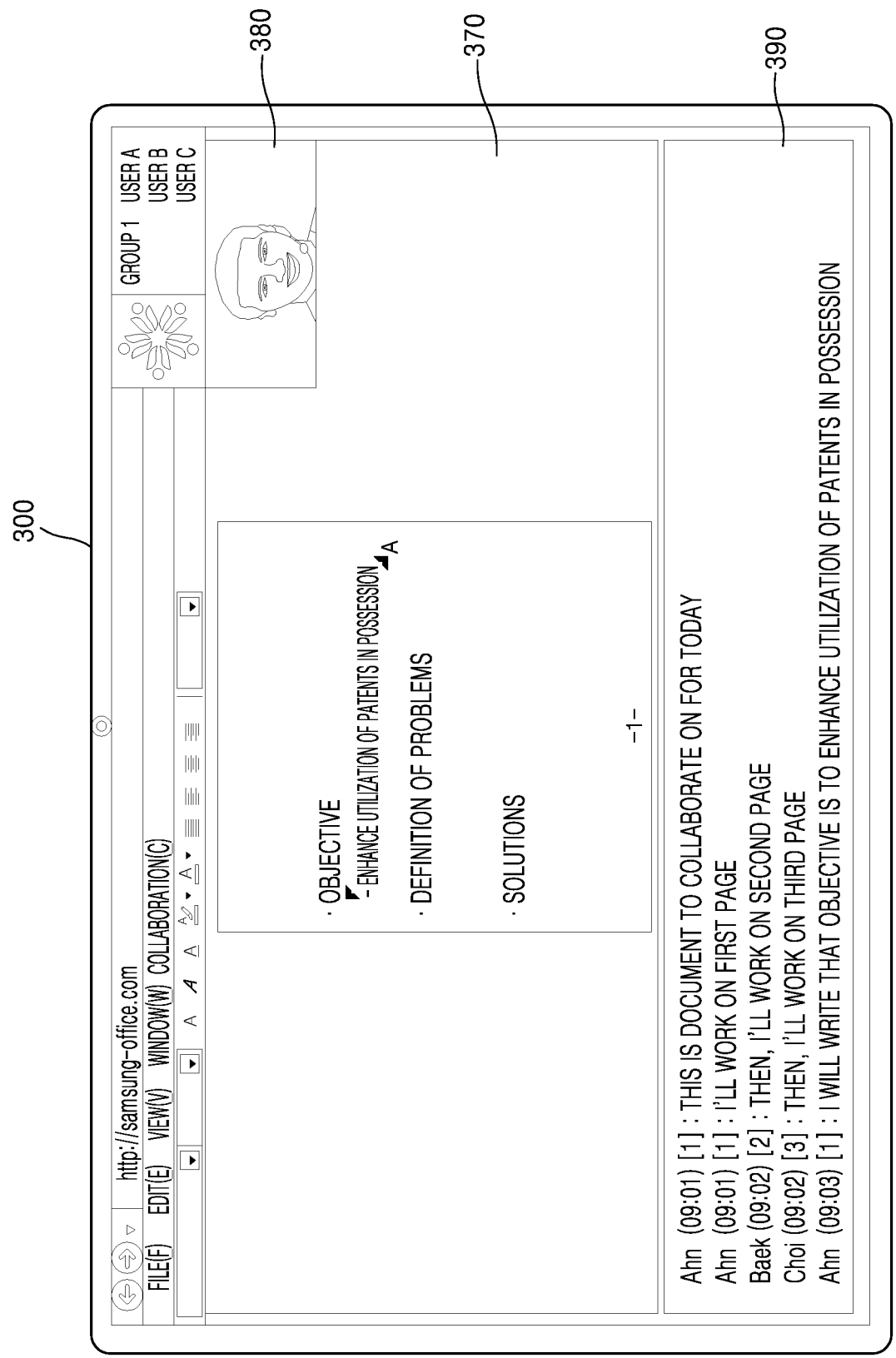
FIG. 42 illustrates an example where a document that is collaboratively edited is edited by a first user in a user terminal for receiving collaboration services according to an exemplary embodiment.

FIG. 42 illustrates an example where a document that is collaboratively edited is edited by a first user in a first user terminal 300 for receiving collaboration services according to an exemplary embodiment.

Referring to FIG. 42, a window 370 showing a document being collaboratively edited, a window 380 showing a video call image, and a window 390 showing a conference minutes may be displayed on the first user terminal 300.

When the first user (e.g., "Ahn") edits a portion in a first page of the document displayed in the window 370, speaks about editing of the portion through a video call image and requests editing from the server (100 in FIG. 41) for providing collaboration services, a document having the edited portion symbolized by 'A' indicating "Ahn" indicated as illustrated in FIG. 42 may be displayed.

The edited portion may be indicated by using a predetermined color, pattern or marker corresponding to each user so that other users may recognize who edits the portion.

Referring to FIG. 42, the first user may edit an objective that is a part of a table of contents in the document being collaboratively edited, speak about editing of the part through a video call image, and display a text obtained by converting a first user's voice in the video call image in the conference minutes.

Figure 43:
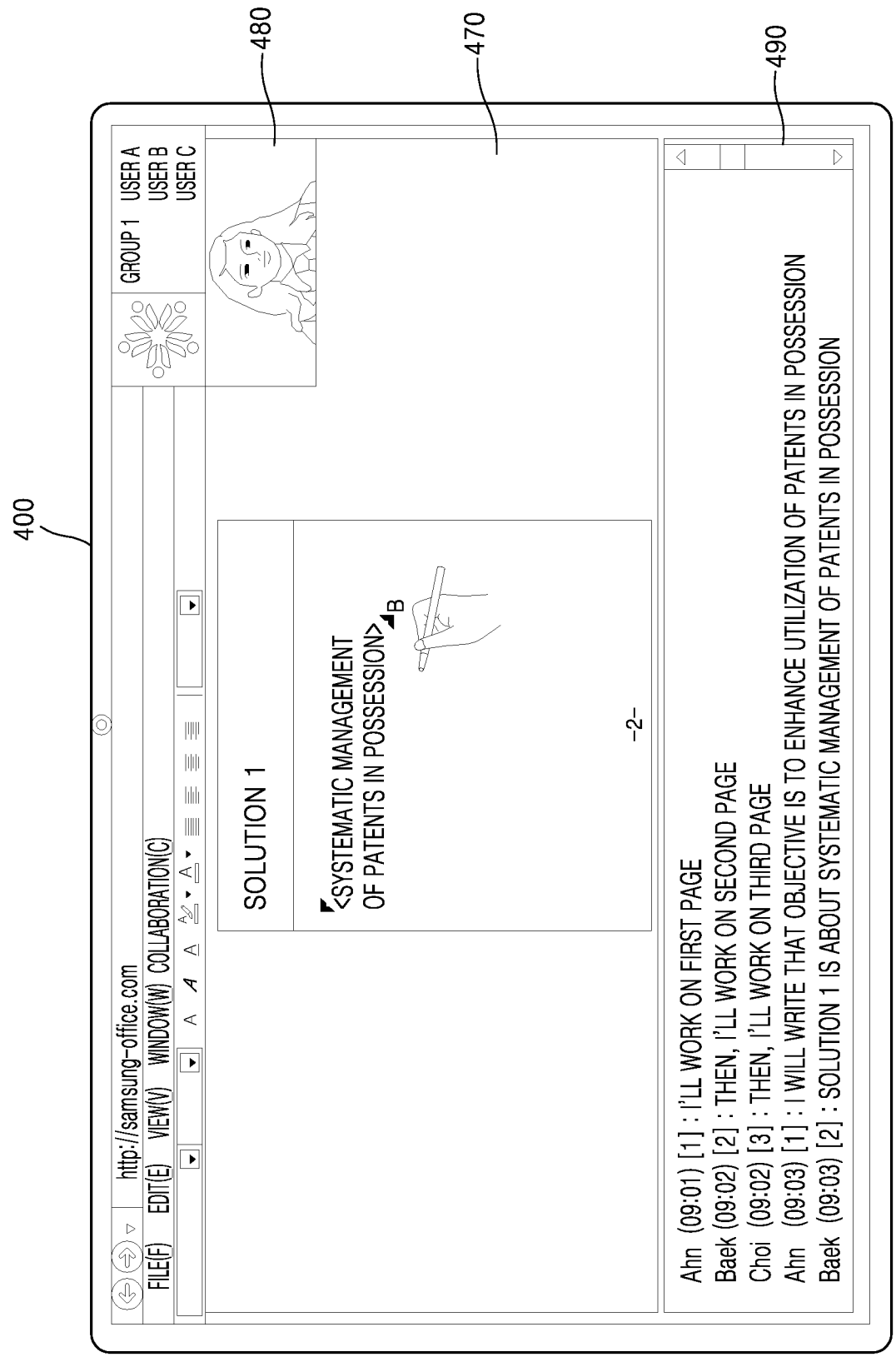
FIG. 43 illustrates an example where a document that is collaboratively edited is edited by a second user in a user terminal for receiving collaboration services according to an exemplary embodiment.

FIG. 43 illustrates an example where a document that is collaboratively edited is edited by a second user in a second user terminal 400 for receiving collaboration services according to an exemplary embodiment.

Referring to FIG. 43, a window 470 showing a document being collaboratively edited, a window 480 showing a video call image, and a window 490 showing conference minutes may be displayed on the second user terminal 400.

When the first user (e.g., "Baek") edits a portion in a second page of the document being collaboratively edited, speaks about editing of the portion through a video call image and requests editing from the server (100 in FIG. 41) for providing collaboration services, a document having the edited portion symbolized by 'B' indicating "Baek" indicated as illustrated in FIG. 43 may be displayed.

The edited portion may be indicated by using a predetermined color, pattern or marker corresponding to each user so that other users may recognize who edits the portion.

Referring to FIG. 43, the first user may edit a portion in the second page of the document being collaboratively edited by using a touch pen, speak about editing of the portion through a video call image, and display a text obtained by converting a second user's voice in the video call image in the conference minutes.

Figure 44:
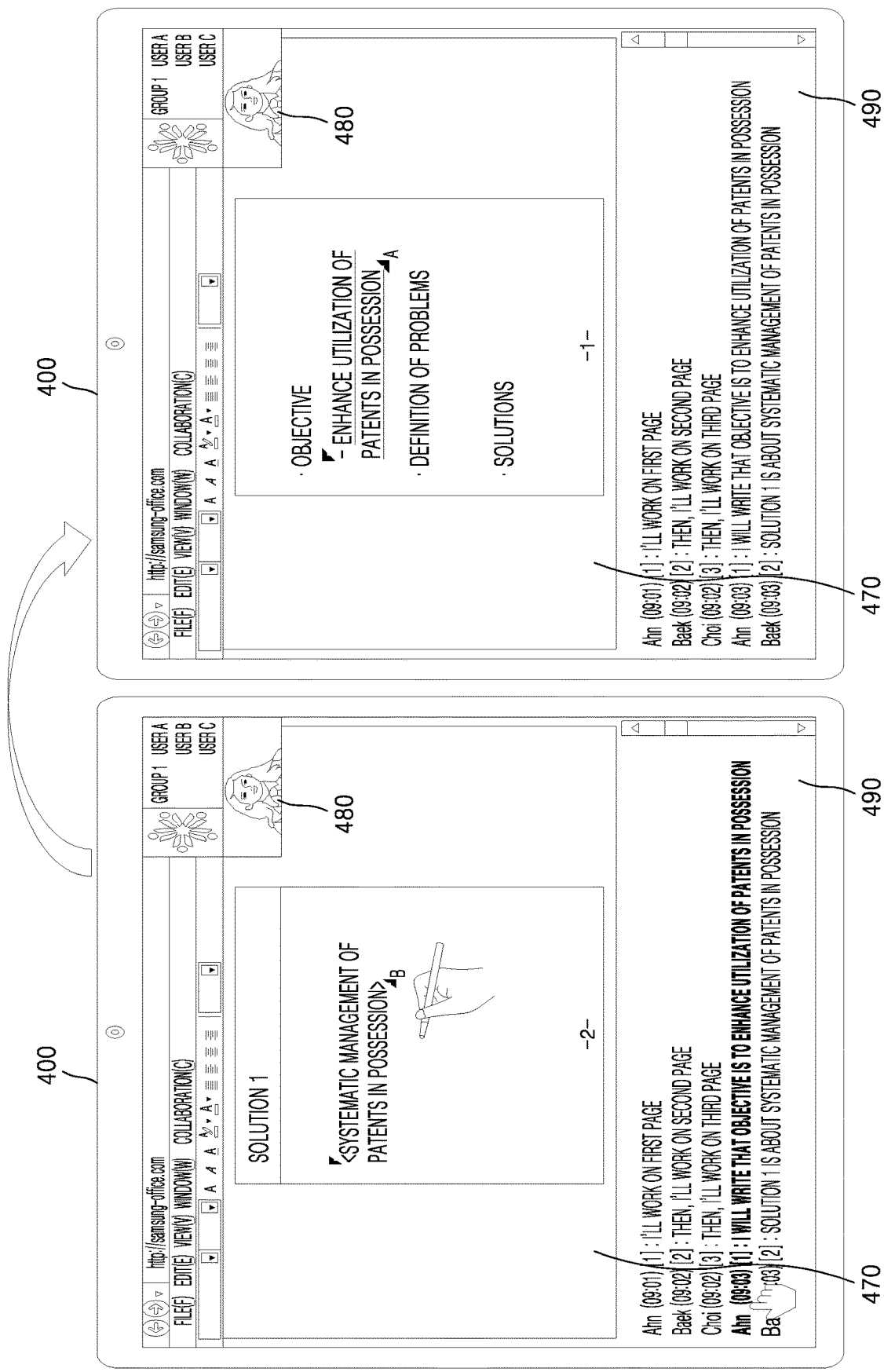
FIG. 44 illustrates an example where editing information of a document being collaboratively edited is identified by using conference minutes in a user terminal for receiving collaboration services according to an exemplary embodiment.

FIG. 44 illustrates an example where editing information of a document being collaboratively edited is identified by using conference minutes in a second user terminal 400 for receiving collaboration services according to an exemplary embodiment.

Referring to FIG. 44, a window 470 showing a document being collaboratively edited, a window 480 showing a video call image, and a window 490 showing conference minutes may be displayed on the second user terminal 400. When texts are accumulated in the window 490, a scroll bar may be created on the right side of the window 490.

The server 100 may receive information about a text selected by a user from conference minutes from the second user terminal 400 and transmit to the second user terminal 400 information about an edited portion of a document being collaboratively edited and which is synchronized to the selected text. In detail, if a text of another user is selected in the window 490, editing information of the document corresponding to the selected text may be displayed in the window 470. This is possible when the conference minutes are synchronized to the document.

Figure 45:
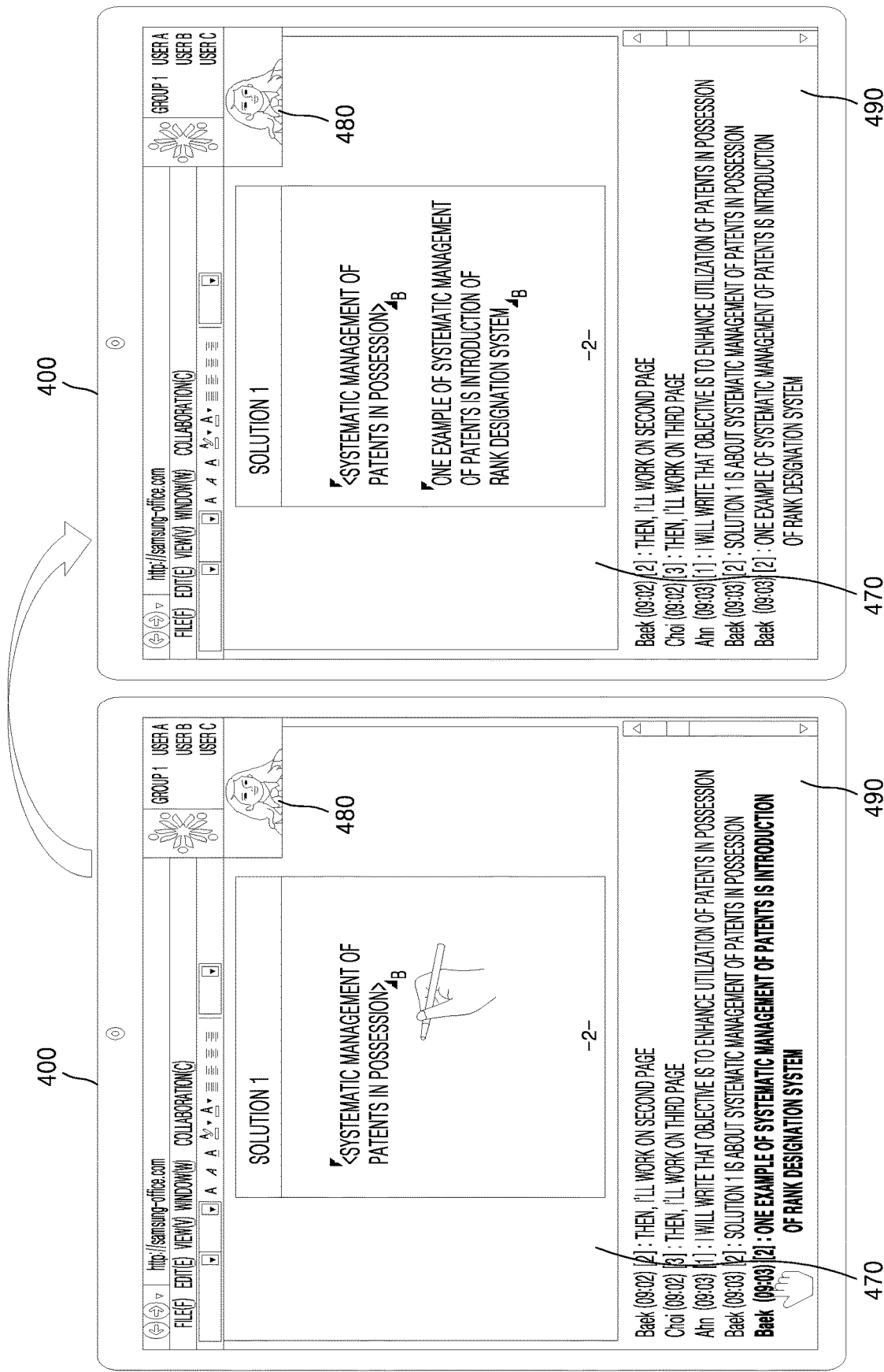
FIG. 45 illustrates an example where a document that is collaboratively edited is edited by using conference minutes, in a user terminal for receiving collaboration services according to an exemplary embodiment.

FIG. 45 illustrates an example where a document being collaboratively edited is edited by using conference minutes, in a second user terminal 400 for receiving collaboration services, according to an exemplary embodiment.

Referring to FIG. 45, a window 470 showing a document being collaboratively edited, a window 480 showing a video call image, and a window 490 showing conference minutes may be displayed on the second user terminal 400.

The server (100 in FIG. 41) for providing collaboration services may receive from the second user terminal 400 information about a text selected by a user from conference minutes and identify whether there is an edited portion of the document being collaboratively edited and which is synchronized to the selected text. In detail, if a second user selects his or her own text from the window 490 and there is no editing information of the document corresponding to the selected text, the document may be edited by using the selected text as editing information of the document. In this way, the document displayed in the window 470 may be edited by using a text displayed in the window 490.

Figure 46:
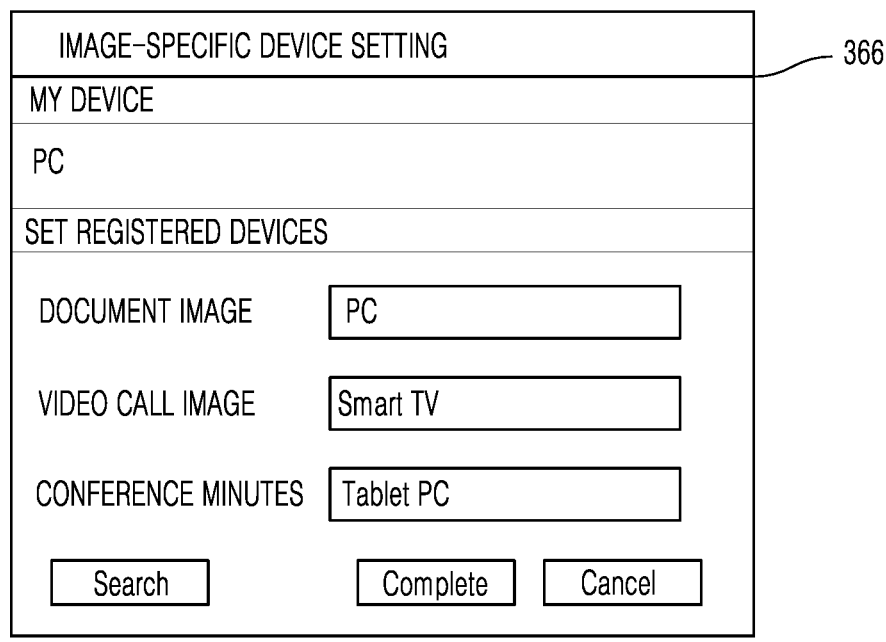
FIG. 46 illustrates an example where in a user terminal for receiving collaboration services, devices are set for each of an image of a document being collaboratively edited, a video call image, and conference minutes so that the images are separately displayed by using other devices registered with the user terminal, according to an exemplary embodiment.

FIG. 46 illustrates an example where in a user terminal for receiving collaboration services, devices are set for each of an image of a document being collaboratively edited, a video call image, and a conference minutes so that the image of the document, the video call image, and the conference minutes are separately displayed by using other devices registered with the user terminal, according to an exemplary embodiment.

In detail, FIG. 46 illustrates an image-specific device setting window 366. If a user has difficulty in viewing editing of a document being collaboratively edited, conference minutes, and a video call image, a device setting may be performed for each image so that at least one of an image of the document, the video call image, and the conference minutes are displayed on devices that are currently registered with the user terminal.

Figure 47:
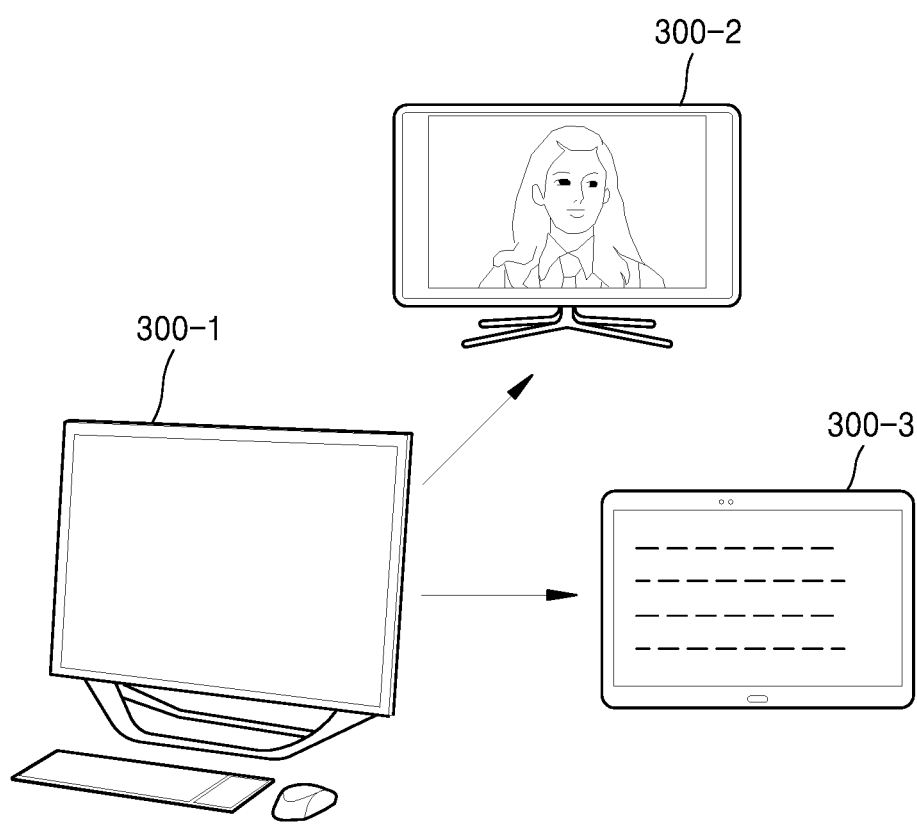
FIG. 47 illustrate an example where a document being collaboratively edited, a video call image, and conference minutes are displayed separately on a plurality of devices, according to an exemplary embodiment.

FIG. 47 illustrate an example where a document being collaboratively edited, a video call image, and conference minutes are displayed separately on a plurality of devices, according to an exemplary embodiment.

When the device setting is completed for each image as described above with reference to FIG. 46, the document, the video call image, and the conference minutes may be displayed separately on a PC 300-1, a smart TV 300-2, and a tablet Pc 300-3, respectively.

Figure 48:
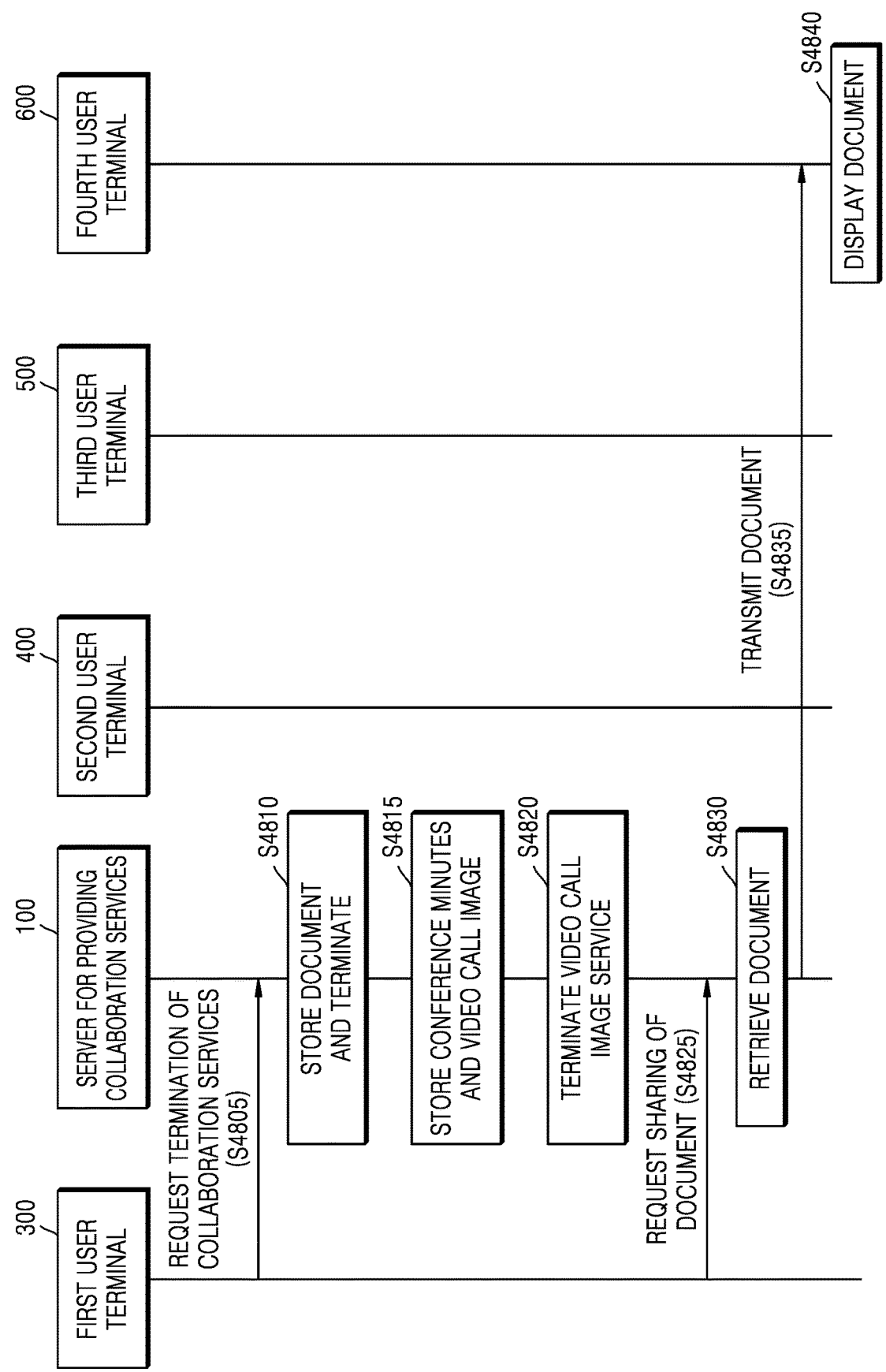
FIG. 48 illustrates a process of terminating collaboration services by requesting termination of the collaboration services from a server for providing collaboration services and transmitting a collaboratively edited document to another user terminal, according to an exemplary embodiment.

FIG. 48 illustrates a process of terminating collaboration services by requesting termination of the collaboration services from a server 100 for providing collaboration services and transmitting a collaboratively edited document to another user terminal, according to an exemplary embodiment.

Referring to FIG. 48, the first user terminal 300 may request termination of collaboration services from the server 100 (operation S4805).

The server 100 may store a document being collaboratively edited and terminate a program used for processing the document (operation S4810).

The server 100 may store conference minutes and a video call image (operation S4815).

If the document, the conference minutes, and the video call image are all stored, the server 100 may terminate a video call image service (operation S4820). In this case, the server 100 may store a document for reviewing, a video call image for reviewing, and conference minutes for reviewing as well. The document for reviewing, the video call image for reviewing, and the conference minutes for reviewing mean images in which editing information is synchronized to text information, i.e., a document that preserves indication of a portion edited during collaborative editing of the document by using collaboration services and images synchronized to the edited portion.

The first user terminal 300 may request sharing of a document that is collaboratively edited from the server 100 (operation S4825). For example, to share a document collaboratively edited by using collaboration services with a fourth user who does not edit the document collaboratively, the first user terminal 300 may request sharing of the document from the server 100.

The server may retrieve the document requested by the first user terminal 300 (operation S4830).

The server 100 may transmit the retrieved document to the fourth user terminal 600 (operation S4835).

The fourth user terminal 600 may display the transmitted document (operation S4840). The document displayed on a screen of the fourth user terminal 600 is a web-based document. The document that is executed on the server 100 may be displayed on a web browser screen that is executed on the fourth user terminal 600.

Figure 49:
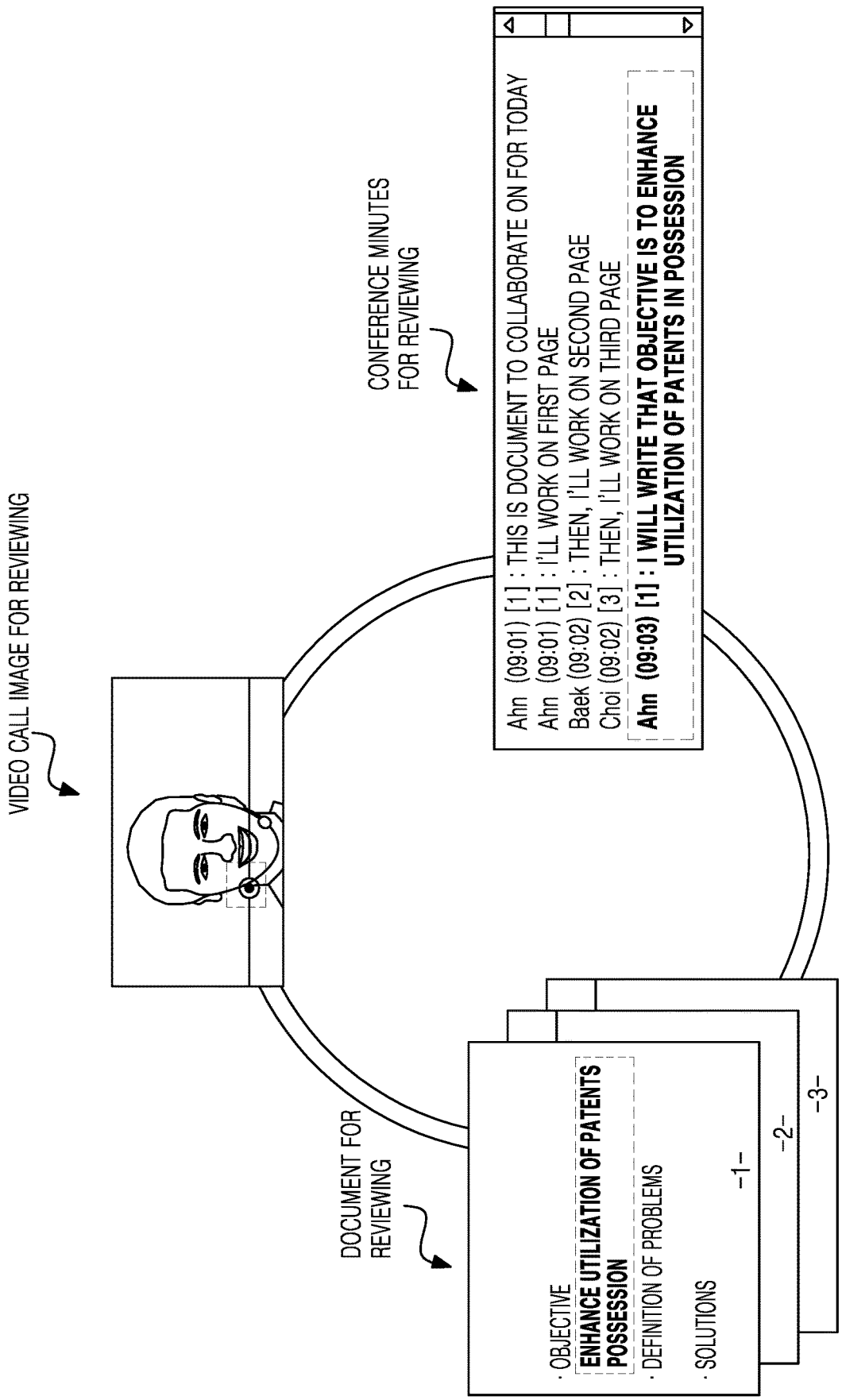
FIG. 49 illustrates an example where a document for reviewing, a video call image for reviewing, and conference minutes for reviewing are synchronized to one another, according to an exemplary embodiment.

FIG. 49 illustrates an example where a document for reviewing, a video call image for reviewing, and conference minutes for reviewing are synchronized to one another, according to an exemplary embodiment.

Referring to FIG. 49, the document for reviewing, the video call image for reviewing, and the conference minutes for reviewing may be synchronized to one another.

For example, when first through third users participates in a video call on May 21, 2014, the first user (e.g., "Ahn") may enter a sentence "Enhance utilization of patents in possession" in a document at 09:03 am on May 21, 2014 while outputting a voice saying "I'll write that the objective is to enhance utilization of patents in possession." In this case, the server 100 may synchronize the sentence "Enhance utilization of patents in possession" in the document with a conference detail "I'll write that the objective is to enhance utilization of patents in possession." in the conference minutes. Furthermore, while the first through third users are participating in the video call on May 21, 2014, a video call image output at the time when the first user enters the sentence "Enhance utilization of patents in possession" in the document may be synchronized with the document and the conference minutes.

In other words, the sentence "Enhance utilization of patents in possession" may be synchronized to the conference detail "I'll write that the objective is to enhance utilization of patents in possession." Thus, a sentence "Enhance utilization of patents in possession', a conference detail ""I'll write that the objective is to enhance utilization of patents in possession.", and a video call image output at 09:03 am on May 21, 2014 may be synchronized with one another.

Figure 50:
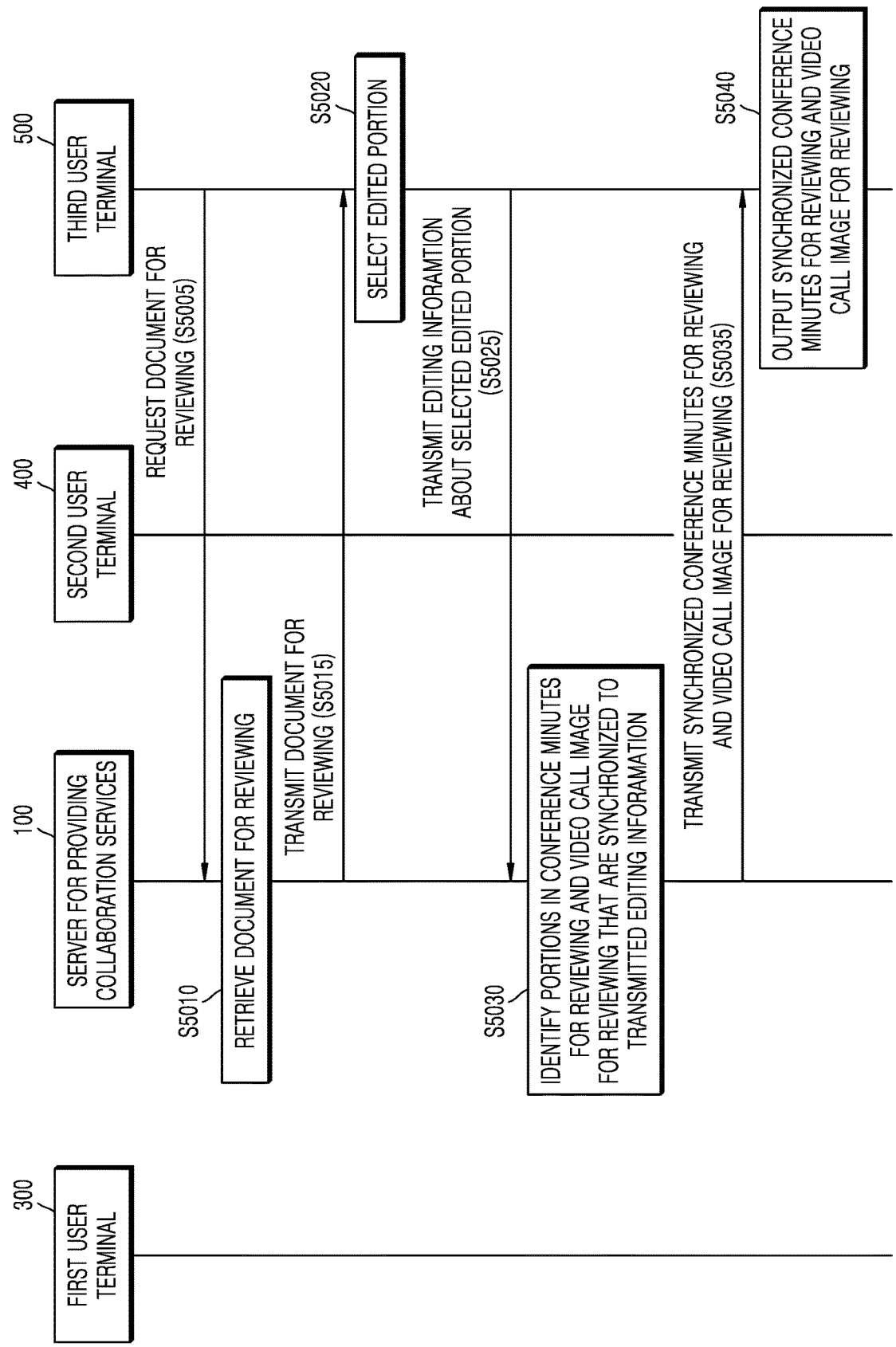
FIG. 50 illustrates a process of requesting a document for reviewing from a server for providing collaboration services and reviewing editing of a document according to an exemplary embodiment.

FIG. 50 illustrates a process of requesting a document for reviewing from a server 100 for providing collaboration services and reviewing editing of a document according to an exemplary embodiment.

Referring to FIG. 50, a third user terminal 500 may request a document for reviewing from the server 100 (operation S5005). For example, a third user may log in to the server 100 via the third user terminal 500 and select a document for reviewing from among documents in a list of collaboration services already performed by the third user. The third user terminal 500 may then request a document for reviewing from the server 100 according to selection information of the third user received via the user input unit (220 in FIG. 2).

The server 100 may retrieve a document for reviewing in response to the request (operation S5010). For example, the server 100 may retrieve the document for reviewing corresponding to the request from the third user terminal 500 from documents stored in the document DB (155 in FIG. 3).

The server 100 may transmit the document for reviewing to the third user terminal 500 (operation S5015).

The third user terminal 500 may select an edited portion from the received document for reviewing (operation S5020). For example, if the third user terminal 500 displays the document for reviewing, and the third user selects a sentence or passage in the document for reviewing, an edited portion may be selected from the document for reviewing.

The third user terminal 500 may transmit editing information about the selected edited portion to the server 100 (operation S5025).

The server 100 may identify portions in conference minutes for reviewing and a video call image for reviewing which are synchronized to the transmitted editing information (operation S5030). For example, the server 100 may determine conference minutes for reviewing and a video call image for reviewing which are synchronized to the editing information from the image DB (157 in FIG. 3), based on synchronization information contained in the integrated management DB (151 in FIG. 3).

The server 100 may transmit the conference minutes for reviewing and the video cell image for reviewing that are synchronized to the editing information to the third user terminal 500 (operation S5035).

The third user terminal 500 may output the conference minutes for reviewing and the video cell image for reviewing that are synchronized to the editing information (operation S5040). For example, the third user terminal 500 may output the received conference minutes for reviewing and the video call image for reviewing via the output unit (250 in FIG. 2).

An example of the synchronized images output in operation S5040 will now be described with reference to FIG. 51.

Figure 51:
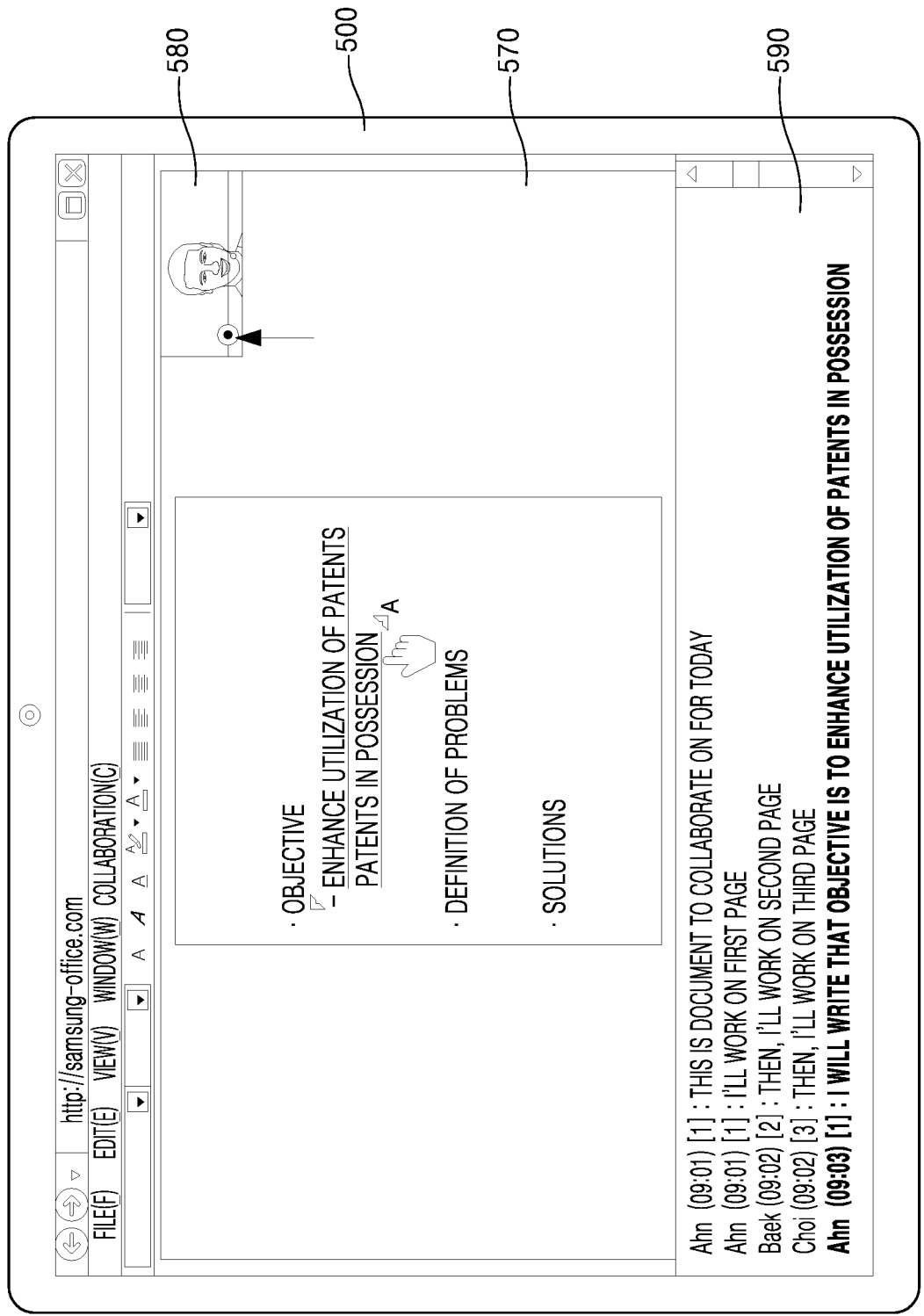
FIG. 51 illustrates an example where when an edited portion of a document for reviewing is selected, conference minutes for reviewing and a video call image for reviewing, both of which are synchronized to the selected edited portion, are output in a user terminal for receiving collaboration services according to an exemplary embodiment.

FIG. 51 illustrates an example where when an edited portion of a document for reviewing is selected, conference minutes for reviewing and a video call image for reviewing, both of which are synchronized to the selected edited portion, are output in a third user terminal 500 for receiving collaboration services according to an exemplary embodiment.

In detail, FIG. 51 illustrates an example where an image 570 of a document for reviewing and a window 580 showing a video call image for reviewing and conference minutes 570 for reviewing, both of which are synchronized to the document image 570 for reviewing, are output to the third user terminal 500.

In one exemplary embodiment, a window 580 showing video call images may be displayed in a pop-up window or another window. In another exemplary embodiment, the video call image may be displayed in pop-up window or another window in response to selecting an edit of the editable document or an indicator of the edit. In yet another exemplary embodiment, the video call image may be displayed in pop-up window or another window in response to selecting an item from a textual record of items, log data or conference minutes.

Referring to FIG. 51, the third user terminal 500 may select an edited portion representing a sentence or passage in the image 570 for reviewing. For example, the third user terminal 500 may select an edited portion specifying a sentence "Enhance utilization of patents in possession".

The third user terminal 500 may output the conference minutes 590 for reviewing synchronized to the selected edited portion. For example, it is assumed that while first through third users are participating in a video call on May 21, 2014, the first user (e.g., "Ahn") edits a sentence "Enhance utilization of patents in possession" in a document at 09:03 am on May 21, 2014 while outputting a voice saying "I'll write that the objective is to enhance utilization of patents in possession." In this case, the third user terminal 500 may output the conference minutes 590 for viewing with a conference detail "I'll write that the objective is to enhance utilization of patents in possession." indicated in boldface.

The third user terminal 500 may also output the window 580 for showing a video call image for reviewing synchronized to the selected edited portion. A reproduction bar corresponding to a length of time during which a video conference as of May 21, 2014 is held may be displayed on the window 580 for showing a video call image for reviewing. Furthermore, a window 580 for showing the video call image for reviewing may be displayed from a playback position corresponding to the time 09:03 am on May 21, 2014. However, exemplary embodiments are not limited thereto, and the window 580 for showing a video call image for reviewing may be a still image at the playback position corresponding to 09:03 am on May 21, 2014

Figure 52:
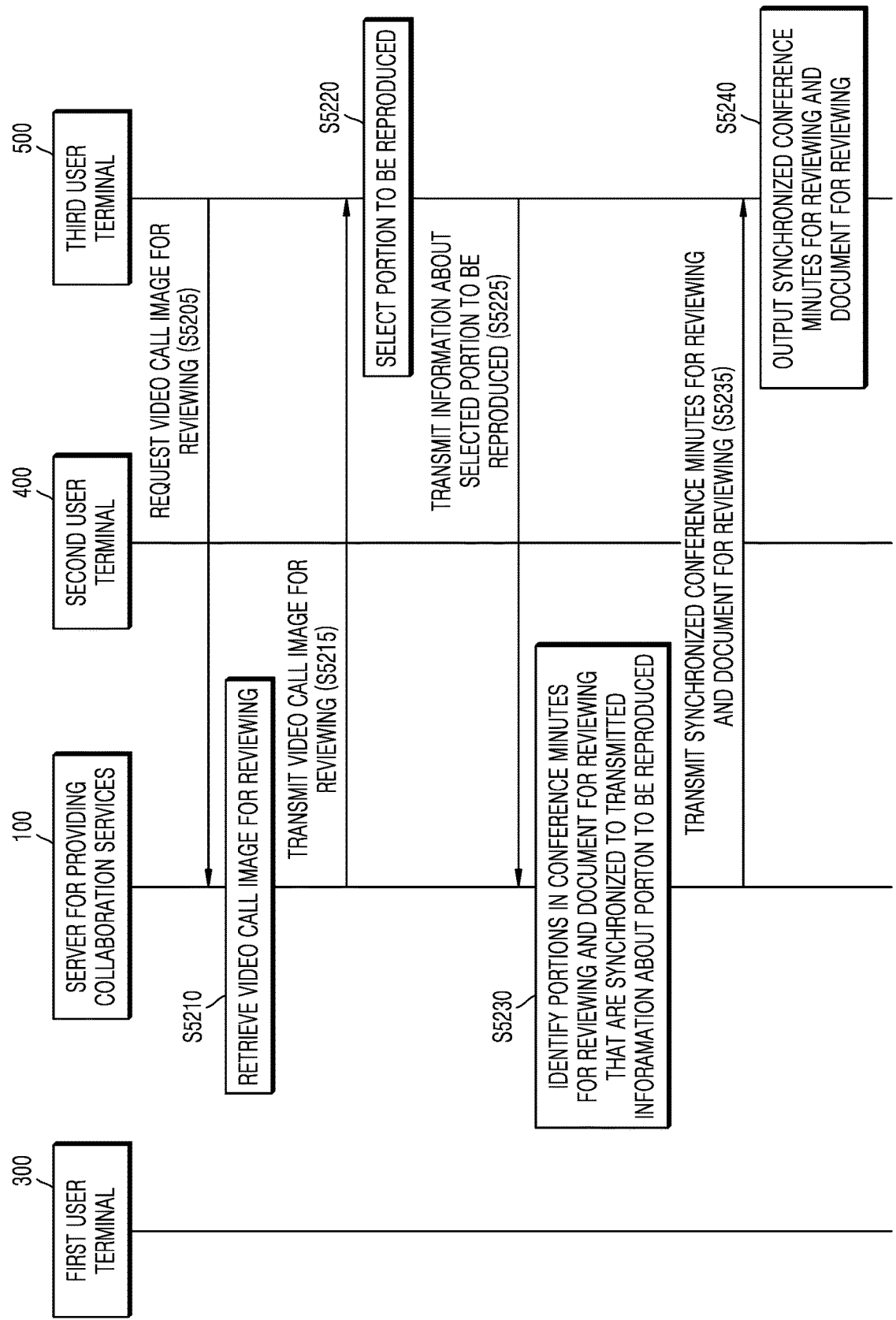
FIG. 52 illustrates a process of requesting a video call image for reviewing from a server for providing collaboration services and reviewing editing of a document according to an exemplary embodiment.

FIG. 52 illustrates a process of requesting a video call image for reviewing from a server 100 for providing collaboration services and reviewing editing of a document according to an exemplary embodiment.

Referring to FIG. 52, a third user terminal 500 may request a video call image for reviewing from the server 100 (operation S5205). For example, a third user may log in to the server 100 via the third user terminal 500 and select a video call image for reviewing from among video call images in a list of collaboration services already performed by the third user. The third user terminal 500 may then request a video call image for reviewing from the server 100 according to selection information of the third user received via the user input unit (220 in FIG. 2).

The server 100 may retrieve a video call image for reviewing (operation S5210). For example, the server 100 may retrieve the video call image for reviewing corresponding to the request from the third user terminal 500 from images stored in the image DB 157.

The server 100 may transmit the video call image for reviewing to the third user terminal 500 (operation S5215).

The third user terminal 500 may select a portion to be reproduced from the received video call image for reviewing (operation S5220). For example, if the third user terminal 500 displays a reproduction bar for the video call image for reviewing, and the third user selects a point on the reproduction bar, a portion to be reproduced may be selected from the video call image for reviewing.

The third user terminal 500 may transmit information about the selected portion to be reproduced to the server 100 (operation S5225).

The server 100 may identify portions in conference minutes for reviewing and a document for reviewing which are synchronized to the transmitted information about the portion to be reproduced (operation S5230). For example, the server 100 may determine a document for reviewing and conference minutes for reviewing which are synchronized to the information about the portion to be reproduced from the document DB 155 and the image DB 157, respectively, based on synchronization information contained in the integrated management DB 151.

The server 100 may transmit the conference minutes for reviewing and the document for reviewing that are synchronized to the information about the portion to be reproduced to the third user terminal 500 (operation S5235).

The third user terminal 500 may output the conference minutes for reviewing and the document for reviewing that are synchronized to the information about the portion to be reproduced (operation S5240). For example, the third user terminal 500 may output the received conference minutes for reviewing and the document for reviewing via the output unit 250.

An example of the synchronized images output in operation S5240 will now be described with reference to FIG. 53.

Figure 53:
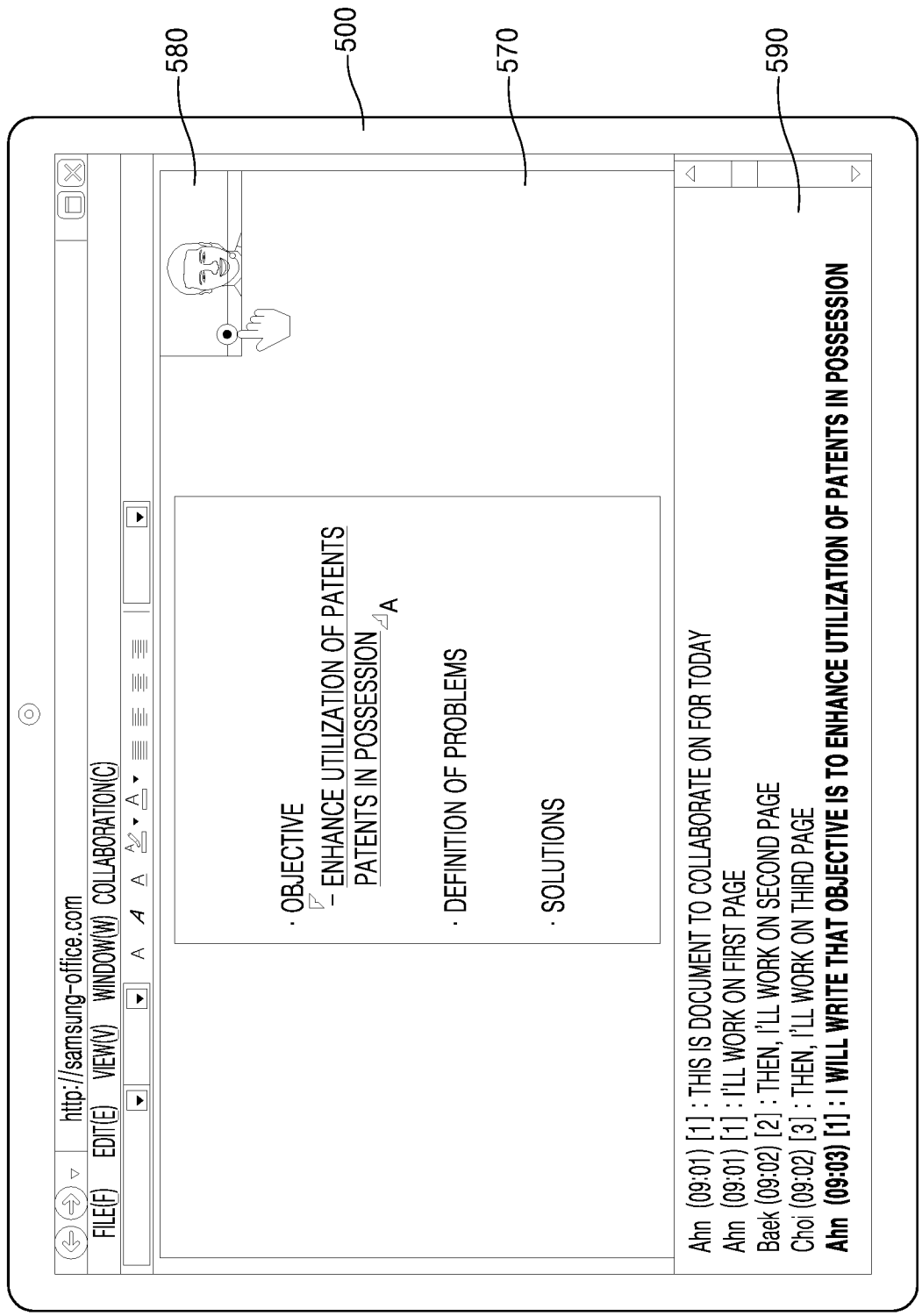
FIG. 53 illustrates an example where when a portion of a video call image for reviewing to be reproduced is selected, conference minutes for reviewing and a document for reviewing, both of which are synchronized to the selected reproduced portion, are output in a user terminal for receiving collaboration services according to an exemplary embodiment.

FIG. 53 illustrates an example where when a portion of a video call image for reviewing to be reproduced is selected, conference minutes for reviewing and a document for reviewing, both of which are synchronized to the selected reproduced portion, are output in a third user terminal 500 for receiving collaboration services according to an exemplary embodiment.

In detail, FIG. 53 illustrates an example where a window 580 for showing a video call image for reviewing and conference minutes 590 for reviewing and an image 570 of a document for reviewing, both of which are synchronized to the video call image for reviewing, are output to the third user terminal 500.

Referring to FIG. 53, the third user terminal 500 may select a portion to be reproduced in the video call image for reviewing. For example, the third user terminal 500 may select a portion to be reproduced from the video call image for reviewing by selecting a point on the reproduction bar for the video call image for reviewing output to the third user terminal 500.

The third user terminal 500 may output the conference minutes 590 for reviewing synchronized to the selected portion to be reproduced. For example, it is assumed that while first through third users are participating in a video call on May 21, 2014, the first user (e.g., "Ahn") outputs a voice saying "I'll write that the objective is to enhance utilization of patents in possession." If the selected portion to be reproduced includes 09:03 am on May 21, 2014, the third user terminal 500 may output the conference minutes 590 for viewing that specifies a sentence "I'll write that the objective is to enhance utilization of patents in possession."

The third user terminal 500 may also output the image 570 of the document for reviewing synchronized to the selected portion to be reproduced. For example, it is assumed that the first user (e.g., "Ahn") edits a sentence "Enhance utilization of patents in possession" in a document at 09:03 am on May 21, 2014 while first through third users are recording conference minutes on May 21, 2014. If the selected portion to be reproduced includes 09:03 am on May 21, 2014, the third user terminal 500 may output the image 570 of the document for reviewing including a sentence "Enhance utilization of patents in possession".

A reproduction bar corresponding to a length of time during which a video conference as of May 21, 2014 is held may be displayed on the window 580 for showing a video call image. Furthermore, the video call image for reviewing may be displayed from a playback position corresponding to the time 09:03 am on May 21, 2014. However, exemplary embodiments are not limited thereto, and the video call image for reviewing may be a still image at the playback position corresponding to 09:03 am on May 21, 2014

Figure 54:
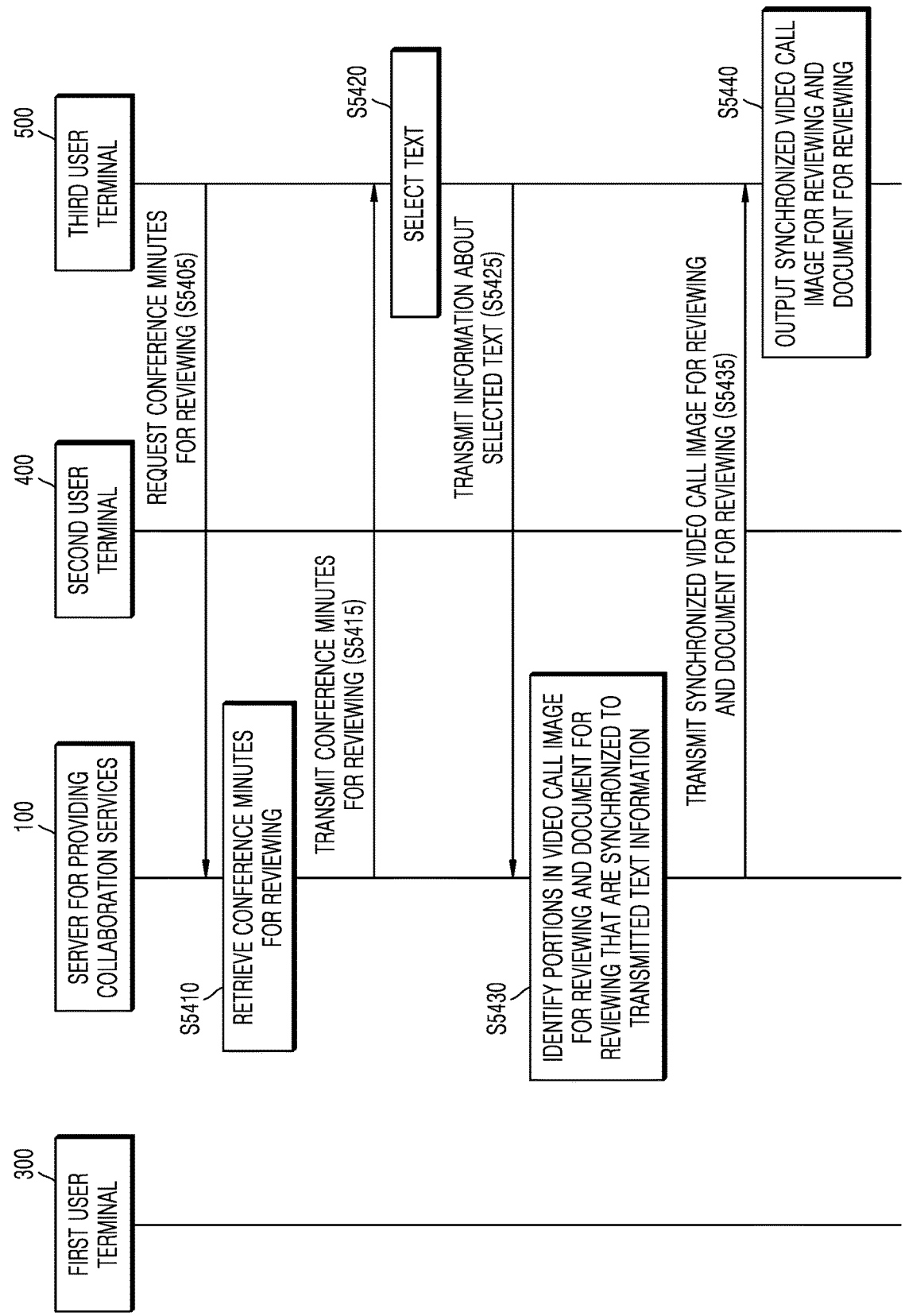
FIG. 54 illustrates a process of requesting conference minutes for reviewing from a server 100 for providing collaboration services and reviewing editing of a document according to an exemplary embodiment.

FIG. 54 illustrates a process of requesting conference minutes for reviewing from a server 100 for providing collaboration services and reviewing editing of a document according to an exemplary embodiment Referring to FIG. 54, a third user terminal 500 may request conference minutes for reviewing from the server 100 (operation S5405). For example, a third user may log in to the server 100 via the third user terminal 500 and select conference minutes for reviewing from among conference minutes in a list of collaboration services already performed by the third user. The third user terminal 500 may then request conference minutes for reviewing from the server 100 according to selection information of the third user received via the user input unit 220.

The server 100 may retrieve conference minutes for reviewing (operation S5410). For example, the server 100 may retrieve the conference minutes for reviewing corresponding to the request from the third user terminal 500 from images stored in the image DB 157.

The server 100 may transmit the conference minutes for reviewing to the third user terminal 500 (operation S5415).

The third user terminal 500 may select a portion to be reproduced from the received video call image for reviewing (5420). For example, if the third user terminal 500 displays the conference minutes for reviewing, and the third user selects a region in the conference minutes for reviewing, a text at a point in time corresponding to the selected region may be selected.

The third user terminal 500 may transmit information about the selected text to the server 100 (operation S5425).

The server 100 may identify portions in a video call image for reviewing and a document for reviewing which are synchronized to the transmitted text information (operation S5430). For example, the server 100 may determine a document for reviewing and a video call image for reviewing which are synchronized to the text information from the document DB 155 and the image DB 157, respectively, based on synchronization information contained in the integrated management DB 151.

The server 100 may transmit the video call image for reviewing and the document for reviewing that are synchronized to the text information to the third user terminal 500 (operation S5435).

The third user terminal 500 may output the video call image for reviewing and the document for reviewing that are synchronized to the text information (operation S5440). For example, the third user terminal 500 may output the received video call image for reviewing and the document for reviewing via the output unit 250.

An example of the synchronized images output in operation S5440 will now be described in detail with reference to FIG. 55.

Figure 55:
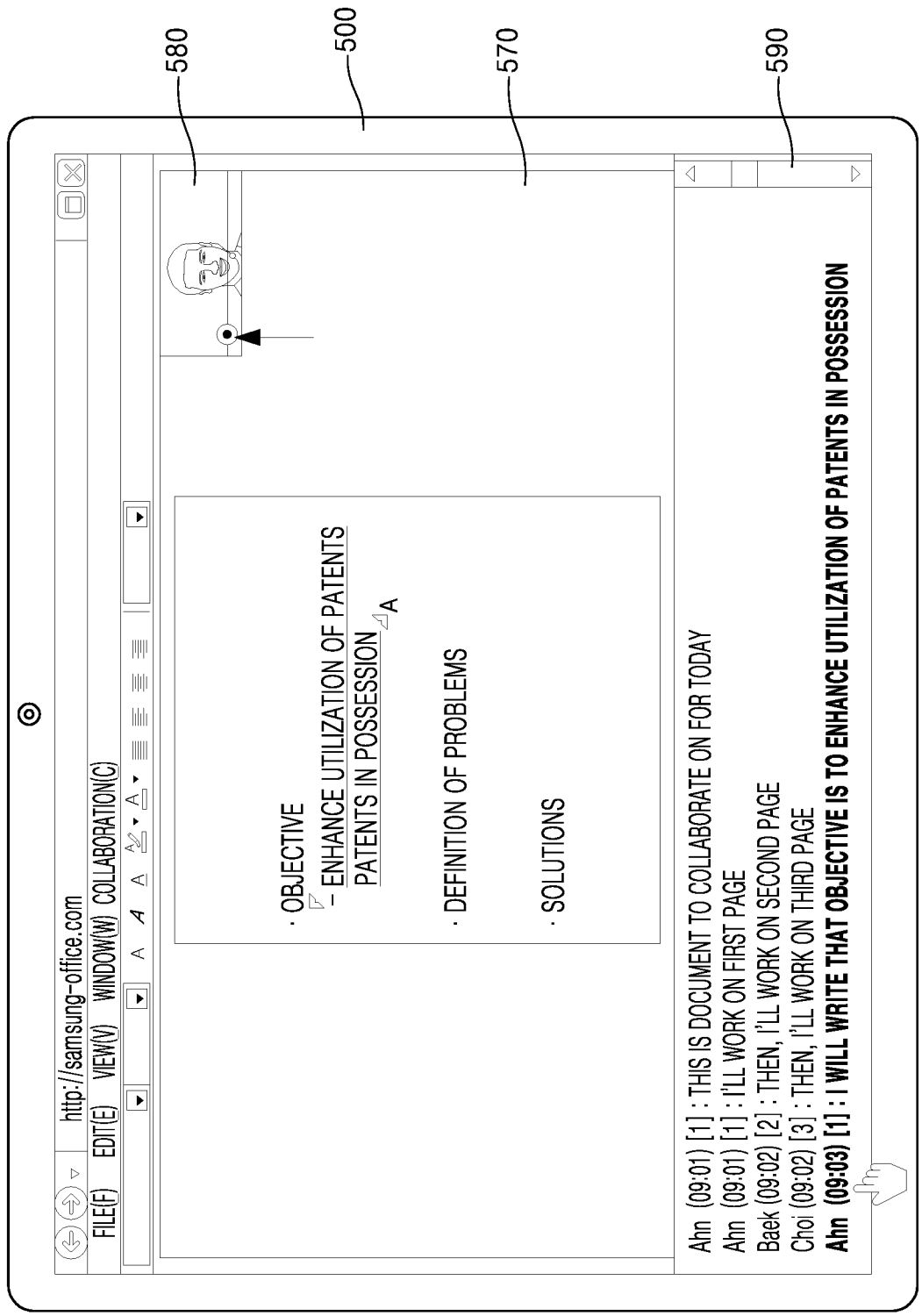
FIG. 55 illustrates an example where when a text in conference minutes for reviewing is selected, a video call image for reviewing and a document for reviewing, both of which are synchronized to the selected text, are output in a user terminal for receiving collaboration services according to an exemplary embodiment.

FIG. 55 illustrates an example where when a text in conference minutes for reviewing is selected, a video call image for reviewing and a document for reviewing, both of which are synchronized to the selected text, are output in a third user terminal 500 for receiving collaboration services according to an exemplary embodiment.

In detail, FIG. 55 illustrates an example where conference minutes 590 for reviewing and a video call image for reviewing and an image 570 of a document for reviewing, both of which are synchronized to the conference minutes 590 for reviewing, are output to the third user terminal 500.

Referring to FIG. 55, the third user terminal 500 may select a text at a particular point in time in the conference minutes 590 for reviewing. For example, the third user terminal 500 may select a text "I'll write that the objective is to enhance utilization of patents in possession" corresponding to a conference detail at 09:03 am on May 21, 2014.

The third user terminal 500 may output the video call image for reviewing synchronized to the selected text. A reproduction bar corresponding to a length of time during which a video conference as of May 21, 2014 is held may be displayed on the video call image for reviewing. Furthermore, the video call image for reviewing may be displayed from a playback position corresponding to the time 09:03 am on May 21, 2014. However, exemplary embodiments are not limited thereto, and the video call image for reviewing may be a still image at the playback position corresponding to 09:03 am on May 21, 2014

The third user terminal 500 may also output the image 570 of the document for reviewing synchronized to the selected text. For example, it is assumed that the first user (e.g., "Ahn") edits a sentence "Enhance utilization of patents in possession" at 09:03 am on May 21, 2014 while first through third users are recording conference minutes on May 21, 2014. If the time corresponding to the selected text is 09:03 am on May 21, 2014, the third user terminal 500 may output the image 570 of the document for reviewing that indicates a sentence "Enhance utilization of patents in possession".

Figure 56:
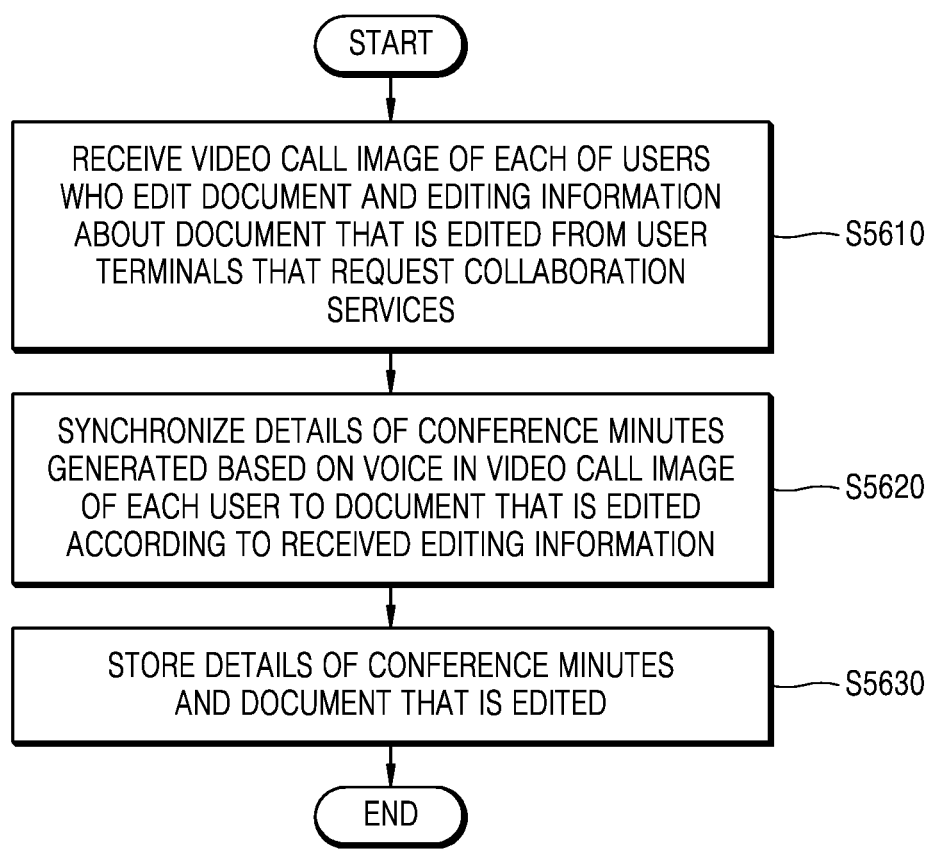
FIG. 56 is a flowchart of a method of providing collaboration services according to an exemplary embodiment.

FIG. 56 is a flowchart of a method of providing collaboration services according to an exemplary embodiment.

Referring to FIG. 56, the method of providing collaboration services according to the present embodiment includes operations performed in time series by the server 100 of FIG. 3 for providing collaboration services. Thus, even if omitted hereinafter, the above descriptions with respect to the server 100 may be applied to the method of FIG. 56.

The server 100 receives a video call image associated with each of users who edit a document and editing information about the document that is edited from user terminals that request the collaboration services (operation S5610).

The server 100 synchronizes details of conference minutes that are generated based on a voice included in the video call image associated with each user to the document that is edited according to the received editing information (operation S5620).

The server 100 stores the received video call image associated with each user, the details of the conference minutes, and the document (operation S5630).

Figure 57:
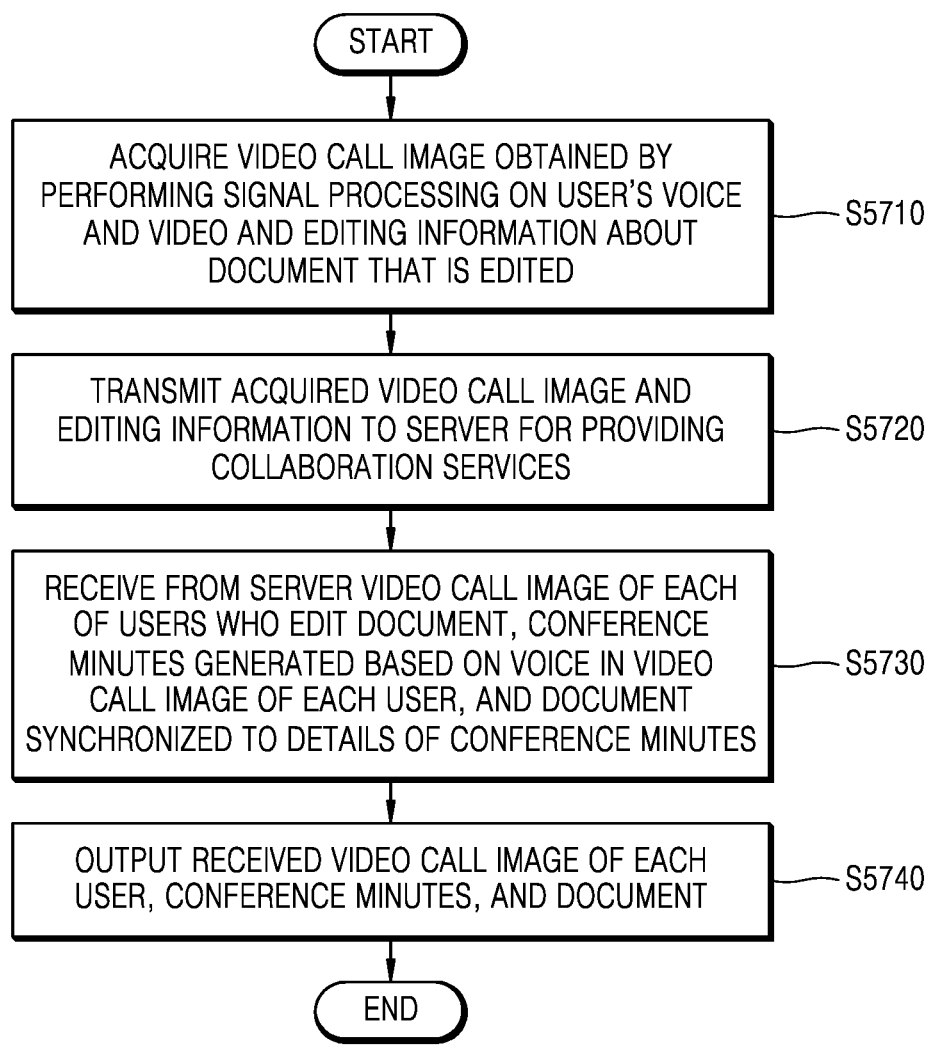
FIG. 57 is a flowchart of a method of receiving collaboration services according to an exemplary embodiment.

FIG. 57 is a flowchart of a method of receiving collaboration services according to an exemplary embodiment.

Referring to FIG. 57, the method of receiving collaboration services according to the present embodiment includes operations performed in time series by the user terminal 200 of FIG. 2. Thus, even if omitted hereinafter, the above descriptions with respect to the user terminal 200 may be applied to the method of FIG. 57.

The user terminal 200 acquires a video call image obtained by performing signal processing on a user's voice and video and editing information about a document that is edited (operation S5710).

The user terminal 200 transmits the acquired video call image and the editing information to the server 100 for providing collaboration services (operation S5720).

The user terminal 200 receives from the server 100 a video call image associated with each of the users who edit the document, conference minutes generated based on a voice included in the video call image associated with each user, and the document synchronized to the details of the conference minutes (operation S5730).

The user terminal 200 outputs the received video call image associated with each user, the conference minutes, and the document (operation S5740)

The method of providing collaboration services or the method of receiving collaboration services according to the exemplary embodiments can be recorded in programs that can be executed on a computer and be implemented through general purpose digital computers and one or more processors which can run or execute the programs using a computer-readable recording medium. Examples of the computer-readable recording medium include recording media such as magnetic storage media (e.g., floppy disks, hard disks, etc.) and optical recording media (e.g., CD-ROMs or DVDs).

While one or more exemplary embodiments have been described with reference to the figures, it will be understood by those of ordinary skill in the art that various changes in form and details may be made therein without departing from the spirit and scope of the inventive concept as defined by the following claims. Thus, the exemplary embodiments described herein should be considered in a descriptive sense only and not for purposes of limitation. The scope of the inventive concept is defined not by the detailed description of the exemplary embodiments but by the appended claims, and all differences within the scope of the appended claims and their equivalents will be construed as being included in the inventive concept.

What is claimed is:

1. An apparatus for providing collaboration services, the apparatus comprising:
   a memory storing computer executable instructions; and
   a processor configured to:
      provide a screen comprising a first area displaying a video, and a second area displaying a document comprising one or more edits that are made inside the document and correspond to points in time of the video;
      receive a selection of a first point in time of the displayed video among a plurality of points in time of the displayed video;
      provide the document comprising one or more edits that are made inside the document and are made up to the selected first point in time of the displayed video, based on the selection of the first point in time of the displayed video being received;
      provide textual minutes comprising one or more texts previously made at the first point in time of the displayed video, based on the selection of the first point in time of the displayed video being received; and
      based on a request from a user terminal, transmit a portion of the one or more texts of the textual minutes associated with a user of the user terminal by mapping the one or more texts of the textual minutes to the one or more edits that are made inside the document based on user information and log data of the user.

2. The apparatus of claim 1, wherein the processor is further configured to:
   receive a selection of an edit that is made inside the displayed document among the one or more edits made inside the displayed document; and
   provide the video to be reproduced from a second point in time corresponding to the selected edit made inside the displayed document, based on the selection of the edit made inside the displayed document.

3. The apparatus of claim 2, wherein the processor is further configured to provide the textual minutes comprising one or more texts made at the second point in time corresponding to the selected edit inside the displayed document, based on the selection of the edit made inside the displayed document being received.

4. The apparatus of claim 3, wherein the processor is further configured to:
   receive a selection of a text inside the displayed textual minutes among the one or more texts inside the displayed textual minutes;
   provide the video to be reproduced from a third point in time corresponding to the selected text inside the displayed textual minutes, based on the selection of the text inside the displayed textual minutes being received; and
   provide the document comprising one or more edits that are made inside the document and are made up to the third point in time corresponding to the selected text inside the displayed textual minutes, based on the selection of the text inside the displayed textual minutes being received.

5. The apparatus of claim 1, wherein the processor is further configured to generate the textual minutes based on a voice in the video.

6. The apparatus of claim 1, wherein the processor is further configured to generate the textual minutes, based on an edit that is made inside the document.

7. A method of providing collaboration services, the method comprising:
   providing a screen comprising a first area displaying a video, and a second area displaying a document comprising one or more edits that are made inside the document and correspond to points in time of the video;
   receiving a selection of a first point in time of the displayed video among a plurality of points in time of the displayed video;
   providing the document comprising one or more edits that are made inside the document and are made up to the selected first point in time of the displayed video, based on the selection of the first point in time of the displayed video being received;
   providing textual minutes comprising one or more texts previously made at the first point in time of the displayed video, based on the selection of the first point in time of the displayed video being received; and based on a request from a user terminal, transmitting a portion of the one or more texts of the textual minutes associated with a user of the user terminal by mapping the one or more texts of the textual minutes to the one or more edits that are made inside the document based on user information and log data of the user.

8. The method of claim 7, further comprising:

receiving a selection of an edit that is made inside the displayed document among the one or more edits made inside the displayed document; and providing the video to be reproduced from a second point in time corresponding to the selected edit made, based on the selection of the edit made inside the displayed document.

9. The method of claim 8, further comprising providing the textual minutes comprising one or more texts made at the second point in time corresponding to the selected edit inside the displayed document, based on the selection of the edit made inside the displayed document being received.

10. The method of claim 9, further comprising:

receiving a selection of a text inside the displayed textual minutes among the one or more texts inside the displayed textual minutes;

providing the video to be reproduced from a third point in time corresponding to the selected text inside the displayed textual minutes, based on the selection of the text inside the displayed textual minutes being received; and providing the document comprising one or more edits that are made inside the document and are made up to the third point in time corresponding to the selected text inside the displayed textual minutes, based on the selection of the text inside the displayed textual minutes being received.

11. The method of claim 7, further comprising generating the textual minutes, based on a voice in the video.

12. The method of claim 7, further comprising generating the textual minutes, based on an edit that is made inside the document.

13. A non-transitory computer-readable storage medium storing a program comprising instructions for causing a computer to:

provide a screen comprising a first area displaying a video, and a second area displaying a document comprising one or more edits that are made inside the document and correspond to points in time of the video;

receive a selection of a first point in time of the displayed video among a plurality of points in time of the displayed video;

provide the document comprising one or more edits that are made inside the document and are made up to the selected first point in time of the displayed video, based on the selection of the first point in time of the displayed video being received;

provide textual minutes comprising one or more texts previously made at the first point in time of the displayed video, based on the selection of the first point in time of the displayed video being received; and based on a request from a user terminal, transmit a portion of the one or more texts of the textual minutes associated with a user of the user terminal by mapping the one or more texts of the textual minutes to the one or more edits that are made inside the document based on user information and log data of the user.

* * * * *